United States Patent
Van Genechten

(10) Patent No.: US 9,513,745 B2
(45) Date of Patent: *Dec. 6, 2016

(54) NIGHT VISION TOUCHSCREEN

(71) Applicant: ESTERLINE BELGIUM BVBA, Duluth, GA (US)

(72) Inventor: Hans Van Genechten, Steenokkerzeel (BE)

(73) Assignee: ESTERLINE BELGIUM BVBA, Duluth, GA (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/284,762

(22) Filed: May 22, 2014

(65) Prior Publication Data

US 2014/0253516 A1    Sep. 11, 2014

Related U.S. Application Data

(63) Continuation of application No. 11/826,236, filed on Jul. 13, 2007, now Pat. No. 8,736,580.

(30) Foreign Application Priority Data

Jun. 29, 2007   (EP) ..................................... 07447040

(51) Int. Cl.
*G06F 3/042* (2006.01)

(52) U.S. Cl.
CPC .......... *G06F 3/0425* (2013.01); *G06F 3/0421* (2013.01)

(58) Field of Classification Search
USPC ........... 345/156, 175, 176, 173, 8, 158, 633; 250/214 B; 372/108; 326/63; 349/69
See application file for complete search history.

(56) References Cited

U.S. PATENT DOCUMENTS

| | | | |
|---|---|---|---|
| 4,812,642 A | 3/1989 | Hasegawa et al. | |
| 4,855,590 A * | 8/1989 | Bures | G06F 3/0421 250/214 B |
| 5,698,845 A | 12/1997 | Kodama et al. | |
| 5,751,751 A * | 5/1998 | Hargis | H01S 3/0627 372/108 |
| 6,801,181 B2 * | 10/2004 | Matsumoto | G09G 3/3677 326/63 |
| 7,172,326 B2 | 2/2007 | Saccomanno | |
| 8,558,815 B2 | 10/2013 | Van Genechten et al. | |
| 2004/0145575 A1 | 7/2004 | Weindorf et al. | |

(Continued)

FOREIGN PATENT DOCUMENTS

| | | |
|---|---|---|
| EP | 0883195 A1 | 12/1998 |
| GB | 2206203 A | 12/1988 |

OTHER PUBLICATIONS

"Summons to Attend Oral Proceedings Pursuant to Rule 115(1) EPC" from EPO to corresponding European application 07447040.2 dated Jul. 25, 2014.

(Continued)

*Primary Examiner* — Thuy Pardo
(74) *Attorney, Agent, or Firm* — Bacon & Thomas, PLLC

(57) ABSTRACT

A touchscreen system for locating an opaque object in a target region, detects interruption of light beams. Each of the touchscreens have one or more optical emitters to create the beams, and one or more optical detectors to provide detection signals arranged to use emission wavelengths which are compatible with night vision apparatus, and having an NVIS radiance smaller than $1.7 \times 10^{-11}$ NR.

12 Claims, 3 Drawing Sheets

(56) References Cited

U.S. PATENT DOCUMENTS

2006/0153558 A1\* 7/2006 Tan ................. G01S 7/4811
396/155
2006/0187378 A1\* 8/2006 Bong ............... G02F 1/133603
349/69

OTHER PUBLICATIONS

MIL. Spec. No. MIL-L-85762A, "Lighting, Aircraft, Interior, Night Vision Imaging System (NVIS) Compatible," Aug 26, 1988, 57 pp.
Communication from European Patent Office corresponding to related European application 07 447 040.2-1527, mailed Sep. 24, 2012 (6 pages).

\* cited by examiner

NIGHT VISION TOUCHSCREEN

FIELD OF THE INVENTION

This invention relates to touchscreen systems, to touchscreens, to display systems having such touchscreens, and to circuitry or software for such apparatus.

DESCRIPTION OF THE RELATED ART

It is known to provide Infra Red (IR) touchscreens (commercially available or ruggedized) based on a set of IR transmitters (LEDs) being placed opposite to IR receivers (Usually IR phototransistors) where a touch is detected by pulsing a series of LEDs one by one and at the same time polling each time an oppositely aligned receiver. When the IR energy at the opposite receiver is not sufficiently high when polled at the moment the LED is pulsed, then the assumption is made that the beam formed by an LED and receiver pair is interrupted by a stylus or finger, which implies a touch somewhere along that beam. If an array of intersecting beams is provided, then coordinates of the location of the touch can be determined.

U.S. Pat. No. 4,855,590 shows a touch input system aimed at improving ambient light compensation while permitting the use of low cost, readily available components, without undesirable increases in the intensity of the light emitted by the LEDs. Individual light emitting devices and individual light detecting devices are aligned so that emitter-detector pairs are formed. Corresponding emitters and detectors are sequentially activated so that there is no interference between beams in close proximity. During the interval in which each emitter and corresponding receiver are activated, the emitter is pulsed or modulated at a frequency markedly different from the frequency at which ambient light and noise would vary. Signals due to ambient conditions can thus be disregarded by using appropriate detector circuitry and the varying signal from the pulsed or modulated emitter can be recognized. Failure to detect this modulated signal would then correlate to the presence of an opaque element blocking the particular emitter-detector pair. Each emitter is varied a plurality of times during its activation interval to distinguish the modulated or pulsed signal from spurious signals such as those caused by switching the detectors.

U.S. Pat. No. 5,698,845 shows a conventional photo-detecting apparatus utilizing a touch panel, comprising a plurality of light emitting elements such as LEDs and a plurality of light receiving elements such as phototransistors or photodiodes. These elements are arranged in opposed relationship to each other, and are selected respectively by selector circuits. To try to reduce the effects of aging, external disturbances, dispersion of optical components and vertical and lateral distance differences, and properly determining whether the light is interrupted or enabled to transmit, this document proposes optical detection apparatus having an oscillator, a modulation circuit for modulating so that a specifically modulated light is emitted from the light emitting element based on the output of the oscillator; a light receiving element for receiving the modulated light; and a demodulation circuit for detecting the received light, wherein the presence of a light interruption is determined on the basis of the output of the demodulation circuit. The demodulation involves comparing the output signal of the light receiving element and the output signal of the oscillator for determining the presence of a light interruption between the light emitting element and the light receiving element.

SUMMARY OF THE INVENTION

An object of the invention is to provide improved apparatus or methods.

According to an aspect, the present invention provides a touchscreen for locating an opaque object in a target region, by detecting interruption of light beams, the touchscreen having one or more optical emitters to create the beams, and one or more optical detectors to provide detection signals, arranged to use emission wavelengths which are compatible with night vision apparatus, and having an NVIS radiance smaller than $1.7 \times 10^{-11}$ NR when measured in accordance with paragraph 4.8.14 of MIL-L-85762A which appears in the Appendix in the currently updated form also known as MIL-STD-3009.

According to embodiments of the present invention, the touchscreen may have drive circuitry to modulate the emitters, and detection circuitry to detect the same modulation in the detection signals.

In a touchscreen according to embodiments of the present invention, the detection circuitry of a given one of the touchscreens may be synchronized to the drive circuitry. The detection circuitry may have an integrator coupled to an output of a switching inverter, the switching inverter being arranged to switch between outputting an inverted or not inverted version of a given detection signal, the switching being arranged to be in phase with the modulation of the corresponding emitters.

In a touchscreen according to embodiments of the present invention, the detection circuitry may have a comparator for comparing an output of the integrator with one or more thresholds, to determine an interruption of the corresponding beam and therefore indicate a touch.

According to embodiments of the present invention, the touchscreen may have circuitry for controlling an emission power of the emitters according to an output of the detection circuitry.

The touchscreen according to embodiments of the present invention may be arranged to create beams covering a planar target area. The touchscreen may have emitters and detectors mounted on a frame around the planar target area.

Particular and preferred aspects of the invention are set out in the accompanying independent and dependent claims. Any of the additional features can be combined together and combined with any of the aspects. Other advantages will be apparent to those skilled in the art, especially over other prior art. Numerous variations and modifications can be made without departing from the claims of the present invention.

Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF THE PREFERRED EMBODIMENTS

Figure 1:
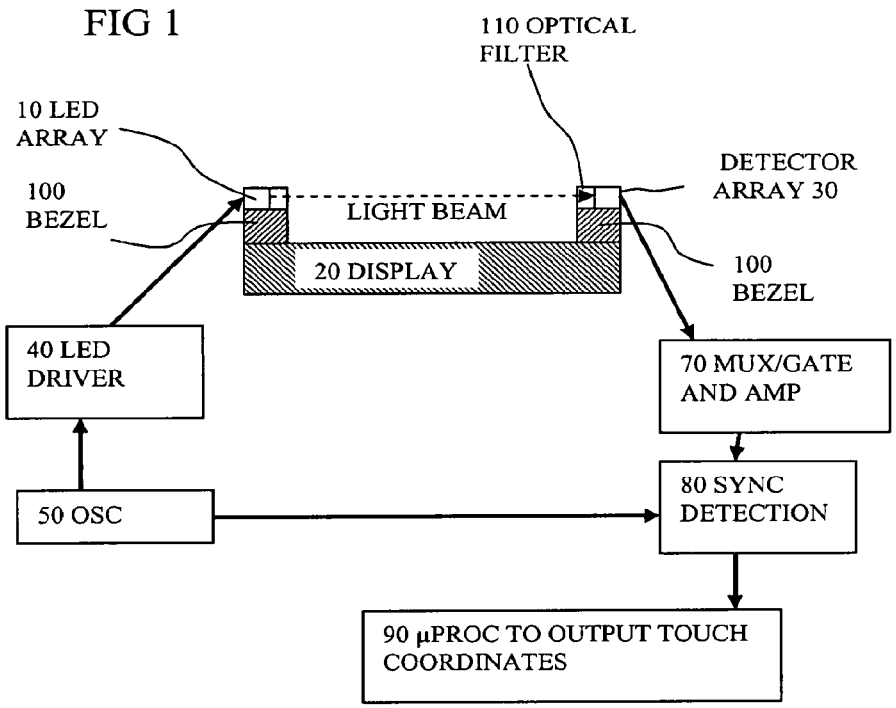
FIG. 1 shows an overall view of a touchscreen.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

References to numeric values or ranges are intended to be approximate.

References to optical are intended to encompass visible or non visible parts of the electromagnetic spectrum not limited to IR, or UV or X ray for example.

References to touchscreens are intended to encompass any optical detection system based on locating an opaque object by detecting interruption of light beams even if there is no screen, no display, nor anything to touch. The opaque object can be a finger, a stylus, or any object of any size. It can be for the purpose of pointing to enable a user to select an option, or for game playing, or for sensing presence or size for example. The target region can be of any size and can be a two dimensional area or a three dimensional space. It can be located in front of a display to enable selection of items shown on the display, or can be located elsewhere in principle, such as in free space.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Features of Touchscreens:

Touchscreens that use light beam interruption, typically use infrared beams and usually provide better performance in outdoor applications compared to capacitive or resistive types for example. Infrared touchscreens can exhibit high touch point density, can be operated with heavy gloves, are relatively cost efficient, exhibit good immunity to most false trigger sources, and are extremely rugged and weather sealable. Light sources, such as infrared photodiodes, are arranged in a row along two adjacent sides of a target region such as transparent screen arranged in front of a display such as an LCD or other type of display. Light detectors, such as photo detectors, are arranged opposite the light emitters along the two opposite adjacent sides of the touchscreen. In principle the multiple optical paths can be created by one emitter and multiple detectors, or multiple emitters and one detector, or multiple beams can be created by optical splitters or the like. When the infrared touchscreen is not being touched, the light beam from each of the light emitters crosses the screen and is received by the respective light detector. When a user touches the screen, one or more light beams are interrupted along each adjacent side so that the respective light detectors no longer receive the transmitted beams. Signals from the light detectors are sent to a controller which recognizes this signal interruption and determines the coordinates on the screen where the touch occurred, based on which optical paths were interrupted. The coordinates may be referenced to the display coordinates.

High ambient light conditions, such as direct sunlight, tend to saturate the light detectors and cause erratic operation of the touchscreen. It is known to use optical filters to address this. A broad band infrared filter can be used over the detectors to filter out ambient light and pass infrared radiation. Ambient light compensation schemes can detect the ambient light level and drive the light emitting devices to maintain the intensity of the emitted light at a level greater than the intensity of the ambient light. Physical shades can be used to shield the touchscreen from extraneous ambient light.

Dual Touchscreens

If two of these regular touchscreens (TS1 and TS2) are superimposed on the same display to form a dual touchscreen, without any means of synchronization (or coordination, so that they are not dependant on each other) then TS1 could be receiving energy from the LEDs of TS2. As the used transmitters, e.g. LEDs, typically have a rather large emitting beam (compared to the pitch of the receivers used on the sensor side), several LEDs of TS2 slightly displaced from the LED exactly opposite a given receiver of TS1, might illuminate that receiver. Hence, even if TS1 and TS2 are synchronized so that corresponding LEDs of TS2 and TS1 are not illuminated at the same time, there is still a possibility that a touch could be missed unless further measures are taken to make the screens independent. Different wavelengths of emissions and optical filtering could be used, but this on its own is unlikely to provide sufficient mutual independence and reliability at least for critical applications.

Figure 5:
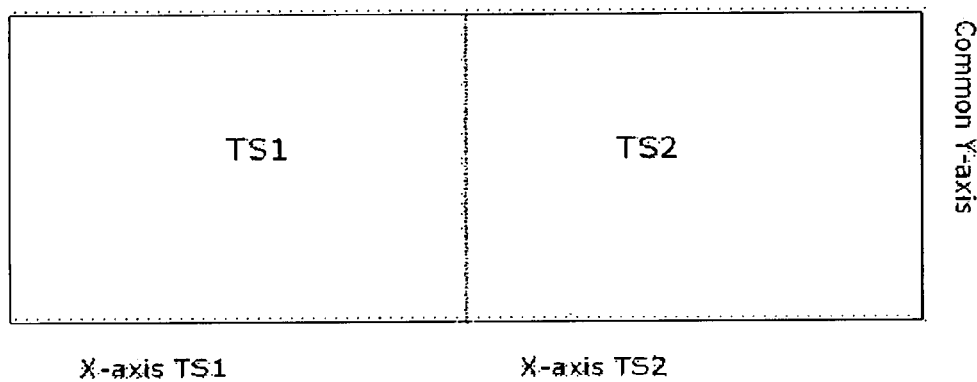
FIG. 5 shows an overall view of a dual touchscreen system according to embodiments of the present invention.

Alternatively, if two of such regular touchscreens (TS1 and TS2) are put adjacent each other on the same display to form a dual touchscreen, both touchscreens have one common scanning direction. For example, if they are next to each other, as illustrated in FIG. 5, the X-axis of both touchscreens will scan a different area whereas the Y-axis will scan the "same" area. In general this means that a large screen area can be divided into a number of smaller areas which are each being scanned by a separate touchscreen, each touchscreen having one scanning direction in common with at least one other touchscreen placed adjacent to it.

This explains why regular touchscreens cannot be combined easily to create a dual touchscreen. The embodiments of the invention described here involve a way of detection which enables the device to distinguish the emissions of its own emitters more clearly.

The LED emissions are based on a modulation according to a carrier frequency while the detectors use a synchronized detection (using the carrier frequency from the same source clock as for the LED: also called tone detection) on the receiver side. This helps to distinguish between the energy emitted by the opposite LED (synchronous frequency) and any other IR source emitting at the same time. The slightest difference in frequency and even almost same frequency but de-synchronized, (in other words with a phase difference), will cause the receiver to ignore this source and filter it out, while maintaining the capability of detecting the own synchronous frequency source (the opposite LED). By using two slightly different carrier frequencies for TS1 and TS2, a dual TS for simultaneous use without mutual interference is now feasible and functional. This tone detection mechanism not only improves immunity to mutual interference but also has the effect of making the touchscreen more immune to IR ambient light disturbance, even in very dynamic ambient light environments (such as those occurring in an airplane cockpit flying at the edge of the cloud deck). Thus higher ambient IR immunity than that of a normal type IR touchscreen can be achieved. This makes it useful for single touchscreens as well as dual redundant touchscreens. Thus the touchscreen can be useful for outdoor applications such as avionics usage, and for other high performance or life-critical applications. Three examples of dual IR touchscreen systems are as follows, though others can be envisaged:

1) based on standard widely available IR LEDs of approximately 850 nm wavelength at peak of their output spectrum, for life critical applications, not needing any night vision (NVIS) capability,
2) based on IR LEDs of 940 nm, including additional IR filtering on the Transmitter side, which will result in a NVIS compatible version
3) based on IR LEDs of 1300 nm, which then will be compliant with the most stringent NVIS A requirements.

The Optical sensors array can be based on well known building blocks mostly similar to conventional IR touchscreens, except for the 940 nm and 1300 nm versions where special precautions need to be taken to ensure the NVIS compatibility or compliance. For the 940 nm solution, this entails a narrow band-pass optical filter at the emitter side to filter out most of the IR energy situated below 900 nm. The same narrow-band filter is repeated at the receiver side, to avoid the IR receivers being saturated by energy outside the used IR band. For the 1300 nm solution, the emitter side filtering can be dispensed with, and some optical bandpass filtering can be applied at the receiver side to help avoid saturation of the IR receivers.

To ensure the fastest circuitry possible and to control better the sensibility at the receiver side, the IR receiver can be implemented using photodiodes instead of the usual phototransistors currently used in a regular IR touchscreen. The characteristics of such diodes then implies in most practical cases special electronic amplifying and filtering to achieve a readable and usable output while avoiding premature saturation in the first stage of the receiver electronics. An example of suitable receiver electronics will be described in more detail below.

Also on the receiver side in some cases there will be filtering, essentially to avoid saturation, using known techniques, and primarily as a means to establish High Ambient immunity. In our setup, it is useful to achieve the High Ambient immunity (without it the sensors risk saturation in High Ambient environment), but is not the primary factor to achieve the highest level possible in High Ambient immunity. The tone detector mechanism which will be described in more detail below can be arranged to multiply the immunity by a factor 2 to 3 in some cases.

Night Vision Compatible Touchscreens

Some embodiments of the present invention are intended for use with night vision apparatus such as cameras, sights or goggles arranged to amplify or image infra red wavelengths. In this case, the normally invisible LED emissions can become visible and interfere with the use of the display or the night vision apparatus. An NVIS compliant IR touchscreen cannot use the normal basic IR touchscreen technologies based on 850 nm LED (or close to 850 nm) as this is in the middle of the amplification spectrum of the NVIS goggles. This means an aura of light becomes visible all around the screen and depending on the scan rate, the actual beam scanning can become visible too. Existing commercial or ruggedized IR touchscreens are all based upon 850 nm IR based components (LED and usual phototransistors, but photodiodes can also be used), and therefore the normal IR touchscreen technology is rendered unusable for night vision. However at higher wavelengths, the detectors are typically less sensitive and so more susceptible to noise, thus producing more detection errors such as those caused by ambient light or other devices. If the emission power is increased to compensate, the NVIS radiance target is harder to achieve.

Some examples of embodiments of the present invention are aimed at applications such as use as part of an avionics display such that the touchscreen can be used while wearing NVIS goggles. Such touchscreen should not in any way deteriorate the optical qualities of the display as it is without touchscreen, hence any touchscreen technology that is based on resistive, capacitive, capacitive projected or any other touchscreen technology that requires a layer to be superposed on the existing optical stack cannot be used.

The Bezel of such touchscreen should not need to be larger or certainly not by much then a normal size bezel of an avionics display. Typical maximum dimension should around 6 mm thick and about 1 cm wide.

Accordingly no one has produced a practical full NVIS compatible IR touchscreen, defined by the combination of reliable detection of beams in noisy optical environments, low levels of emission at wavelengths amplified by night vision apparatus. Such a touchscreen can be defined as having, when fully operational (either in idle, no touch mode, as well as when in touch detected mode), an NVIS radiance smaller than $1.7 \times 10^{-11}$ NR when measured in accordance with paragraph 4.8.14 of MIL-L-85762A (obtainable from http://dodssp.daps.dla.mil), whatever the techniques used to achieve this low NVIS radiance number. Some existing IR touchscreens might be used in cooperation with generation 3 NVIS goggles as being acceptable for use, but never has been demonstrated that the $1.7 \times 10^{-11}$ NR can be achieved for such IR touchscreens.

Embodiments of the invention can encompass any type of NVIS compatible IR touchscreens that meets this requirement, regardless of how this is accomplished. Two examples are as follows though others can be envisaged.

1) based on IR LEDs of 1020 nm, including additional IR filtering on the Transmitter side, which will result in an NVIS compatible version.
2) based on IR LED of 1300 nm, which then will be compliant with the most stringent NVIS requirements without additional filtering.

Night Vision Compatible Example 1) Based on 1020 nm LED and Normal Silicium Based Photoreceivers.

As the 1020 nm LED still exhibits some radiation that is visible to the NVIS goggles, by merely replacing the LED on a standard IR TS, the goal of $10^{-11}$ will not be reached. The final steps to reach the requirement are based on the insertion of an interference filter with a very steep cut-off from 0% transparency below 1000 nm and more than 90% transparency above 1005 nm for incident angles larger than 85° (measured from the surface of the filter); additional mechanical construction and components location to guarantee that any light rays that could be incident on the filter are either at angles larger then 85° or are already low enough energy so that the requirement can be met. Furthermore, the use of IR absorbing paint on the mechanics and PCB coatings can improve this further; as can the use of synchronized detection on the receivers. Such detection helps enable use of only a very low amount of energy by the emitters to maintain a stable optical link useful for the IR TS application, while guaranteeing the requirement. An example of how to implement such synchronized detection is described in more detail below.

Night Vision Compatible Example 2) Based on the Use of 1300 nm IR Components.

The spectrum of the 1300 nm LEDs is such that they do not interfere at all with the NVIS goggles. However, the sensibility of the usual 1300 nm IR components is much weaker then the usual silicium based components, but is of course in direct relationship to the size of the components (real chip size as well as the size/diameter of the lenses mounted on top of them). As such it would be relatively easy to achieve an NVIS compatible IR touchscreen with rather large InGaAs based components as they are available on the market. However, the mechanical constraints prohibit the use of such large components. Further, the larger the components are, the larger the pitch, (meaning the farther they are placed from each other in terms of a center line of one pair to a center line of the next pair) and this has a direct impact on the inherent intrinsic precision of the coordinates determined and output by the IR touchscreen. To provide a sufficiently small pitch, smaller devices were used, but then the emitted output power may become lower, making the optical link then again very weak. The use of synchronized detection can compensate for this and enable a stable optical link, with the custom made small 1300 nm components. For a device with dimensions 3×2.2×1.5 (mm), as an example only, a radiant flux of 3 mW may be obtained at 20 mA. Due to the fact that there is no interference of the 1300 nm center wavelength LED with the goggles, this as such achieves a NVIS compatible touchscreen that can meet the constraints and the requirements set out above.

FIG. 1 Overall View of Touchscreen

FIG. 1 shows an example of a touchscreen according to an embodiment and arranged in front of a display 20 shown in cross-section, so the display is viewed from above in the figure. The touchscreen has an LED array 10 facing a detector array 30 at opposing sides of the display. Light beams pass across the display to be detected by the detector array, after passing through an optical filter 110 arranged in front of the detector array. Not shown for the sake of clarity are the light beams arranged perpendicular to the beam shown and thus normal to the page in this view. In some cases the optical filter can be dispensed with. A frame in the form of a bezel 100 is provided for spacing and mounting the arrays on the edges of the display. The LED array can be mounted on printed circuit boards and provided with an insulating layer if necessary to avoid short circuits if the bezel is formed of metal.

To complete the touchscreen assembly a protective face plate can be mounted over the array and display screen. The face plate can be coupled to the bezel in a manner which seals and protects the array and the display screen from damage, such as damage caused by impacts or weather.

Shown schematically are some of the circuits for producing the touch coordinates. These can be located on the same structure or circuit board as the arrays, or can be located elsewhere. A local oscillator 50 produces a carrier or tone for use in modulating the LEDs. The carrier is fed to a LED driver circuit 40 which is coupled to the LED array. The detector array is coupled to a circuit 70 arranged to multiplex or gate the signals from the detector array and amplify them before they pass to a synchronized detector 80. This is fed by the local oscillator 50 with the same carrier signal as used for driving the LEDs. The synchronized detector can be implemented in a number of ways to produce an output which is sensitive to the phase of the carrier as well as its frequency. In principle narrow band filters could be used, or a phase lock loop, but these would be relatively complex to implement with sufficient precision for many applications in terms of how well it can reject unwanted tones which are close in phase or frequency. An example of an integrator based synchronized detector will be described below in more detail. Based on the output of the detector for all the beams, a microprocessor circuit 90 can be used to determine and output touch coordinates. Clearly the light beams can be arranged to fill a three dimensional space if necessary and the circuitry be arranged to output three dimensional coordinates. Various other features can be added to suit particular requirements or applications.

Figure 2:
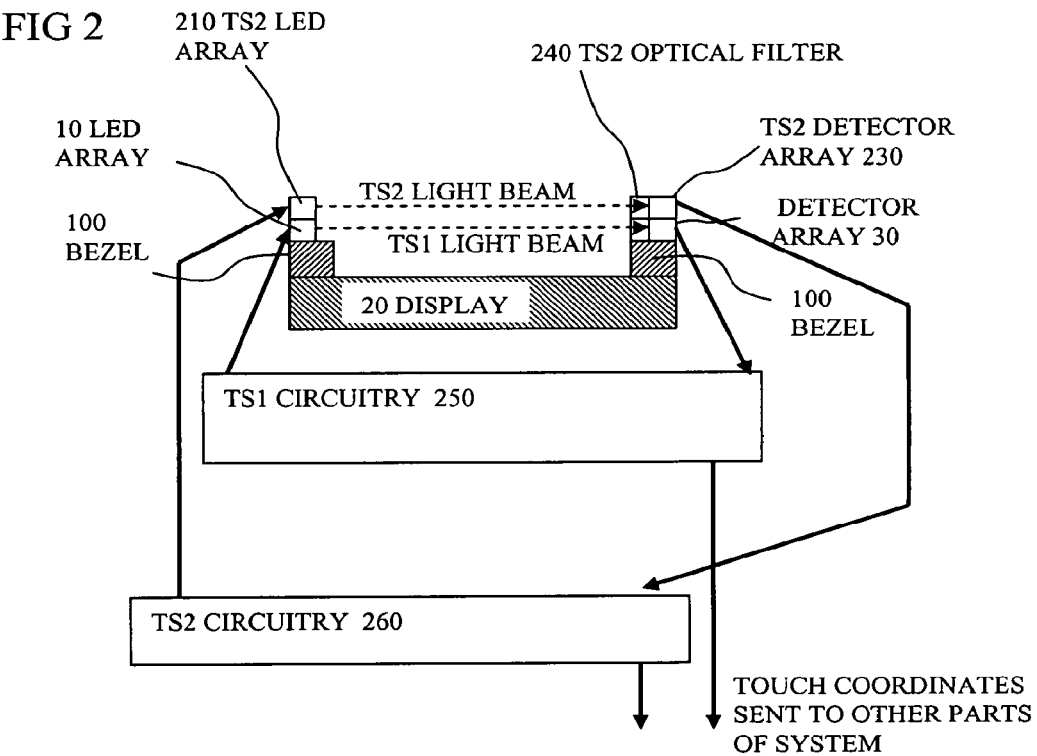
FIG. 2 shows an overall view of a dual touchscreen system according to embodiments of the present invention.

FIG. 2 Overall View of Dual Touchscreen System

FIG. 2 shows a similar touchscreen structure TS1 to that shown in FIG. 1, but with a second touchscreen TS2 overlaid. TS2 has its own LED array 210 placed to face a second detector array 230 and having its own optical filter 240. Hence some of the optical beams are for TS1 and some for TS2. As shown the beams for TS1 are closer to the display, but essentially both TS1 and TS2 have the same target region for touch detection. In principle the LEDS and detectors of TS1 and TS2 could be interleaved and so be in the same plane, though this may make construction more complex. Circuitry 250 is provided for TS1 for driving the LEDs and processing the detected signals, to output touch coordinates. Corresponding circuitry 260 is provided for driving the LEDs and processing the detected signals for TS2. In principle the circuitry could be shared by TS1 and TS2 but that would introduce some inter dependence and so reduce the effectiveness of the dual redundancy in protecting against failures. The touch coordinates could be fed to a selector or combiner to compare and decide what to output in the event of a difference, following established practice for dual redundancy. In some cases the circuitry can have a synchronized detector though other ways of achieving sufficient discrimination can be envisaged. Power supplies can be made independent also, for the two or more touchscreens.

Figure 3:
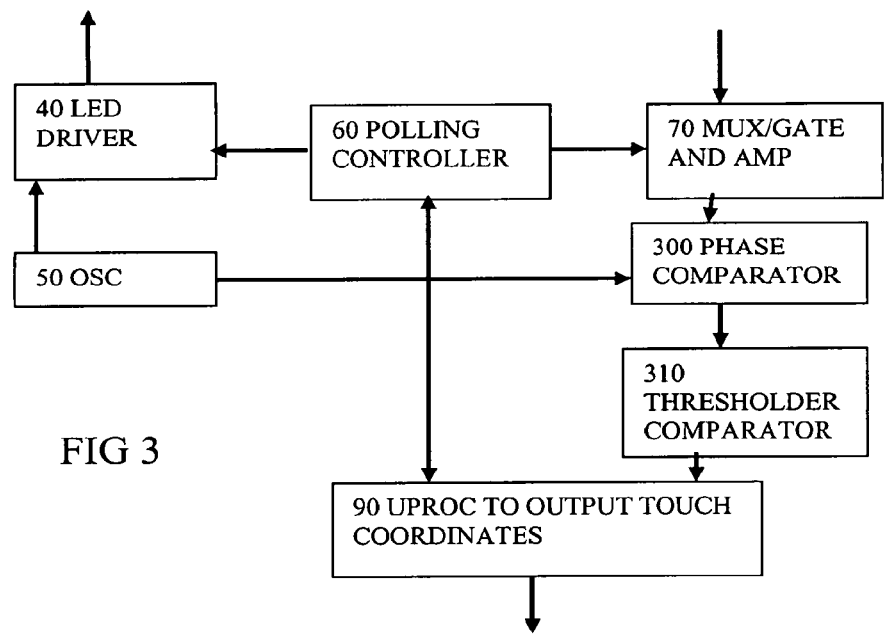
FIG. 3 shows circuitry having a Synchronised Detector.

FIG. 3 Circuitry Having Synchronised Detector

FIG. 3 shows an example of circuitry having a synchronized detector. This can be used with the touchscreen embodiments set out above, or with other embodiments. As described before for FIG. 1, there is a local oscillator 50 producing a carrier or tone for use in modulating the LEDs. The carrier is fed to a LED driver circuit 40 which is coupled to the LED array. The detector array is coupled to a circuit 70 arranged to multiplex or gate the signals from the detector array and amplify them before they pass to a synchronized detector in the form of a phase comparator 300 followed by a thresholder 310. The phase comparator is fed by the local oscillator 50 with the same carrier signal as used for driving the LEDs, and determines how close in phase are the two signals. There are various ways to implement this. The thresholder determines if the phase is sufficiently close to count as detecting the beam, otherwise a beam interruption is recorded.

A polling controller 60 is shown for controlling which beam or beams are active at a given time. As before, based on the output of the thresholder for all the beams, a microprocessor circuit 90 can be used to determine and output touch coordinates according to which beams have been interrupted.

Figure 4:
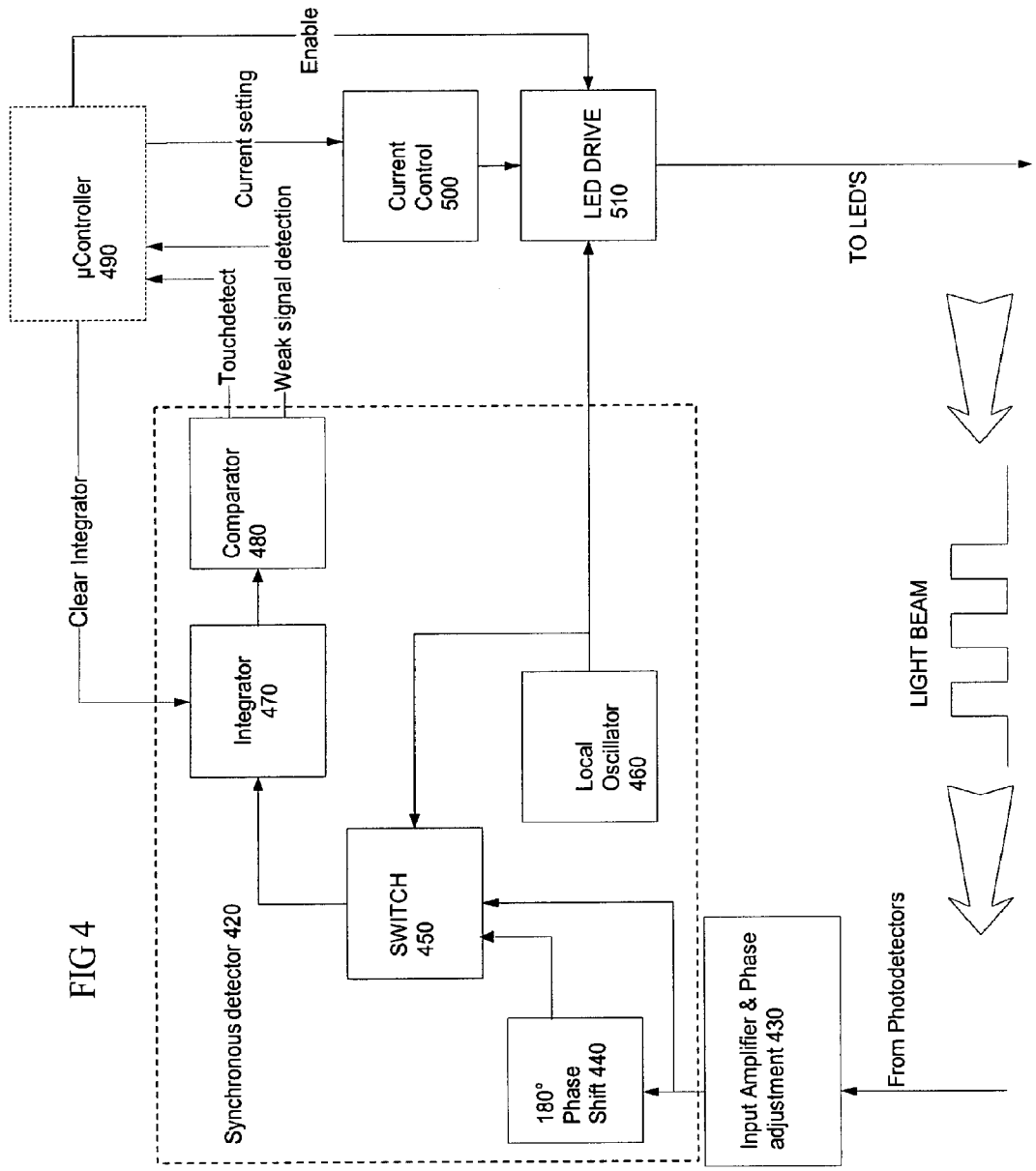
FIG. 4 shows an Integrator based Synchronised Detector.

FIG. 4 Integrator Based Synchronised Detector

FIG. 4 shows a synchronous detector 420 and various associated circuits. The signals from the detector array are processed first by an input amplifier and phase adjustment part. The amplifier is needed particularly if the detectors are photodiodes, as the photocurrents generated by photodiodes are very small (order of magnitude is a few nA). A phase adjustment is often needed to compensate for variations in characteristics of the detectors. This can be a one off adjustment fixed at the time of manufacture. The signals are then fed to the synchronous detector 420 which has a switching inverter formed in this case by a switch 450 which is fed by the detection signal and an inverted version of the same signal. The output is fed to an integrator 470. The switch feeds through either the signal or an inverted version, created by a 180° phase shifter 440. The switch is controlled by the carrier or tone used to drive the LEDs, using local oscillator 460. Hence for half a carrier period the original signal is passed through, and for the other half the inverted version is passed.

Thus if the signals received are in phase with the local oscillator, then the signal passed through to the integrator will not tend to cancel out, and the output of the integrator will decrease with time. The integrator output should converge to a stable state, no matter whether it is high or low. In contrast, noise tends to cancel out since it is inverted half the time.

A µController 490 is provided to output a signal to clear the integrator, and to control when to read an output of the integrator as a touch detect signal. The output of the integrator is compared to a threshold by comparator 480. Optionally more than one threshold can be used. If the signal is clearly above a high threshold, this can be output as a touch signal to the µController. If the signal is clearly below a lower threshold, this could be a no touch. If the signal is between the thresholds, measures such as increasing the LED current, could be taken to clearly determine a touch or no touch condition.

Also shown are a current control part 500 and an LED drive circuit 510. The controller 490 can be arranged to increase a drive current in the event of a weak signal being detected, to determine if the detection of the beam is dependent on this. This could be used just for set-up and tuning, or it could be used during the operation of the touchscreen to adapt to present conditions.

The detection circuitry can be implemented using any of many different technologies such as ASICs, discrete logic circuits, analogue signal processing circuitry, software controlled DSP circuitry, software controlled general purpose microprocessor circuitry and so on.

In principle the switch can be controlled by a signal based on an integer multiple or integer division of the local oscillator output, provided it is in phase, or phase locked to the modulation of the emitter. In principle there can be more than one local oscillator, for different ones of the emitter-detector pairs.

Applications:

As mentioned, the embodiments can find uses in any applications where high performance is needed in terms of ability to discriminate the touch detection amongst noise or other touchscreens, at lower emission powers, or where redundancy against failures is needed, or night vision compatibility, such as avionics displays, civil and military life critical applications. Some embodiments can find uses in any life critical applications that want to use touchscreen as primary means of user input for life critical data, where independent dual touchscreen is necessary. Any avionics integrator interested in implementing touchscreen into the cockpit, competitor avionics display manufacturers that want to integrate touchscreen for life critical applications, other system integrators in military or civil markets where life critical applications based on displays are in use.

Other variations, features and advantages can be envisaged by those skilled in the art, within the scope of the claims.

APPENDIX
| METRIC |
|---|
MIL-STD-3009
<u>2 February 2001</u>
SUPERSEDING
MIL-L-85762A
DEPARTMENT OF DEFENSE
INTERFACE STANDARD
LIGHTING, AIRCRAFT,
NIGHT VISION IMAGING SYSTEM
(NVIS) COMPATIBLE
AMSC: N/A      AREA: GDRQ
DISTRIBUTION STATEMENT A. Approved for public release; distribution is unlimited.

MIL-STD-3009

FOREWORD

1. MIL-L-85762A was published in 1988 and served very well for eleven years as the standard definition and interface criteria for NVIS compatibility. This new document (MIL-STD-3009) was derived from MIL-L-85762A as a way to preserve this widely accepted standard definition, and to comply with the Perry directive. In compliance with the Perry directive, this document no longer contains the lighting system design requirements that were in MIL-L-85762; it now deals only with interface and performance requirements.

2. It is assumed that any contract for lighting equipment includes a Technical Requirements Document (TRD) (or similar document) that specifies the operational features of the lighting equipment. Such a TRD should reference this standard as the NVIS compatibility requirement when full compatibility between a specific class of NVIS and an aircraft is intended. The system specification requirements of an aircraft lighting system must be derived from other documents, after tailoring, such as JSSG-2010-5.

3. This document maintains exactly the same technical criteria for Class A and Class B NVIS compatibility as was required by MIL-L-85762. It also adds discussion of Class C NVIS (colloquially known as "leaky green"). Class C NVIS are generally compatible with crewstation lighting that is class B compliant, so there are not yet any unique requirements for class C compatibility. This standard also adds exterior lighting compatibility definitions and criteria.

4. Besides the original APPENDIX A and APPENDIX B, this document adds a third appendix (APPENDIX C), which provides rationale to explain the requirements in this standard and was derived from a technical report originally published by the Navy.

5. Beneficial comments (recommendations, additions, and deletions) and any pertinent data which may be of use in improving this document should be addressed to ASC/ENFC, 2530 Loop Road West, Wright-Patterson AFB OH 45433-7101.

MIL-STD-3009

CONTENTS

Paragraph          Page

LIGHTING, AIRCRAFT, NIGHT VISION IMAGING SYSTEM (NVIS) COMPATIBLE .....1
1. SCOPE......................................................................................................................1
   1.1 Scope.................................................................................................................1
   1.2 Purpose. ...........................................................................................................1
   1.3 Classification.....................................................................................................1
2. APPLICABLE DOCUMENTS .....................................................................................2
   2.1 General. ............................................................................................................2
   2.2 Government documents....................................................................................2
   2.2.1 Specifications, standards, and handbooks....................................................2
   2.2.2 Other Government publications. ...................................................................3
   2.3 Order of precedence.........................................................................................3
3. DEFINITIONS.............................................................................................................4
   3.1 Night Vision Imaging System (NVIS)................................................................4
   3.2 NVIS lighting compatibility................................................................................4
   3.3 Lighting system. ................................................................................................5
   3.4 Lighting subsystem............................................................................................5
   3.5 Crewstation or compartment. ...........................................................................5
   3.6 Interior lighting...................................................................................................5
   3.7 CIE color coordinate system. ...........................................................................6
   3.8 NVIS radiance. .................................................................................................6
   3.9 Rated drive condition........................................................................................6
   3.10 Light leaks.......................................................................................................6
   3.11 Contrast vs contrast ratio. ...............................................................................6
   3.12 Electronic and/or electro-optical displays. ......................................................6
   3.13 IR mode..........................................................................................................6
4. REQUIREMENTS.......................................................................................................7
   4.1. Description ......................................................................................................7
   4.2 System integration. ...........................................................................................8
   4.2.1 Lighting provisions..........................................................................................8
   4.2.2 Compartment lighting. ....................................................................................8
   4.2.3 Emergency exit lighting...................................................................................8
   4.2.4 Crewstation controls and control handles......................................................9
   4.2.5 Caution and advisory signals.........................................................................9
   4.2.6 Jump lights. ...................................................................................................9
   4.2.7 Work and inspection lights. ...........................................................................9
   4.2.8 Map and utility lights. .....................................................................................9
   4.3 Performance. ....................................................................................................9
   4.3.1 Daylight legibility and readability. ...................................................................9
   4.3.2 Night operations. ...........................................................................................9
   4.3.3 Luminance and illuminance. ..........................................................................9
   4.3.4 Chromaticity. ................................................................................................10
   4.3.5 Spectral radiance limits. ..............................................................................16
   4.3.5.1 Primary lighting radiance. .........................................................................16

MIL-STD-3009

CONTENTS – Continued.

| Paragraph | Page |
|---|---|
| 4.3.6 Light leaks. | 18 |
| 4.3.7 Luminance uniformity. | 18 |
| 4.3.8 Crewstation reflections. | 18 |
| 4.4 Luminance balance. | 18 |
| 4.5 Exterior lighting subsystems. | 18 |
| 4.5.1 Anticollision lighting. | 18 |
| 4.5.2 Position lights. | 18 |
| 4.5.3 Tanker boom marker and nozzle illumination. | 19 |
| 4.5.4 Formation lights. | 19 |
| 5. VERIFICATION | 20 |
| 5.1 System level verification. | 20 |
| 5.2 Inspection conditions. | 20 |
| 5.3 Order of inspection. | 20 |
| 5.4 Lighting conditions. | 20 |
| 5.5 Test set up verification. | 21 |
| 5.6 Test set up. | 21 |
| 5.7 Inspection methods and procedures. | 21 |
| 5.7.1 Lighting system unaided eye inspection. | 21 |
| 5.7.2 Lighting system NVIS compatible examination. | 21 |
| 5.7.3 Luminance uniformity. | 22 |
| 5.7.4 Crewstation reflections. | 22 |
| 5.7.5 Visual examination. | 22 |
| 5.7.6 Operation. | 22 |
| 5.7.7 Environmental operating tests. | 23 |
| 5.7.8 Electromagnetic interference (EMI) tests. | 23 |
| 5.7.9 Electromagnetic compatibility (EMC) tests. | 23 |
| 5.7.10 Luminance and illuminance measurements. | 23 |
| 5.7.11 Chromaticity measurements. | 24 |
| 5.7.12 Spectral radiance measurements. | 27 |
| 5.7.13 Light leak inspection. | 33 |
| 5.8 Exterior lighting verification. | 33 |
| 5.8.1 Anticollision lighting verification. | 33 |
| 5.8.2 Position lights verification. | 33 |
| 5.8.3 Tanker boom marker and nozzle illumination verification. | 33 |
| 5.8.4 Formation lights verification. | 34 |
| 6. NOTES | 35 |
| 6.1 Intended use. | 35 |
| 6.2 Issue of DODISS. | 35 |
| 6.3 International standardization. | 35 |
| 6.4 Rationale. | 35 |
| 6.5 Subject term (keyword) listing. | 35 |
| 6.6 Metrication. | 36 |

MIL-STD-3009

CONTENTS – Continued.

| Paragraph | Page |
|---|---|
| APPENDIX A: SPECTRAL RADIANCE, LUMINANCE, AND ILLUMINANCE MEASURING EQUIPMENT | 37 |
| A.1 SCOPE | 37 |
| A.1.1 Scope. | 37 |
| A.2 APPLICABLE DOCUMENTS | 37 |
| A.3 SPECTRORADIOMETER | 37 |
| A.3.1 Chromaticity and spectral radiance measurement. | 37 |
| A.3.2 Spectroradiometer sensitivity. | 37 |
| A.3.2.1 Spectroradiometer sensitivity calibration. | 38 |
| A.3.3 Wavelength accuracy and repeatability. | 38 |
| A.3.3.1 Wavelength accuracy and repeatability verification. | 38 |
| A.3.4 Current resolution. | 39 |
| A.3.5 Zero drift. | 39 |
| A.3.6 Linearity. | 39 |
| A.3.6.1 Linearity verification. | 39 |
| A.3.7 Signal conditioning. | 40 |
| A.3.8 Stray light. | 40 |
| A.3.8.1 Stray light verification. | 40 |
| A.3.9 Spectroradiometer optics. | 40 |
| A.3.10 Spectroradiometer viewing system. | 40 |
| A.3.10.1 Spectroradiometer viewing verification. | 41 |
| A.3.11 Spectroradiometer accuracy. | 41 |
| A.3.11.1 Spectroradiometer accuracy verification. | 41 |
| A.4 PHOTOMETER | 41 |
| A.4.1 Luminance measurement equipment. | 41 |
| A.4.2 Photometer calibration. | 42 |
| A.4.2.1 Photometer sensitivity. | 42 |
| A.4.2.2 Photometer accuracy. | 42 |
| A.4.2.3 Photometer sensitivity and accuracy verification. | 42 |
| A.4.3 Readout resolution. | 42 |
| A.4.4 Photometer optics. | 42 |
| A.4.5 Photometer viewing system. | 42 |
| A.4.5.1 Photometer viewing system verification. | 43 |
| A.4.6 Photometer polarization error. | 43 |
| A.4.6.1 Photometer polarization error verification. | 43 |
| A.4.7 Colorimetry. | 43 |
| A.5 REFLECTANCE STANDARD | 44 |
| A.5.1 Reflectance standard. | 44 |
| A.5.1.1 Reflectance standard verification. | 44 |
| A.6 NOTES | 44 |
| A.6.1 Filter. | 44 |

MIL-STD-3009

CONTENTS – Continued.

| Paragraph | Page |
|---|---|
| APPENDIX B: SAMPLE CALCULATIONS | 45 |
| B.1 SCOPE | 45 |
|   B.1.1 Scope. | 45 |
| B.2 APPLICABLE DOCUMENTS | 45 |
| B.3 NVIS RADIANCE CALCULATIONS | 45 |
| B.4 CHROMATICITY CALCULATIONS | 46 |
| APPENDIX C: RATIONALE BEHIND THE REQUIREMENTS CONTAINED IN LIGHTING, AIRCRAFT, INTERIOR, NIGHT VISION IMAGING SYSTEM (NVIS) COMPATIBLE | 52 |
| C.1. SCOPE | 52 |
|   C.1.1 Scope. | 52 |
| C.2. APPLICABLE DOCUMENTS | 52 |
| C.3. RATIONALE FOR THIS DOCUMENT | 52 |
|   C.3.2 Summary. | 52 |
|   C.3.3 Background. | 53 |
|   C.3.4 NVIS background. | 53 |
| C.4. DISCUSSION | 56 |
|   C.4.1 Interactions. | 56 |
|   C.4.2 Classification. | 57 |
| C.5. REQUIREMENTS | 63 |
|   C.5.1 NVIS sensitivity characteristics. | 63 |
|   C.5.2 Mockup. | 63 |
|   C.5.3 Light sources. | 63 |
|   C.5.4 Compartment lighting. | 64 |
|   C.5.5 Emergency exit lighting. | 64 |
|   C.5.6 Jump lights. | 64 |
|   C.5.7 Work, map, and inspection lights. | 64 |
|   C.5.8 Daylight legibility and readability. | 64 |
|   C.5.9 Daylight legibility and readability of illuminated visual signals. | 65 |
|   C.5.10 Daylight legibility and readability of electronic and electro-optical displays. | 65 |
|   C.5.11 Minimum contrast requirements. | 66 |
|   C.5.12 Compensation multipliers. | 66 |
|   C.5.13 Minimum difference luminance | 67 |
| C.6. CHROMATICITY | 67 |
|   C.6.1 Background of chromaticity requirements. | 67 |
|   C.6.2 Utility lights, work, inspection light, and compartment light chromaticity. | 70 |
|   C.6.3 Caution, advisory, warning and master caution lights chromaticity. | 70 |
| C.7. SPECTRAL RADIANCE LIMITS | 71 |
|   C.7.1 Background of spectral radiance limits. | 71 |
|   C.7.2 Monochromatic display radiance. | 76 |
|   C.7.3 Multi-color display radiance. | 76 |
|   C.7.4 Warning and master caution signal and emergency exit lighting radiance | 77 |
|   C.7.5 Jump light radiance. | 78 |

MIL-STD-3009

CONTENTS – Continued.

| Paragraph | Page |
|---|---|
| C.7.6 Head up display (HUD) system radiance. | 78 |
| C.7.8 Light leaks. | 79 |
| C.7.9 Luminance uniformity. | 79 |
| C.7.10 Maintenance trimming controls (MIL-L-85762 only); now called Luminance balance. | 79 |
| C.7.11 Verification (quality assurance provisions in MIL-L-85762). | 79 |
|     C.7.11.1 Lighting conditions. | 80 |
|     C.7.11.2 Lighting system NVIS compatibility examination. | 80 |
|     C.7.11.3 Chromaticity measurements. | 80 |
|     C.7.11.4 Spectral radiance measurements. | 80 |
|     C.7.11.5 Light leak inspection. | 81 |
|     C.7.11.6 Daylight legibility and readability inspection (no longer included in the standard). | 82 |
| C.7.12 Additional information. | 82 |
|     C.7.12.1 Rationale for spectroradiometer requirements. | 84 |
|     C.7.12.2 Rationale for photometer requirements. | 84 |
| C.8. SUMMARY AND CONCLUSIONS | 84 |
| C.9. REFERENCES | 85 |

TABLES

| | Page |
|---|---|
| TABLE I. General lighting for crew stations and compartments. * | 8 |
| TABLE II. Chromaticity requirements. | 13 |
| Table III. NVIS radiance requirements (metric units) | 14 |
| TABLE III.a. NVIS radiance requirements using English units. | 15 |
| TABLE IV. Relative spectral response of Class A NVIS ($G_A(\lambda)$) | 30 |
| TABLE V. Relative spectral response of Class B NVIS ($G_B(\lambda)$) | 31 |

FIGURES

| | Page |
|---|---|
| FIGURE 1. Relative spectral response characteristics of Classes A, B, and C NVIS. | 7 |
| FIGURE 2. NVIS lighting color limits. | 11 |
| FIGURE B-1. Spectral output of example signal at rated drive conditions (6.1108 cd/m2) (1.7839fL) - Continued. | 49 |
| FIGURE B-2. Spectral output of example signal at 0.343 cd/m$^2$ (0.I fL). | 50 |
| FIGURE B-2. Spectral output of example signal at 0.343 cd/m$^2$ (0.I fL) - Continued. | 51 |
| FIGURE C-1. Diagram of an image intensifier. | 54 |
| FIGURE C-2. Conceptual diagram of the spectral distribution of NVIS-compatible lighting. | 55 |
| FIGURE C-3. NVIS interfaces. | 56 |
| FIGURE C-4. Spectral transmission requirements for a Class A NVIS objective lens. | 60 |
| FIGURE C-5. Spectral transmission requirements for a Class B NVIS objective lens. | 61 |

MIL-STD-3009

CONTENTS – Continued.

Paragraph                                                                                                                                          Page FIGURE C-6. Spectral transmission requirements for a Class C NVIS objective lens. 62
FIGURE C-7. "Optimum" and "poor" theoretical spectral distributions. ........................ 73
FIGURE C-8. ................. Normalized spectral sensitivity curve for a third-generation image
　　　　　　　intensifier tube. ........................................................................ 82
FIGURE C-9. Spectral distribution of starlight. .......................................................... 83
FIGURE C-10. Spectral reflectivity of tree bark. ........................................................ 83

MIL-STD-3009

LIGHTING, AIRCRAFT, NIGHT VISION IMAGING SYSTEM (NVIS) COMPATIBLE

This document is approved for use by the Department of the Air Force and is available for use by all Departments and Agencies of the Department of Defense.

1. SCOPE

1.1 Scope.
This standard establishes requirements for the emission characteristics of aircraft lighting and display equipment that is intended for use with night vision imaging systems (NVIS). It is applicable to all systems, subsystems, component equipment, and hardware that provide the lighting environment on aircraft where NVIS are employed. This document is applicable to NVIS specific performance requirements but it does not contain general lighting requirements. The contracting activity should extract and tailor applicable general lighting requirements from JSSG-2010-5 and include those requirements in the contract.

1.2 Purpose.
The purpose of this document is to provide interface requirements and testing methodology to ensure compatible and standardized aircraft interior lighting for NVIS compatibility.

1.3 Classification.
Night vision imaging system (NVIS) compatible aircraft interior lighting is divided into the following types and classes.

> Type I    Lighting compatible with any direct view image NVIS (see 3.1.1) utilizing Generation III image intensifier tubes.
>
> Type II    Lighting compatible with any projected image NVIS (see 3.1.2) utilizing Generation III image intensifier tubes.
>
> > Class A    Lighting compatible with NVIS utilizing 625 nm minus blue objective lens filters (see 3.1.3) with the specifications in FIGURE 1.
> >
> > Class B    Lighting compatible with NVIS utilizing 665 nm minus blue objective lens filters (see 3.1.4) with the specifications in FIGURE 1.

MIL-STD-3009

Class C  Lighting compatible with NVIS having a "green leak" as shown in FIGURE 1. This edition of this document assumes that lighting meeting class B compatibility criteria is also compatible with Class C NVIS.

2. APPLICABLE DOCUMENTS

2.1 General.

The documents listed in this section are specified in sections 4 and 5 of this document. This section does not include documents cited in other sections of this document or recommended for additional information or as examples. While every effort has been made to ensure the completeness of this list, document users are cautioned that they must meet all specified requirements documents cited in sections 4 and 5 of this document, whether or not they are listed.

2.2 Government documents.

2.2.1 Specifications, standards, and handbooks.

The following specifications, standards, and handbooks form a part of this document to the extent specified herein. Unless otherwise specified, the issues of these documents are those listed in the issue of the Department of Defense Index of Specifications and Standards (DoDISS) and supplement thereto, cited in the solicitation (see 6.2).

HANDBOOKS

DEPARTMENT OF DEFENSE

JSSG-2010-3  Joint Service Specification Guide – Crew Systems – Cockpit/Crew Station/Cabin Handbook JSSG-2010-5  Joint Service Specification Guide – Crew Systems – Aircraft Lighting Handbook JSSG documents can be obtained from ASC/ENOI, Bldg 560, 2530 Loop Road West, Wright-Patterson AFB OH 45433-7101

MIL-HDBK-87213  Electronically/Optically Generated Airborne Displays (Unless otherwise indicated, copies of the above specifications, standards, and handbooks are available from the Standardization Documents Order Desk, 700 Robbins Avenue, Building 4D, Philadelphia, PA 19111-5094.) (Copies of those documents indicated with a distribution limitation may be obtained from ASC/ENOI, 2530 Loop Rd West, Bldg. 560, Wright-Patterson AFB, OH 45433-7101. Telephone (937) 255-6296; DSN 785-6296.)

MIL-STD-3009

2.2.2 Other Government publications.
The following other Government publications form a part of this standard to the extent specified herein. Unless otherwise specified, the issues are those cited in the solicitation (see 6.2).

TITLE 14 CODE OF FEDERAL REGULATIONS

FAR Part 23 - Airworthiness Standards: Normal, Utility, Acrobatic, and Commuter Category Airplanes FAR Part 25 - Airworthiness Standards: Transport Category Airplanes (Copies of Federal Aviation Administration Regulations may be viewed at http://www.faa.gov/avr/AFS/FARS/, or may be obtained from the Federal Aviation Administration, 800 Independence Ave., SW, Washington, DC 20591.)

2.3 Order of precedence.
In the event of a conflict between the text of this document and the references cited herein, the text of this document takes precedence. Nothing in this document, however, supersedes applicable laws and regulations unless a specific exemption has been obtained.

MIL-STD-3009

3. DEFINITIONS

3.1 Night Vision Imaging System (NVIS).
A system that uses image intensifier tubes to produce an enhanced image of a scene in light conditions too low for normal navigation and pilotage.

3.1.1 Direct View Image NVIS (Type I).
Any NVIS that uses generation III image intensifier tubes and displays the intensified image on a phosphor screen in the user's direct line of sight.

3.1.2 Projected Image NVIS (Type II).
Any NVIS that uses generation III, image intensifier tubes and projects the intensified image on a see through medium in the user's line of sight. This configuration allows simultaneous viewing of the intensified image and visual cues such as HUD symbology.

3.1.3 Class A NVIS.
Any NVIS with characteristics as shown in FIGURE 1. Class A NVIS is not compatible with red cockpit lights because of the overlap between the spectrum of red light and the sensitivity of Class A NVIS.

3.1.4 Class B NVIS.
Any NVIS with characteristics as shown in FIGURE 1. A Class B NVIS is compatible with NVIS Red and therefore is compatible with properly filtered red lights and color electronic displays that meet the requirements of TABLE II and TABLE III. When specified in TABLE III, certain components are required to meet Class A NVIS compatibility requirements in order to facilitate interchangeability of equipment.

3.1.5 Class C NVIS.
Some aircraft have HUDs that use a hologram as the reflective element in the combining glass. Holograms typically work with only one wavelength of light. This feature can be used to improve the efficiency and see-through clarity of the HUD, but it means the light coming from the HUD is concentrated at one wavelength. Since this wavelength is in the green part of the spectrum and is blocked by the minus blue filter in the NVIS, it is nearly impossible to see a holograph HUD with Class A or B NVIS. Consequently, modified NVIS have been built and tested which have a "notch" or "leak" in the green part of the spectrum. The Class C filter is sometimes called the "leaky green" filter. See the spectral plots of Class A, B, C that are shown in FIGURE 1 and the requirements for Class C NVIS FIGURE C-6 at APPENDIX C.

3.2 NVIS lighting compatibility

3.2.1 Compatible interior lighting.
The aircraft interior lighting that provides acquisition of aircraft interior information with the unaided eye without degrading the image intensification capabilities of the NVIS during night flight operations. Conforming to the detailed performance and test requirements specified herein shall be considered as meeting this definition.

MIL-STD-3009

3.2.2 Secure.
An Army definition, often applied to ground vehicles and equipment, meaning that the visible light emitted is reduced to the minimum needed to do the mission, and the near IR content is reduced to less than an estimated 5% of the visible light.

3.2.3 Friendly.
Exterior lighting that is fully usable by people without NVIS (i.e., typically meets FAA requirements for visibility and chromaticity) but has drastically reduced IR content so that it can be used while flying formation with aircraft in which NVIS are being used (for example, going to and from a training site through civilian airspace).

3.2.4 Covert.
IR lights or lights that are typically filtered so they are not visible to the naked eye beyond approximately 20 to 30 feet. These lights may be intended to provide illumination so that NVIS will work without adequate natural light.

3.3 Lighting system.
All devices that emit or transmit light within the flight deck or other crew compartments.

3.4 Lighting subsystem.
All devices that emit or transmit light within the flight deck or other crew compartments and are attached to the aircraft power via a common dimmer control.

3.5 Crewstation or compartment.
All work stations or compartments within the aircraft in which the air crewmember is required to use NVIS in the performance of duties.

3.6 Interior lighting.
All lighting within the aircraft including but not restricted to the following lighting systems:

a. Instrument
  - Primary
  - Secondary
b. Console
  - Primary
  - Secondary
c. Emergency
d. Warning, caution, and advisory displays and indicators
e. Utility
f. Controls (knobs, handles, push buttons)
g. Compartment
h. Work and inspection lights
i. Jump lights

MIL-STD-3009

3.7 CIE color coordinate system.

The fundamental definitions of color are expressed in terms of the "standard observer" and coordinate system adopted by the International Commission on Illumination (C.I.E.) at Cambridge, England, in 1931 and published in the Journal of the Optical Society of America, Vol. 23, page 359, October 1933. Wherever chromaticity coordinates (x, y, z) appear in this document, they relate to this system. The CIE 1976 uniform chromaticity scale (UCS) diagram is the CIE 1931 chromaticity diagram redrawn with the x and y axes subjected to a linear transformation as defined in CIE Publication 15, Supplement 2, 1978.

3.8 NVIS radiance.

NVIS radiance is the amount of energy emitted by a light source that is visible through NVIS. NVIS radiance is defined as the integral of the curve generated by multiplying the spectral radiance of a light source by the relative spectral response of the NVIS defined in TABLE III or TABLE III.a, as appropriate.

3.9 Rated drive condition.

Rated drive condition(s) are the electrical power state(s) obtained by conformance to the allowable electrical characteristics (voltage, current, pulse width modulation, frequency, etc.) in MIL-STD-704 for the various lighting components or systems in meeting specified lighting levels.

3.10 Light leaks.

Visual evidence through the NVIS of light emitted from a component from areas that are not intended to be illuminated (non-compatible unfiltered light leaks).

3.11 Contrast vs. contrast ratio.

Contrast ($C_L$, $C_I$ and $C_{UL}$), as specified in this document, is one less than contrast ratio, which is defined as $L_2/L_1$ in some specifications.

3.12 Electronic and/or electro-optical displays.

All displays capable of presenting a variety of different images on their screen; the displayed portrayals being generated through direct electronic modulation or through indirect electro-optical modulation of emitted, transmitted, or reflected light luminance levels, contrasts, and/or chromaticities. These displays may present characters, numerals, symbols, graphics, or video. They are based on a CRT, a dot matrix technology, or a segmented design, and may, or may not be, capable of portraying shades of gray.

3.13 IR mode.

The infrared (IR) or covert mode for exterior lighting is defined as not viewable by a dark-adapted, unaided eye at a distance greater than 30 feet, in the dark (i.e., less than 1.0 footcandle ambient illumination), and when the system is on the ground. The mode shall be viewable by NVIS at minimum distance of 3 NM in the air, at night, with a ¾ to full moon, and with all other system exterior lights off. "Lower hemisphere" shall be defined as not viewable by an NVIS equipped ground or aerial observer when the system is directly overhead, straight and level, and at 300 to 500 feet away.

MIL-STD-3009

4. REQUIREMENTS

4.1. Description

This document defines the radiant energy interface requirements and test procedures applicable to NVIS compatible lighting systems for new or modified aircraft lighting equipment and crew stations. FIGURE 1 is the assumed NVIS spectral response characteristics that shall be used to define NVIS compatibility criteria herein.

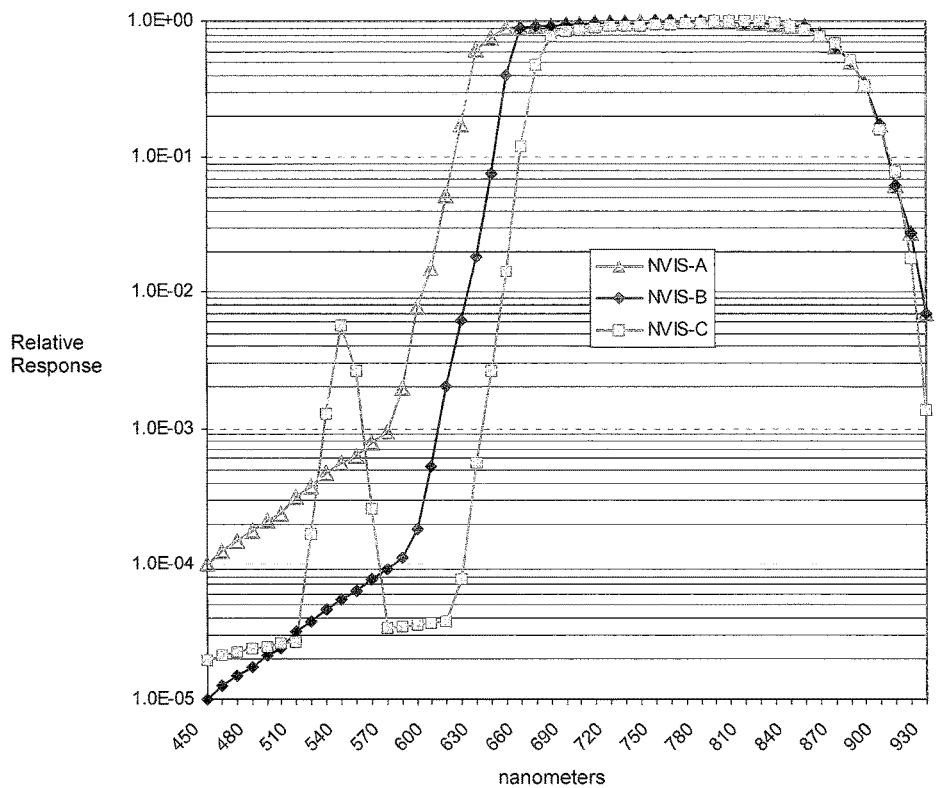

FIGURE 1. Relative spectral response characteristics of Classes A, B, and C NVIS.

MIL-STD-3009

4.2 System integration.
The design of the lighting equipment shall not interfere with the operation of the system at night, with or without NVIS, or during the daytime.

4.2.1 Lighting provisions.
The design and location of the lighting equipment shall optimize visual performance and minimize the effects on NVIS. The lights shall not cause direct or indirect glare or interfere with the aircrew member's interior or exterior unaided vision and with the image intensification capabilities of the NVIS.

4.2.2 Compartment lighting.
Illuminance levels shall be as required by TABLE I, unless otherwise specified by the acquiring activity. Chromaticity and spectral radiance limits shall be as specified in TABLE II and TABLE III, respectively.

TABLE I. General lighting for crew stations and compartments. *

|  | ILLUMINATED LEVEL IN LUX AND (FOOT CANDLES) AT RATED DRIVE CONDITION | |
| --- | --- | --- |
|  | MIN | MAX |
| CREWSTATION AREA, GENERAL ILLUMINATION | 10.8 (1) (Aisle floor) | 215 (20) (Crew lap level) |
| CONTROL PANELS NOT ILLUMINATED (REQUIRING IN-FLIGHT ADJUSTMENT AND OPERATION) | 54 (5) | 108 (10) |
| INSTRUMENT PANEL AND CONSOLES | 21.5 (2) | 108 (10) |
| PASSAGEWAYS AND AISLES (ON FLOOR) | 2.15 (0.2) | 54 (5) |
| CARGO COMPARTMENT (ON FLOOR) | 2.15 (0.2) | 54 (5) |
| LOADING AND RAMP AREAS (ON FLOOR) | 21.5 (2) | 10.8 (10) |
| CREWSTATION LOCATIONS FOR NAVIGATIONAL AND SYSTEMS COMPUTATIONS TASKS (LIGHT ON WORK AREAS) | 323 (30) | 646 (60) |
| AUXILIARY POWER PLANT, ELECTRICAL AND ELECTRONIC COMPARTMENTS (LIGHT ON WORK AREAS) | 54 (5) | 108 (10) |

* Continuous intensity control of the above lighting from full bright to 0.02% of full bright and "off" is required.

4.2.3 Emergency exit lighting.
Emergency exit lighting subsystems that may be automatically activated during flight shall meet the spectral radiance requirements in 4.3.5 and TABLE III.

MIL-STD-3009

4.2.4 Crewstation controls and control handles.
The lighted color and spectral radiance limits for illuminated controls shall be as specified in TABLE II and TABLE III.

4.2.5 Caution and advisory signals.
The location shall permit unaided eye viewing by an aviator wearing NVIS without extreme head movement. Chromaticity limits shall be as specified in TABLE II and the NVIS radiance requirements shall be as specified in TABLE III.

4.2.6 Jump lights.
The NVIS radiance of jump lights shall be as specified in TABLE III and chromaticity limits shall be as specified in TABLE II. Different geometric shapes and sizes as well as different colors may be used to distinguish the "caution light" from the "jump light" when viewed through the NVIS. The specific geometric shape designs shall be approved by the acquiring activity.

4.2.7 Work and inspection lights.
When provided as part of the aircraft, work and inspection lights shall meet the chromaticity and NVIS radiance limits specified in TABLE II and TABLE III.

4.2.8 Map and utility lights.
NVIS "White" shall be used for map lights. Map, chart, utility, or work lights shall meet the chromaticity and NVIS radiance limits specified in TABLE II and TABLE III.

4.3 Performance.

4.3.1 Daylight legibility and readability.
Daytime legibility of lighting equipment is not specified by this standard. Criteria for legibility of lighting equipment in bright environments should be specified using the guidance in MIL-HDBK-87213 or JSSG-2010-5.

4.3.2 Night operations.
During night operations, the lighting system shall provide the aircrew members with a capability to rapidly and accurately obtain required crewstation information with unaided vision. The lighting system shall not have an adverse effect on external unaided night vision or on the aircrew's capability to obtain required information external to the aircraft while employing NVIS.

4.3.3 Luminance and illuminance.
Unless otherwise specified, the levels of luminance or illuminance shall be as required in the applicable documents cited herein for each component, system, or subsystem. The levels of luminance for those areas not covered in the applicable documents shall be in accordance with TABLE I.

MIL-STD-3009

4.3.4 Chromaticity.

The color of illuminated information (alphanumeric and symbolic) on instruments, controls, control panels, and on illuminated areas in designated crew station and compartment areas shall be as specified herein for that component. These lighting colors and limits are shown on the chromaticity diagram in FIGURE 2 and are designated as "NVIS GREEN A," "NVIS GREEN B," "NVIS YELLOW," "NVIS RED," and "NVIS WHITE." Conformance to these colors and color limits is determined by the following formula:

$$(u' - u'_1)^2 + (v' - v'_1)^2 \leq (r)^2 \qquad \text{(Formula 1)}$$

Where:

$u'$ and $v'$ = 1976 UCS chromaticity coordinates of the test article.

$u'_1$ and $v'_1$ = 1976 UCS chromaticity coordinates of the center point of the specified color area $r$ = radius of the allowable circular area on the 1976 UCS chromaticity diagram for the specified color See APPENDIX B for NVIS type I, Class A sample calculations.

4.3.4.1 Primary lighting chromaticity.

The chromaticity of the primary lighting system for instruments, displays, consoles, and checklist and radio control plates shall be as specified in TABLE II. At the luminance level specified in TABLE II, the u' and v' chromaticity coordinate values shall be within the area bounded by a circle as shown in FIGURE 2.

4.3.4.2 Secondary lighting subsystem chromaticity

The secondary lighting subsystem shall illuminate the instruments, displays, consoles, and checklist and radio control plates with a lighting color as specified in TABLE II. Lighting components shall produce u' and v' chromaticity coordinates within the area bounded by a circle as shown in FIGURE 2 when energized to produce the luminance level specified in TABLE III measured off a reflectance standard (see APPENDIX A)

4.3.4.3 Illuminated control chromaticity.

Control lighting color shall be as specified in TABLE II. At the luminance level specified in TABLE II, the u' and v' chromaticity coordinate values shall be within the area bounded by a circle as shown in FIGURE 2.

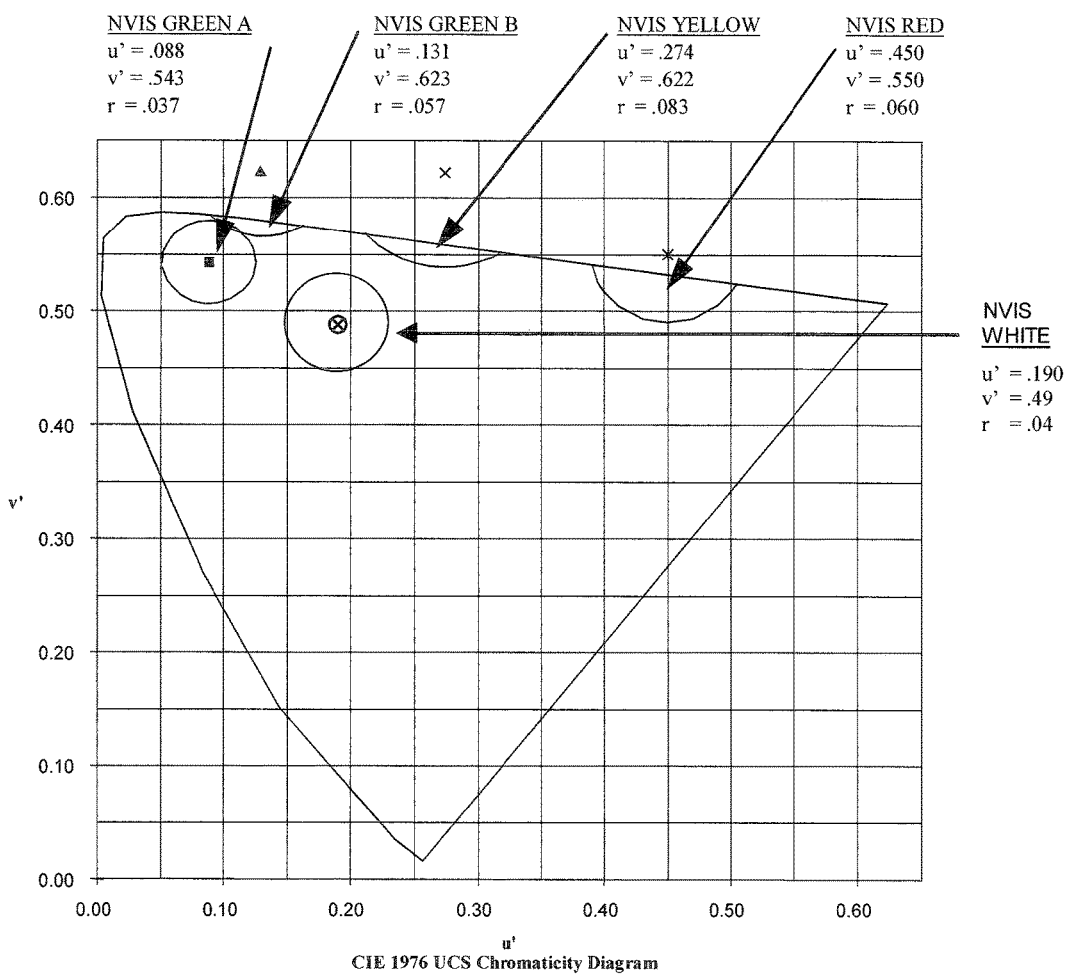
FIGURE 2. NVIS lighting color limits.

MIL-STD-3009

4.3.4.4 Compartment lighting chromaticity.

Compartment lighting color shall be as specified in TABLE II. Lighting components shall produce u' and v' chromaticity coordinates within the area bounded by a circle as shown in FIGURE 2 when energized to produce the luminance level specified in TABLE II measured off a reflectance standard surface (see APPENDIX A).

4.3.4.5 Utility, work, map, and inspection light chromaticity.

The color of utility area, work area, map, and inspection lighting shall be white or green, as specified in the contract. Lighting components shall produce u' and v' chromaticity coordinates within the area bounded by a circle as shown in FIGURE 2 when energized to produce the luminance level specified in TABLE II measured off a reflectance standard surface (see APPENDIX A).

4.3.4.6 Caution and advisory lights chromaticity.

Caution and advisory lighting color shall be as specified in TABLE II. At the luminance level specified in TABLE II, the u' and v' chromaticity coordinate values shall be within the area bounded by a circle as shown in FIGURE 2.

MIL-STD-3009

TABLE II. Chromaticity requirements.

| Lighting component(s) | Para. | TYPE I Class A | | | | | TYPE I Class B | | | | | TYPE II Class A | | | | | TYPE II Class B | | | | |
|---|---|---|---|---|---|---|---|---|---|---|---|---|---|---|---|---|---|---|---|---|---|
| | | $u'_1$ | $v'_1$ | r | cd/m² (fL) | NVIS Color | $u'_1$ | $v'_1$ | r | cd/m² (fL) | NVIS Color | $u'_1$ | $v'_1$ | r | cd/m² (fL) | NVIS Color | $u'_1$ | $v'_1$ | r | cd/m² (fL) | NVIS Color |
| Primary | 4.3.4.1 | .088 | .543 | .037 | 0.343 (0.1) | Green A | | | | | | .088 | .543 | .037 | 0.343 (0.1) | Green A | | | | | |
| Secondary | 4.3.4.2 | .088 | .543 | .037 | 0.343 (0.1) | Green A | | | | | | .088 | .543 | .037 | 0.343 (0.1) | Green A | | | | | |
| Illuminated controls | 4.3.4.3 | .088 | .543 | .037 | 0.343 (0.1) | Green A | | Same | | | | .088 | .543 | .037 | 0.343 (0.1) | Green A | | Same | | | |
| Compartment lighting | 4.3.4.4 | .088 | .543 | .037 | 0.343 (0.1) | Green A | | as | | | | .088 | .543 | .037 | 0.343 (0.1) | Green A | | as | | | |
| Utility, map, work, and inspection | 4.3.4.5 | .088 | .543 | .037 | 0.343 (0.1) | Green A | | Class A | | | | .088 | .543 | .037 | 0.343 (0.1) | Green A | | Class A | | | |
| | 4.3.4.5 | .190 | .49 | .04 | 0.343 (0.1) | White | | | | | | .190 | .49 | .04 | 0.343 (0.1) | White | | | | | |
| Caution and advisory signals | 4.3.4.6 | .088 | .543 | .037 | 0.343 (0.1) | Green A | | | | | | .088 | .543 | .037 | 0.343 (0.1) | Green A | | | | | |
| Jump lights | 4.3.4.7 | .088 | .543 | .037 | 17.2 (5.0) | Green A | | | | | | .088 | .543 | .037 | 17.2 (5.0) | Green A | | | | | |
| | | .274 | .622 | .083 | 51.5 (15.0) | Yellow | | | | | | .274 | .622 | .083 | 51.5 (15.0) | Yellow | | | | | |
| Special lighting components where increased display emphasis by highly saturated (monochromatic) color is necessary, or adequate display light readability cannot be achieved with "GREEN A" | All of the above | .131 | .623 | .057 | 0.343 (0.1) | Green B | | | | | | .131 | .623 | .057 | 0.1 | Green B | | | | | |
| Warning signal | 4.3.4.8.1 | .274 | .622 | .083 | 51.5 (15.0) | Yellow | .274 | .622 | .083 | 51.5 (15.0) | Yellow | .274 | .622 | .083 | 51.5 (15.0) | Yellow | .274 | .622 | .083 | 51.5 (15.0) | Yellow |
| | | .450 | .550 | .060 | 51.5 (15.0) | Red | .450 | .550 | .060 | 51.5 (15.0) | Red | .450 | .550 | .060 | NOT APPLICABLE | | .450 | .550 | .060 | | Red |
| | | NOT APPLICABLE | | | | | Same as Class A | | | | | | | | | | Same as Class A | | | | |
| Master caution signal | 4.3.4.8.2 | .274 | .622 | .083 | 51.5 (15.0) | Yellow | Same as Class A | | | | | .274 | .622 | .083 | 51.5 (15.0) | Yellow | Same as Class A | | | | |

Where:
$u'_1$ and $v'_1$ = 1976 UCS chromaticity coordinates of the center point of the specified color area.
r = radius of the allowable circular area on the 1976 UCS chromaticity diagram for the specified color.
fL = footlamberts

MIL-STD-3009

TABLE III. NVIS radiance requirements (metric units)

| Lighting components | | Paragraph | TYPE 1 | | | | | | TYPE II | | | | | |
|---|---|---|---|---|---|---|---|---|---|---|---|---|---|---|
| | | | Class A | | | Class B | | | Class A | | | Class B | | |
| | | | Not Less Than: (nNR$_A$) | Not Greater Than: (nNR$_A$) | cd/m$^2$ | Not Less Than: (nNR$_B$) | Not Greater Than: (nNR$_B$) | cd/m$^2$ | Not Less Than: (nNR$_A$) | Not Greater Than: nNR$_A$ | cd/m$^2$ | Not Less Than: (nNR$_B$) | Not Greater Than: (nNR$_B$) | cd/m$^2$ |
| Primary | | 4.3.5.1 | --- | 0.17 | 0.343 | | 1/ Same as Class A | | --- | 0.17 | 0.343 | | 1/ Same as Class A | |
| Secondary | | 4.3.5.2 | --- | 0.17 | 0.343 | | | | --- | 0.17 | 0.343 | | | |
| Illuminated controls | | 4.3.5.3 | --- | 0.17 | 0.343 | | | | --- | 0.17 | 0.343 | | | |
| Compartment | | 4.3.5.4 | --- | 0.17 | 0.343 | | | | --- | 0.17 | 0.343 | | | |
| Utility, map, work, and Inspection lights | Green | 4.3.5.5 | --- | 0.17 | 0.343 | | | | --- | 0.17 | 0.343 | | | |
| | White | 4.3.5.5 | --- | 1.0 | 0.343 | | | | --- | 1.0 | 0.343 | | | |
| Caution and advisory lights | | 4.3.5.6 | --- | 0.17 | 0.343 | | | | --- | 0.17 | 0.343 | | | |
| Jump lights | | 4.3.5.7 | 17.1 | 50 | 17.1 | 16 | 47 | 17.1 | --- | 50 | 17.1 | --- | 47 | 17.1 |
| Warning signal | | 4.3.5.8 | 50 | 150 | 51.5 | 47 | 140 | 51.5 | --- | 150 | 51.5 | --- | 140 | 51.5 |
| Master caution signal | | 4.3.5.8 | 50 | 150 | 51.5 | 47 | 140 | 51.5 | --- | 150 | 51.5 | --- | 140 | 51.5 |
| Emergency exit lighting | | | 50 | 150 | 51.5 | 47 | 140 | 51.5 | --- | 150 | 51.5 | --- | 140 | 51.5 |
| Electronic and electro-optical displays (monochromatic) | | | --- | 0.17 | 1.71 | --- | 0.16 | 1.71 | --- | 0.17 | 1.71 | --- | 0.16 | 1.71 |
| Electronic and electro-optical displays (multi-color) | White | | --- | 2.3 | 1.71 | --- | 2.2 | 1.71 | --- | 2.3 | 1.71 | --- | 2.2 | 1.71 |
| | MAX | | --- | 12 | 1.71 | --- | 11 | 1.71 | --- | 12 | 1.71 | --- | 11 | 1.71 |
| HUD systems | | 4.3.5.10 | 1.71 | 5.1 | 17.1 | 1.6 | 4.7 | 17.1 | --- | 17 | 17.1 | --- | 1.6 | 17.1 |

Where:

nNR$_A$ = nano NVIS radiance requirements for Class A equipment.
nNR$_B$ = nano NVIS radiance requirements for Class B equipment.
"nano", abbreviated "n", represents a factor of $10^{-9}$, which is factored out of the radiance numbers in this table.
cd/m$^2$ = Candela per square meter, sometimes called "nits".

NOTE 1. For these lighting components, Class B equipment shall meet all Class A requirements of this specification. The relative NVIS response data for Class A equipment, $G_A(\lambda)$ (table III.a.), shall be substituted for $G_B(\lambda)$ to calculate NVIS radiance.

MIL-STD-3009

TABLE III.a. NVIS radiance requirements using English units.

| Lighting components | | Paragraph | TYPE 1 | | | | | | TYPE II | | | | | |
|---|---|---|---|---|---|---|---|---|---|---|---|---|---|---|
| | | | Class A | | | Class B | | | Class A | | | Class B | | |
| | | | Not Less Than: (NR$_A$) | Not Greater Than: (NR$_A$) | fL | Not Less Than: (NR$_B$) | Not Greater Than: (NR$_B$) | fL | Not Less Than: (NR$_A$) | Not Greater Than: (NR$_A$) | fL | Not Less Than: (NR$_B$) | Not Greater Than: (NR$_B$) | fL |
| Primary | | 4.3.5.1 | --- | 1.7x10$^{-10}$ | 0.1 | | 1/ Same as Class A | | --- | 1.7x10$^{-10}$ | 0.1 | | 1/ Same as Class A | |
| Secondary | | 4.3.5.2 | --- | 1.7x10$^{-10}$ | 0.1 | | | | --- | 1.7x10$^{-10}$ | 0.1 | | | |
| Illuminated controls | | 4.3.5.3 | --- | 1.7x10$^{-10}$ | 0.1 | | | | --- | 1.7x10$^{-10}$ | 0.1 | | | |
| Compartment | | 4.3.5.4 | --- | 1.7x10$^{-10}$ | 0.1 | | | | --- | 1.7x10$^{-10}$ | 0.1 | | | |
| Utility, map, work, and Inspection lights | Green | 4.3.5.5 | --- | 1.7x10$^{-10}$ | 0.1 | | | | --- | 1.7-10$^{-10}$ | 0.1 | | | |
| | White | 4.3.5.5 | --- | 1.0x10$^{-9}$ | 0.1 | | | | --- | 1.0-10$^{-9}$ | 0.1 | | | |
| Caution and advisory lights | | 4.3.5.6 | --- | 1.7x10$^{-10}$ | 0.1 | | | | --- | 1.7-10$^{-10}$ | 0.1 | | | |
| Jump lights | | 4.3.5.7 | 1.7x10$^{-8}$ | 5.0x10$^{-8}$ | 5.00 | 1.6x10$^{-8}$ | 4.7x10$^{-8}$ | 5.0 | --- | 5.0x10$^{-8}$ | 5.0 | --- | 4.7x10$^{-8}$ | 5.0 |
| Warning signal | | 4.3.5.8 | 5.0x10$^{-8}$ | 1.5x10$^{-7}$ | 15.0 | 4.7x10$^{-8}$ | 1.4x10$^{-7}$ | 15.0 | --- | 1.5x10$^{-7}$ | 15.0 | --- | 1.4x10$^{-7}$ | 15.0 |
| Master caution signal | | 4.3.5.8 | 5.0x10$^{-8}$ | 1.5x10$^{-7}$ | 15.0 | 4.7x10$^{-8}$ | 1.4x10$^{-7}$ | 15.0 | --- | 1.5x10$^{-7}$ | 15.0 | --- | 1.4x10$^{-7}$ | 15.0 |
| Emergency exit lighting | | | 5.0x10$^{-8}$ | 1.5x10$^{-7}$ | 15.0 | 4.7x10$^{-8}$ | 1.4x10$^{-7}$ | 15.0 | --- | 1.5x10$^{-7}$ | 15.0 | --- | 1.4x10$^{-7}$ | 15.0 |
| Electronic and electro-optical displays (monochromatic) | | | --- | 1.7x10$^{-10}$ | 0.5 | --- | 1.6x10$^{-10}$ | 0.5 | --- | 1.7x10$^{-10}$ | 0.5 | --- | 1.6x10$^{-10}$ | 0.5 |
| Electronic and electro-optical displays (multi-color) | White | | --- | 2.3x10$^{-9}$ | 0.5 | --- | 2.2x10$^{-9}$ | 0.5 | --- | 2.3x10$^{-9}$ | 0.5 | --- | 2.2x10$^{-9}$ | 0.5 |
| | MAX | | --- | 1.2x10$^{-8}$ | 0.5 | --- | 1.1x10$^{-8}$ | 0.5 | --- | 1.2x10$^{-8}$ | 0.5 | --- | 1.1x10$^{-8}$ | 0.5 |
| HUD systems | | 4.3.5.10 | 1.7x10$^{-9}$ | 5.1x10$^{-9}$ | 5.0 | 1.6x10$^{-9}$ | 4.7x10$^{-9}$ | 5.0 | --- | 1.7x10$^{-9}$ | 5.0 | --- | 1.6x10$^{-9}$ | 5.0 |

Where:

$NR_A$ = NVIS radiance requirements for Class A equipment.
$NR_B$ = NVIS radiance requirements for Class B equipment.
fL = footlamberts NOTE 1. For these lighting components, Class B equipment shall meet all Class A requirements of this specification. The relative NVIS response data for Class A equipment, $G_A(\lambda)$ (TABLE III.a), shall be substituted for $G_B(\lambda)$ to calculate NVIS radiance.

MIL-STD-3009

4.3.4.7 Jump light chromaticity.

The color of jump lights shall be as specified in TABLE II. At the luminance level specified in TABLE II, the u' and v' chromaticity coordinate values shall be within the area bounded by a circle as shown in FIGURE 2.

4.3.4.8 Warning, master caution, and caution signal chromaticity.

4.3.4.8.1 Warning signal chromaticity.

Warning signal lighting color shall be NVIS Red in accordance with TABLE II. At the luminance level specified in TABLE II, the u' and v' chromaticity coordinate values shall be within the area bounded by the edge of the CIE UCS and a circle, as shown in FIGURE 2.

4.3.4.8.2 Master caution signal chromaticity.

Unless otherwise specified by the acquiring activity, the lighting color for the master caution signal shall be NVIS Yellow as specified in TABLE II. At the luminance level specified in TABLE II, the u' and v' chromaticity coordinate values shall be within the area bounded by the edge of the CIE UCS and a circle, as shown in FIGURE 2.

4.3.4.8.3 Caution signal chromaticity.

The lighting color for caution signals shall be NVIS Yellow as specified in TABLE II. At the luminance level specified in TABLE II, the u' and v' chromaticity coordinate values shall be within the area bounded by the edge of the CIE UCS and a circle, as shown in FIGURE 2.

4.3.5 Spectral radiance limits.

All interior lighting in aircraft where crew members must utilize NVIS to perform their tasks shall be designed to limit spectral radiance as specified in TABLE III and herein.

4.3.5.1 Primary lighting radiance.

The NVIS radiance of primary lighting shall be as specified in TABLE III at the luminance levels specified. These components shall include, but are not limited to, displays and instruments, display consoles, and checklist and radio control plates.

4.3.5.2 Secondary lighting subsystem radiance.

The NVIS radiance of the secondary lighting subsystem shall be as specified in TABLE III when energized to produce the luminance level specified in TABLE III measured off a reflectance standard surface (see APPENDIX A). Illuminated components shall include, but are not limited to, displays and instruments, consoles, and checklist and radio control plates.

4.3.5.3 Illuminated control radiance.

The NVIS radiance of illuminated controls shall be such that the NVIS radiance shall be as specified in TABLE III at the luminance level specified.

MIL-STD-3009

4.3.5.4 Compartment light radiance.

The NVIS radiance of compartment lights shall be such that the NVIS radiance shall be as specified in TABLE III when energized to produce the luminance level specified in TABLE III measured off a reflectance standard surface (see APPENDIX A).

4.3.5.5 Utility, work, map and inspection lighting radiance.

The NVIS radiance of utility, work, map, and inspection lights shall be as specified in TABLE III when energized to produce the luminance level specified in TABLE III measured off a reflectance standard surface (see APPENDIX A).

4.3.5.6 Advisory light radiance.

The NVIS radiance of advisory lights shall be as specified in TABLE III at the luminance level specified.

4.3.5.7 Jump light radiance.

The NVIS radiance of jump lights shall be as specified in TABLE III at the luminance level specified.

4.3.5.8 Warning, master caution, caution signal, and emergency exit lighting radiance.

The NVIS radiance of warning, master caution, caution signal, and emergency exit lighting shall be as specified in TABLE III and at the luminance level specified. If these signals have supplementary auditory signals, then the NVIS radiance may be lower than that specified in TABLE III.

4.3.5.9 Electronic and electro-optical display radiance.

4.3.5.9.1 Monochromatic display radiance.

Monochromatic electronic and electro-optical displays, except head up display (HUD) systems (see 4.3.5.10) that are required to display shades of gray imagery, shall have an NVIS radiance output as specified in TABLE III at the luminance level specified. Other electronic displays (having no gray shade capabilities) that are required to display numerics, alphabets, graphics (or a combination thereof) shall also meet the TABLE III radiance requirement, but at a 0.343 $cd/m^2$ (0.1 fL) luminance level.

4.3.5.9.2 Multi-color display radiance.

The spectral radiance output of any color generated by multi-color electronic and electro-optical displays shall be such that the NVIS radiance is not greater than the maximum NR specified for multicolor displays in TABLE III at the specified luminance level. In addition, the closest producible color to the 1976 UCS chromaticity point u' = .1704, v' = .4042 shall have an NVIS radiance not greater than the "White" specified in TABLE III at the luminance level specified.

4.3.5.10 HUD system radiance.

For HUD systems, the NVIS radiance shall be as specified in TABLE III at the luminance level specified.

MIL-STD-3009

4.3.6 Light leaks.

In addition to the requirements of the individual equipment specification, lighting components shall not exhibit light leakage.

4.3.7 Luminance uniformity.

At any given luminance level, lighting components within a lighting subsystem shall provide luminance such that the average luminance ratio between lighted components shall be not greater than 2 to 1.

4.3.8 Crewstation reflections.

Reflections from the canopy, windshields, and windows shall be minimized. Reflections that affect the outside vision of the aviator either wearing NVIS or not wearing NVIS, shall not be permitted. Specular reflections resulting from aircraft lighting sources shall not occur within the area subtended by a solid angle of one steradian centered at the pilot's design eye position and along the pilot's horizontal vision line. The pilot's design eye position and horizontal vision line are defined in JSSG-2010-3.

4.4 Luminance balance.

Each primary instrument or display and control panel lighting component shall permit the establishment and maintenance of balanced instrument panel lighting. Maintenance of this balance shall be easily accessible and require only the use of common or standard tools.

4.5 Exterior lighting subsystems.

4.5.1 Anticollision lighting.

The anticollision lighting system shall have four modes, OFF, a normal FAR Part 23 or Part 25 required ON (only) mode, IR ON (only) infrared (i.e., covert) mode, and BOTH ON mode. The IR light(s) shall not be viewable from the lower hemisphere. The IR ON mode shall have at least six pilot selectable flash patterns with varying flash durations and periods. One of these six patterns shall have an equal ON and OFF times. All six patterns shall be square wave in nature. All modes shall be pilot selectable.

4.5.2 Position lights.

The position lights shall have an OFF mode, a NVIS "friendly" mode, and an infrared (IR) (i.e., covert) mode. The IR light(s) shall not be viewable from the lower hemisphere. The radiance of the position lights shall be reduced by filtering out the near IR component of the FAR Part 23 or Part 25 required Aviation Red (left side of aircraft) and Aviation Green (right side of aircraft) position lights to make these lights NVIS "friendly." NVIS 'friendly" position lights shall still comply with the chromaticity requirements of FAR Part 23 or Part 25 to the degree possible after the filtering out of the near IR component. NVIS "friendly" shall be defined as a $NR_A$ that does not exceed $3.5 \times 10^{-7}$ at 15 fL. All position lights shall be dimmable and the modes selectable by the pilot.

MIL-STD-3009

4.5.3 Tanker boom marker and nozzle illumination.
An additional IR light, or a light with a strong IR component, shall illuminate the end of the boom or basket to aid an NVIS equipped receiver pilot in finding the end of the boom or basket from a distance when/if the tanker's other exterior lights are off.

4.5.4 Formation lights.
Formation lights shall be NVIS compatible, either NVIS Green A or B. The formation lights shall have an IR (i.e., covert) mode. The IR light(s) shall not be viewable from the lower hemisphere. The vertical stabilizer(s) lights, sometimes called Logo or Pan Am lights, shall be considered as part of the position or formation lighting system. The formation lights shall have a pilot selectable OFF mode, a NVIS compatible ON (only) mode, an IR ON (only) mode, and a BOTH ON mode. All formation lights shall be dimmable by the pilot.

MIL-STD-3009

5. VERIFICATION

5.1 System level verification.

A system level verification test of NVIS compatible interior lighting using visual acuity as the measure shall be done and can be outlined as follows. This test has been useful in determining that a contractor has met the NVIS system level requirements in a simple, straight forward, and quantifiable way.

a. Place aircraft with full-up NVIS interior lighting in an environment which is as dark as possible (e.g., a hangar with the doors shut, lights out, at night time, an engine hush house, etc.).

b. Place a visual acuity eye chart(s) a set distance from the nose of the aircraft where the pilot/copilot can see it (e.g., 6-10 m (20-30 feet)). Generally these charts have a high contrast (i.e., black on white) square wave pattern on them. Each chart has a different spatial frequency.

c. While looking through the NVGs that will be used operationally, have the test subjects read the charts as if taking an eye test and record their visual acuity scores. Do this with NVIS lights (only) ON as one condition and with all lights OFF as the other condition. The canopy should be closed.

d. This test shall be through the HUD and canopy (i.e., straight ahead) and off-axis (i.e., through canopy alone).

e. Compare the two visual acuity scores. If there is a significant difference/degradation in visual acuity between NVIS lights ON and lights OFF, then this may be due to an unacceptable level of NVIS incompatible light. Advise contractually pre-defining an acceptable, numerical visual acuity score.

f. Highly recommend contacting Air Force Research Laboratory (AFRL/HEA) at Mesa, AZ (formerly William AFB), DSN 474-6561 or 474-6120, for help with this test.

5.2 Inspection conditions.

Unless otherwise specified in the individual equipment specification, first article and conformance inspections herein shall be performed at atmospheric pressure of 711 to 813 mm (28 to 32 inches) Hg at a temperature of $21° \pm 3°$ C, and a relative humidity of not grater than 80%.

5.3 Order of inspection.

All inspections shall be performed after the environmental inspections required by the individual equipment specification have been conducted.

5.4 Lighting conditions.

Luminance, chromaticity, and radiance measurements shall be made in a dark room in which the ambient spectral radiant energy over the spectral range of 380 through 930 nanometers is either unmeasurable (equivalent to measurement instrument system

MIL-STD-3009 noise) or no greater than 1 percent of the value of radiant energy from the test sample being measured.

5.5 Test set up verification.

With all the equipment positioned in the darkroom as they would be for test measurements, focus the spectroradiometer on a reflectance standard meeting the requirements of APPENDIX A located in place of the test sample and, with the room darkened, measure the ambient radiant energy incident on the reflectance standard. The data obtained shall be kept on file and shall be compared with data subsequently developed from all test samples to verify compliance with the inspection requirements of 5.7.2 and 5.7.3. This verification procedure shall be repeated when the darkroom ambient spectral radiant energy levels become suspect or at six month intervals, whichever occurs first.

5.6 Test set up.

Stray light from the test lighting component shall be controlled so that it is not reflected, refracted, or scattered into the measuring equipment.

5.7 Inspection methods and procedures.

5.7.1 Lighting system unaided eye inspection.

Each lighting subsystem (primary instrument panel, secondary instrument panel, primary console, secondary console, warning, caution and advisory signals, utility, and compartment) shall first be subjected to an unaided eye inspection at full bright lighting levels. This inspection shall then be repeated at the NVIS compatible lighting levels specified in TABLE III.

5.7.2 Lighting system NVIS compatible examination.

Each lighting subsystem (e.g., primary instrument panel, secondary instrument panel, primary console, secondary console, warning, caution and advisory signal, utility, and compartment light) shall be set to the NVIS compatible lighting level cited in TABLE III and examined while utilizing NVIS to verify general conformance to this document, as well as to identify any source of light leakage from the various lighting components. The NVIS used during the evaluation shall be representative of the system planned for use in the aircraft. Either of two resolution targets may be used for the assessment; procedures applicable to the chosen target shall be used. In either case, the resolution target shall be irradiated so that NVIS radiance of white portions of the resolution target equals $1.7 \times 10^{-10} NR_A$ (for Class A NVIS) or $1.6 \times 10^{-10} NR_B$ (for Class B NVIS). Contrast modulation of the target shall be calculated as Cm = (luminance of target white space - luminance of target dark bar) / (luminance of target white space + luminance of target dark bar). Contrast modulation shall be as specified for the type of target used. Care shall be taken to locate the resolution target so that aircraft lighting subsystems, when energized, do not illuminate the target. The position of the target shall be subject to approval of the acquiring activity. The NVIS shall be focused on the target for best resolution performance. NVIS resolution performance shall be assessed with all lighting subsystems off.

MIL-STD-3009

5.7.2.1 Resolution assessment using a USAF 1951 medium contrast target.

A USAF 1951 medium contrast resolution resolving power target (USAF Tri-bar Chart) with a contrast modulation ($C_m$) of approximately 70% shall be used. The chart shall be set up outside the mockup at a distance such that the test subject, while seated in the aircraft in the appropriate operational position and wearing NVIS, is just capable of resolving an element in a target group midway between the largest and smallest groups when the chart is irradiated as specified.

5.7.2.2 Resolution assessment using a 50% contrast, square-wave grating NVG resolution chart.

A square-wave grating pattern NVG resolution chart having a contrast modulation ($C_m$) of 50% $\pm$ 10% shall be used. The NVG resolution chart shall contain horizontally and vertically oriented square-wave grating patterns that determine Snellen acuities of 20/20, 20/25, 20/30, 20/35, 20/40, 20/45, 20/50, 20/55, 20/60, 20/65, and 20/70 when resolved at a viewing distance of 20 feet. The chart shall be set up outside the mockup at a distance of 20 feet from the test subject and irradiated as specified.

5.7.3 Luminance uniformity.

5.7.3.1 Low level.

During the inspection, each lighting subsystem shall be energized independently to one half of its rated voltage. A visual inspection shall be made to determine the brightest and dimmest lighting component of that subsystem. Unless visual inspection has been accepted for luminance uniformity by the acquiring activity, a photometer in accordance with APPENDIX A shall be used to measure the luminance of the brightest and dimmest lighting component.

5.7.3.2 High level.

Each lighting subsystem shall then be energized independently to maximum brightness. A visual inspection shall be made to determine the brightest and dimmest component of that subsystem. A photometer in accordance with APPENDIX A shall be used to measure the luminance of the brightest and dimmest lighting component.

5.7.4 Crewstation reflections.

Examination for specular reflections shall be performed during inspection (see 5.7.1 and 5.7.2).

5.7.5 Visual examination.

Each lighting system, subsystem, or component shall be examined visually to determine conformance with this document. Any evidence of foreign matter, cracks, scratches, bubbles, delamination, warps or stray light shall be considered cause for rejection.

5.7.6 Operation.

Each lighting system, subsystem, or component to be inspected shall be energized at the same levels as measured in the system to determine that it operates in accordance with this document.

MIL-STD-3009

5.7.7 Environmental operating tests.
Environmental tests are not covered by this standard.

5.7.8 Electromagnetic interference (EMI) tests.
EMI tests are not covered by this standard.

5.7.9 Electromagnetic compatibility (EMC) tests.
EMC tests are not covered by this standard.

5.7.10 Luminance and illuminance measurements.
Unless otherwise specified herein, luminance and illuminance measurements shall be performed in accordance with the individual equipment specification for the applicable lighting component. Luminance or illuminance measurements shall be performed using either a spectroradiometer or photometer that meets the requirements of APPENDIX A. When a spectroradiometer, meeting the requirements of APPENDIX A is used to measure luminance or illuminance, the luminance or illuminance shall be calculated using the following standard formulas.

$$L = 683 \int_{380}^{780} K(\lambda)N(\lambda)d\lambda \quad \text{(Formula 2)}$$

$$E_v = 683 \int_{380}^{780} K(\lambda)E_e(\lambda)d\lambda \quad \text{(Formula 3)}$$

Where:

$L$ = luminance ($cd/m^2$) or $E_v$ = illuminance (lux)

$K(\lambda)$ = normalized visual efficiency curve for 1931 standard observer $N(\lambda)$ = spectral radiance of lighting component ($W/m^2$ sr nm) (Note that a factor of 10,000 will be needed in Formula 3 if data is in units of $W/cm^2$ sr nm.)

$E_e(\lambda)$ = flux density incident ($W/m^2$) (Note that a factor of 10,000 will be needed in Formula 3 if data is in units of $W/cm^2$.)

$d\lambda$ = 5 nm

MIL-STD-3009

5.7.11 Chromaticity measurements.

5.7.11.1 Primary lighting chromaticity measurements.

Chromaticity measurements shall be made in a dark room meeting the requirements of verification 5.4. Depending on the type of lighting component being evaluated, the drive condition shall be applied to the lighting components necessary to achieve the luminance level of TABLE III for the applicable component. The luminance shall be measured using either a spectroradiometer or photometer meeting the requirements specified in APPENDIX A. With the specified luminance achieved, the spectral output of the lighting component shall be measured with a spectroradiometer that meets the requirements of APPENDIX A. Each spectral measurement shall be made using the actual aircraft lighting source, filter, and fixture. The spectroradiometer shall be placed a distance from the device being tested so that several numbers, letters, or indicia are included within the spectroradiometer test field. The x and y and the u' and v' 1976 UCS chromaticity coordinate points shall then be calculated using the following formulas:

MIL-STD-3009

$$N(\lambda) = I(\lambda)/R(\lambda) \qquad \text{(Formula 4)}$$

$$X = \int_{380}^{780} \bar{x}\, N(\lambda)\, d\lambda \qquad \text{(Formula 5)}$$

$$Y = \int_{380}^{780} \bar{y}\, N(\lambda)\, d\lambda \qquad \text{(Formula 6)}$$

$$Z = \int_{380}^{780} \bar{z}\, N(\lambda)\, d\lambda \qquad \text{(Formula 7)}$$

$$x = \frac{X}{X+Y+Z} \qquad \text{(Formula 8)}$$

$$y = \frac{Y}{X+Y+Z} \qquad \text{(Formula 9)}$$

$$u' = \frac{4X}{X+15Y+3Z} \qquad \text{(Formula 10)}$$

$$v' = \frac{9Y}{X+15Y+3Z} \qquad \text{(Formula 11)}$$

Where:

$N(\lambda)$ = spectral radiance of the lighting component (W/cm$^2$ sr nm or normalized)

$I(\lambda)$ = detector current (amperes)

$R(\lambda)$ = spectroradiometer spectral sensitivity (amperes cm$^2$ sr nm/W)

$d\lambda$ = 5nm

MIL-STD-3009

| | | |
|---|---|---|
| $\bar{x}$ | = | 1931 C.I.E. relative spectral response of the eye (color matching function) |
| $\bar{y}$ | = | 1931 C.I.E. relative spectral response of the eye (color matching function) |
| $\bar{z}$ | = | 1931 C.I.E. relative spectral response of the eye (color matching function) |
| X | = | C.I.E. tristimulus value |
| Y | = | C.I.E. tristimulus value |
| Z | = | C.I.E. tristimulus value |
| u' | = | 1976 UCS chromaticity coordinate transformation of CIE x |
| v' | = | 1976 UCS chromaticity coordinate transformation of CIE y |
| x | = | 1931 C.I.E. chromaticity coordinate |
| y | = | 1931 C.I.E. chromaticity coordinate |

5.7.11.2 Secondary lighting chromaticity measurements.
For chromaticity measurements, the appropriate drive condition shall be applied to the light being tested (test light) to illuminate a reflectance standard meeting the requirements of APPENDIX A, to a luminance level of 0.343 cd/m² (0.1 fL) at a distance of 12 inches. The test light shall be oriented perpendicular to the reflectance standard. The spectroradiometer shall be set up such that the reflectance standard is at a 45° angle with the line of sight of the spectroradiometer. The spectral radiance of the reflectance standard shall be measured using an aperture that is as large as possible within the projected area of the reflectance standard. The corrected spectral radiance shall then be calculated using the following formula:

$$N(\lambda) = \frac{M(\lambda)}{r(\lambda)} \qquad \text{(Formula 12)}$$

Where:

$N(\lambda)$ = corrected spectral radiance (W/cm² sr nm)

$M(\lambda)$ = measured spectral radiance of the reflectance standard (W/cm² sr nm)

MIL-STD-3009 r(λ) = reflectance of the reflectance standard

The chromaticity of the test light shall be calculated using the corrected spectral radiance and the formulas given in 5.7.11.1

5.7.11.3 Illuminated control chromaticity measurements.
Inspection shall be in accordance with 5.7.1 and 5.7.2.

5.7.11.4 Compartment lighting chromaticity measurements.
The chromaticity inspection for compartment lighting shall be the same as for secondary lighting except that the distance between the test light and the reflectance standard shall be adjusted to be equivalent to the distance at which the lighting component will be used when installed in an aircraft.

5.7.11.5 Utility, work, and inspection lighting chromaticity measurements.
Inspection shall be the same as for secondary lighting.

5.7.11.6 Advisory light chromaticity measurements.
Inspection shall be in accordance with 5.7.1 and 5.7.2.

5.7.11.7 Jump light chromaticity measurements.
Inspection shall be in accordance with 5.7.1 and 5.7.2.

5.7.11.8 Signal indicator chromaticity measurements.
Inspection shall be in accordance with 5.7.1 and 5.7.2.

5.7.11.9 Floodlighted instrument, console, and panel chromaticity measurements.
The chromaticity of instruments, consoles, and panels intended to be floodlighted shall be in accordance with 5.7.11.2 except that the instrument console or panel shall be floodlighted to the specified luminance levels by the same type of light that will be used when the panel is installed in the aircraft.

5.7.12 Spectral radiance measurements.

5.7.12.1 Primary lighting spectral radiance measurements.
NVIS radiance measurements shall be made in a dark room meeting the requirements of 5.4. Power shall be applied to the lighting component in such a manner that the luminance at the rated drive condition or 51.5 cd/m$^2$ (15.0 fL), whichever is less, is achieved. The luminance shall be measured using a spectroradiometer meeting the requirements specified in APPENDIX A. With the appropriate luminance achieved, a

MIL-STD-3009 spectroradiometer that meets the requirements of APPENDIX A shall be set up to measure the spectral radiance. The aperture selected for measurement shall provide spectroradiometer sensitivity in accordance with A.3.2. If the size of numerals, lettering or indicia permit, the spectroradiometer shall be set up to measure at least three different areas on the device. If size does not permit spectral radiance measurements of individual numerals, lettering or indicia, the spectral radiance shall be measured by including several numeral(s), lettering, and indicia within the spectroradiometer test field. The NVIS radiance shall be calculated using the appropriate formulas herein. A scaling factor shall be generated using the following formula:

$$S = \frac{L_r}{L_m} \quad \text{(Formula 13)}$$

Where:

$S$ = scaling factor $L_r$ = required luminance level for NVIS radiance (see TABLE III and TABLE III.a).

$L_m$ = spectrally averaged luminance calculated by using the same spectroradiance data used in formulas 14a and 14b.

Tests must be accomplished to verify that the scale factor "S" is valid if there is any doubt that the luminance and radiance of the display or lighting technology being used scale together. If the luminance and radiance of the display or lighting technology being used do not scale together, radiance must be measured at the luminance specified in TABLE III.

Formula 14a shall be used to calculate the NVIS radiance at specified luminance of Class A equipment.

Formula 14b shall be used to calculate the NVIS radiance at specified luminance of Class B equipment.

Note that units of nano-$NR_A$ ($nNR_A$) and nano $NR_B$ ($nNR_B$) are often used to eliminate a factor of $10^{-9}$ from the numbers.

$$\text{NVIS radiance } (NR_A) \text{ at specified luminance} = S \int_{450}^{930} G_A(\lambda)N(\lambda)d\lambda \quad \text{(Formula 14a)}$$

MIL-STD-3009

$$\text{NVIS radiance (NR}_B\text{) at specified luminance} = S \int_{450} G_B(\lambda)N(\lambda)d\lambda \quad \text{(Formula 14b)}$$

Where:

$G_A(\lambda)$ = relative NVIS response of Class A equipment (see TABLE IV)

$G_B(\lambda)$ = relative NVIS response of Class B equipment (see TABLE V)

$N(\lambda)$ = spectral radiance of lighting component (W/cm² sr nm)

S = scaling factor $d\lambda$ = 5 nm

MIL-STD-3009

TABLE IV. Relative spectral response of Class A NVIS ($G_A(\lambda)$).

| Wavelength (nm) | Relative Response | Wavelength (nm) | Relative Response |
|---|---|---|---|
| 450 | 1.0000E-04 | 690 | 9.3790E-01 |
| 455 | 1.1250E-04 | 695 | 9.4480E-01 |
| 460 | 1.2500E-04 | 700 | 9.5170E-01 |
| 465 | 1.3750E-04 | 705 | 9.5860E-01 |
| 470 | 1.5000E-04 | 710 | 9.6550E-01 |
| 475 | 1.6172E-04 | 715 | 9.7304E-01 |
| 480 | 1.7500E-04 | 720 | 9.7930E-01 |
| 485 | 1.9375E-04 | 725 | 9.8020E-01 |
| 490 | 2.1250E-04 | 730 | 9.8280E-01 |
| 495 | 2.2266E-04 | 735 | 9.8838E-01 |
| 500 | 2.3750E-04 | 740 | 9.9310E-01 |
| 505 | 2.7656E-04 | 745 | 9.9719E-01 |
| 510 | 3.1250E-04 | 750 | 1.0000E+00 |
| 515 | 3.4297E-04 | 755 | 1.0000E+00 |
| 520 | 3.7500E-04 | 760 | 1.0000E+00 |
| 525 | 4.1875E-04 | 765 | 1.0000E+00 |
| 530 | 4.6250E-04 | 770 | 1.0000E+00 |
| 535 | 5.0703E-04 | 775 | 9.9814E-01 |
| 540 | 5.5000E-04 | 780 | 9.9660E-01 |
| 545 | 5.8359E-04 | 785 | 9.9543E-01 |
| 550 | 6.2500E-04 | 790 | 9.9450E-01 |
| 555 | 7.0000E-04 | 795 | 9.9380E-01 |
| 560 | 7.7500E-04 | 800 | 9.9310E-01 |
| 565 | 8.5000E-04 | 805 | 9.8620E-01 |
| 570 | 9.2500E-04 | 810 | 9.7930E-01 |
| 575 | 1.4525E-03 | 815 | 9.7283E-01 |
| 580 | 1.9800E-03 | 820 | 9.6550E-01 |
| 585 | 4.7175E-03 | 825 | 9.5515E-01 |
| 590 | 7.8000E-03 | 830 | 9.4480E-01 |
| 595 | 1.1400E-02 | 835 | 9.3402E-01 |
| 600 | 1.5000E-02 | 840 | 9.2410E-01 |
| 605 | 2.6263E-02 | 845 | 9.1720E-01 |
| 610 | 5.2000E-02 | 850 | 9.1030E-01 |
| 615 | 8.8388E-02 | 855 | 8.6334E-01 |
| 620 | 1.7500E-01 | 860 | 8.0000E-01 |
| 625 | 4.3288E-01 | 865 | 7.2848E-01 |
| 630 | 6.1380E-01 | 870 | 6.5520E-01 |
| 635 | 6.7756E-01 | 875 | 5.8016E-01 |
| 640 | 7.4480E-01 | 880 | 5.0340E-01 |
| 645 | 8.2458E-01 | 885 | 4.2523E-01 |
| 650 | 8.8970E-01 | 890 | 3.4480E-01 |
| 655 | 8.9654E-01 | 895 | 2.5704E-01 |
| 660 | 9.0340E-01 | 900 | 1.7500E-01 |
| 665 | 9.1051E-01 | 905 | 1.1009E-01 |
| 670 | 9.1720E-01 | 910 | 6.2100E-02 |
| 675 | 9.2241E-01 | 915 | 4.3125E-02 |
| 680 | 9.2760E-01 | 920 | 2.7600E-02 |
| 685 | 9.3254E-01 | 925 | 1.5525E-02 |
|  |  | 930 | 6.9000E-03 |

MIL-STD-3009

TABLE V. Relative spectral response of Class B NVIS ($G_B(\lambda)$).

| Wavelength (nm) | Relative Response | Wavelength (nm) | Relative Response |
|---|---|---|---|
| 450 | 1.0000E-05 | 690 | 9.3790E-01 |
| 455 | 1.1250E-05 | 695 | 9.4480E-01 |
| 460 | 1.2500E-05 | 700 | 9.5170E-01 |
| 465 | 1.3750E-05 | 705 | 9.5860E-01 |
| 470 | 1.5000E-05 | 710 | 9.6550E-01 |
| 475 | 1.6172E-05 | 715 | 9.7304E-01 |
| 480 | 1.7500E-05 | 720 | 9.7300E-01 |
| 485 | 1.9375E-05 | 725 | 9.8020E-01 |
| 490 | 2.1250E-05 | 730 | 9.8280E-01 |
| 495 | 2.2266E-05 | 735 | 9.8838E-01 |
| 500 | 2.3750E-05 | 740 | 9.9310E-01 |
| 505 | 2.7657E-05 | 745 | 9.9719E-01 |
| 510 | 3.1250E-05 | 750 | 1.0000E+00 |
| 515 | 3.4297E-05 | 755 | 1.0000E+00 |
| 520 | 3.7500E-05 | 760 | 1.0000E+00 |
| 525 | 4.1875E-05 | 765 | 1.0000E+00 |
| 530 | 4.6250E-05 | 770 | 1.0000E+00 |
| 535 | 5.0703E-05 | 775 | 9.9814E-01 |
| 540 | 5.5000E-05 | 780 | 9.9660E-01 |
| 545 | 5.8359E-05 | 785 | 9.5430E-01 |
| 550 | 6.2500E-05 | 790 | 9.9450E-01 |
| 555 | 7.0000E-05 | 795 | 9.9830E-01 |
| 560 | 7.7500E-05 | 800 | 9.9310E-01 |
| 565 | 8.5000E-05 | 805 | 9.8620E-01 |
| 570 | 9.2500E-05 | 810 | 9.7930E-01 |
| 575 | 9.7688E-05 | 815 | 9.7283E-01 |
| 580 | 1.1000E-04 | 820 | 9.6550E-01 |
| 585 | 1.2566E-04 | 825 | 9.5515E-01 |
| 590 | 1.8200E-04 | 830 | 9.4480E-01 |
| 595 | 2.6581E-04 | 835 | 9.3402E-01 |
| 600 | 5.2500E-04 | 840 | 9.2410E-01 |
| 605 | 1.0183E-03 | 845 | 9.1720E-01 |
| 610 | 2.0000E-03 | 850 | 9.1030E-01 |
| 615 | 3.4569E-03 | 855 | 8.6334E-01 |
| 620 | 6.2500E-03 | 860 | 8.0000E-01 |
| 625 | 9.0935E-03 | 865 | 7.2848E-01 |
| 630 | 1.8414E-02 | 870 | 6.5520E-01 |
| 635 | 4.6447E-02 | 875 | 5.8016E-01 |
| 640 | 7.4480E-02 | 880 | 5.0340E-01 |
| 645 | 2.0949E-01 | 885 | 4.2523E-01 |
| 650 | 4.0037E-01 | 890 | 3.4480E-01 |
| 655 | 6.7139E-01 | 895 | 2.5704E-01 |
| 660 | 9.0340E-01 | 900 | 1.7500E-01 |
| 665 | 9.1073E-01 | 905 | 1.1009E-01 |
| 670 | 9.1720E-01 | 910 | 6.2100E-02 |
| 675 | 9.2741E-01 | 915 | 4.3125E-02 |
| 680 | 9.2760E-01 | 920 | 2.7600E-02 |
| 685 | 9.3254E-01 | 925 | 1.5525E-02 |
|  |  | 930 | 6.9000E-03 |

MIL-STD-3009

5.7.12.2 Secondary lighting radiance measurements.

The appropriate drive condition shall be applied to the test light to illuminate the reflectance standard such that the luminance requirement of TABLE III is met at a distance of 12 inches. The test light shall be oriented perpendicular to the reflectance standard. The spectroradiometer shall be set up such that the reflectance standard is at a 45° angle with the line of sight of the spectroradiometer. The spectral radiance of the reflectance standard shall be measured. The corrected spectral radiance shall then be calculated using formula 12 and the NVIS radiance shall be calculated using the corrected spectral radiance and the formulas in 5.7.12.1.

5.7.12.3 Illuminated control radiance measurements.

Inspection shall be in accordance with 5.7.12.1.

5.7.12.4 Compartment lighting radiance measurements.

The NVIS radiance inspection for compartment lighting shall be the same as for secondary lighting (5.7.12.2) except that the distance between the test light and the reflectance standard shall be adjusted to be equivalent to the distance at which the lighting component will be used when installed in an aircraft.

5.7.12.5 Utility, work, map, and inspection lighting radiance measurements.

Inspection shall be the same as for secondary lighting (5.7.12.2).

5.7.12.6 Caution and advisory light radiance measurements.

Inspection shall be in accordance with 5.7.12.1.

5.7.12.7 Jump light radiance measurements.

Inspection shall be in accordance with 5.7.12.1.

5.7.12.8 Signal indicator radiance measurements.

Inspection shall be in accordance with 5.7.12.1.

5.7.12.9 Electronic and electro-optical display radiance measurements.

Inspection shall be in accordance with 5.7.12.1. The acquiring activity shall specify the number and type of colors or composite colors that shall be measured. The spectroradiometer shall be placed so that as much of the display as reasonably possible is within the spectroradiometer test field.

5.7.12.10 HUD system radiance measurements.

Inspection shall be in accordance with 5.7.12.1 and as stated herein. If the display is unable to generate the luminance level specified in TABLE III, NVIS radiance shall be measured at the display's maximum luminance level and scaled to the specified luminance level.

MIL-STD-3009

5.7.12.11 Floodlighted instrument, console, and panel radiance measurements.

The NVIS radiance inspection of instruments, consoles, and panels intended to be floodlighted shall be in accordance with 5.7.12.1 except that the instrument console or panel shall be floodlighted to the specified luminance levels by the same type of light that will be used when the panel is installed in the aircraft.

5.7.13 Light leak inspection.

The lighting component, system, or subsystem shall be illuminated as specified and examined through the NVIS for evidence of light leakage.

5.8 Exterior lighting verification.

5.8.1 Anticollision lighting verification.

The normal FAA Part 23 or 25 mode (e.g., chromaticity) shall be verified by laboratory test. The Infrared or IR or Covert mode shall be verified by inspection of the installed anticollision lights. The IR mode inspection shall be defined as NOT viewable by a dark adapted, unaided eye at a distance greater than 30 feet, in the dark (i.e., less than 1 footcandle ambient illumination), and when the system is on the ground. The mode shall be viewable by NVIS at minimum distance of 3 NM in the air, at night, with a ¾ to full moon, and with all other system exterior lights off. "Lower hemisphere" shall be defined as not directly viewable by an NVIS equipped ground or aerial observer when the system is directly overhead, straight and level, and 100 to 500 feet away. The six IR ON flash patterns, BOTH ON mode, mode selection, and dimmability shall be verified by inspection.

5.8.2 Position lights verification.

The NVIS "friendly" and FAA Part 23 or 25 modes shall be verified by laboratory test. The Infrared or IR or Covert mode shall be verified by inspection of the installed position lights. The IR mode inspection shall be defined as not viewable by a dark adapted, unaided eye at a distance greater than 30 feet, in the dark (i.e., less than 1 footcandle ambient illumination), and when the system is on the ground. The IR mode shall be viewable by NVIS at minimum distance of 3 NM in the air, at night, with a ¾ to full moon, and with all other exterior lights off. "Lower Hemisphere" shall be verified by inspection. "Lower Hemisphere" shall be defined as not directly viewable by an NVIS equipped ground observer or aerial observer when the system is directly overhead, straight and level, and 100 to 500 feet away. Mode selection and dimmability shall be verified by inspection.

5.8.3 Tanker boom marker and nozzle illumination verification.

The additional IR light or a light with a strong IR component shall be verified by inspection. The additional IR light, or a light with a strong IR component, shall be viewable by an NVIS equipped observer at a minimum distance of 2NM, in the air, during a three-quarter- to full-moon night. All other system exterior lights shall be off during the inspection.

MIL-STD-3009

5.8.4 Formation lights verification.

The NVIS compatibility of formation lights shall be verified by laboratory test. The Infrared or IR or Covert mode shall be verified by inspection of the installed formation lights. The IR mode inspection shall be defined as not viewable by a dark adapted, unaided eye at a distance greater than 30 feet, in the dark (i.e., less than 1 footcandle ambient illumination), and when the system is on the ground. The IR mode shall be viewable by NVIS at minimum distance of 3 NM in the air, at night, with a ¾ to full moon, and with all other exterior lights off. "Lower hemisphere" shall be verified by inspection. "Lower Hemisphere" shall be defined as not directly viewable by an NVIS equipped ground observer or aerial observer when the system is directly overhead, straight and level, and 100 to 500 feet away. The BOTH ON mode, mode selection, and dimmability shall be verified by inspection.

MIL-STD-3009

6. NOTES (This section contains information of general or explanatory nature that may be helpful but is not mandatory.)

6.1 Intended use.

The lighting requirements specified herein are intended to cover all of the aircraft interior and exterior lighting of equipment areas, crew stations, and compartments in which air crew members must perform their duties while wearing NVIS.

6.2 Issue of DoDISS.

When this standard is used in acquisition, the applicable issue of the DoDISS must be cited in the solicitation (See 2.2.1 and 2.2.2).

6.3 International standardization.

Certain provisions of this standard may be the subject of international standardization agreements (subject to how the document is tailored for a given program). When amendment, revision, or cancellation of this standard is proposed that will modify the international agreement concerned, the preparing activity will take appropriate action through international standardization channels, including departmental standardization offices, to change the agreement or make other appropriate accommodations.

6.4 Rationale.

Rationale relating to the requirements of this document is available in APPENDIX C herein.

6.5 Subject term (keyword) listing.

chromaticity
console
controls
crewstation
daylight readability
direct image
display
lights
night vision goggles
photometer
projected image
radiance
spectroradiometer

MIL-STD-3009

6.6 Metrication.
The following conversion factors are applicable to this document:

Inches X 25.4 = millimeters (mm)
Foot X 0.3048 = meters (m)
Foot Lamberts (fL) X 3.426751 = candela per $m^2$ ($cd/m^2$) or (NITS)
Foot candles (fc) X 10.76391 = lumens per meter square or lux (lx)

For conversions of photometric units in this document, the converted number is rounded off as long as round-off error can be limited to less than 1% of the value.

MIL-STD-3009

APPENDIX A

SPECTRAL RADIANCE, LUMINANCE, AND ILLUMINANCE MEASURING EQUIPMENT

A.1 SCOPE

A.1.1 Scope.
This appendix details the requirements of the chromaticity, spectral radiance, luminance, and illuminance measurement equipment to be used when performing measurements in accordance with this document. This appendix is a mandatory part of this document. The information contained herein is intended for compliance.

A.2 APPLICABLE DOCUMENTS

This section is not applicable to this appendix.

A.3 SPECTRORADIOMETER

A.3.1 Chromaticity and spectral radiance measurement.
Chromaticity and spectral radiance measurements shall be made using a spectroradiometer meeting the requirements herein. The following calibrations and checks shall be performed within the time period specified in order to assure that the spectroradiometer meets the requirements of this specification. Records of how the spectroradiometer calibration was performed, when performed, and the standard lamp used shall be maintained by the contractor and shall be available for Government inspection.

A.3.2 Spectroradiometer sensitivity.
The spectroradiometer, when assembled as a complete system, shall have sufficient sensitivity to permit measurement of radiance levels equal to or less than that listed in the tabulation below at a half-power bandwidth of 10 nm and a signal to root-mean-square noise ratio of 10:1.

| Wavelength | Radiance Level |
| --- | --- |
| 380 to 600 nm | $1.0 \times 10^{-10}$ W/cm$^2$ sr nm |
| 600 to 900 nm | $1.7 \times 10^{-11}$ W/cm$^2$ sr nm |
| 900 to 930 nm | $1.0 \times 10^{-10}$ W/cm$^2$ sr nm |

MIL-STD-3009
APPENDIX A

A.3.2.1 Spectroradiometer sensitivity calibration.

Calibration of the spectroradiometer shall be performed within six months (or more frequently if required to insure that the spectroradiometer meets the requirements specified herein) prior to taking a measurement. This calibration shall be traceable to National Institute of Standards and Technology (NIST) standards. The calibrations shall be performed over the wavelength band and at intervals consistent with the measurements to be made. The calibration shall demonstrate that the spectroradiometer meets the sensitivity requirements of A.3.2. A separate calibration must be performed for each spectroradiometer configuration used during tests. For example, a calibration must be performed for each set of optics used, or when filters are used in front of the spectroradiometer.

A.3.3 Wavelength accuracy and repeatability.

The wavelength accuracy shall be within ±1.0 nm. The wavelength accuracy is the difference between the wavelength actually being measured and the indicated wavelength. Wavelength repeatability shall be within ±0.5 nm.

A.3.3.1 Wavelength accuracy and repeatability verification.

Wavelength accuracy and repeatability shall be verified within one month prior to taking a measurement using a source with known emission lines. As a minimum, the wavelength accuracy and repeatability shall be verified at one point in each 150-nm interval starting with 350 nm and ending with 950 nm. The wavelength accuracy and repeatability check shall be performed using either a scanning or non-scanning technique.

A.3.3.1.1 Scanning technique.

If the scanning technique is used, the spectroradiometer shall be utilized to measure the spectral radiance of the source by scanning from below the peak wavelength of the known emission line to be measured to above the peak wavelength in steps no greater than 0.1 nm. This process shall be repeated three times for each emission line that is used for the wavelength accuracy and repeatability test. The spectroradiometer shall be considered to have passed the wavelength accuracy test if, for each measurement, the wavelength of the measured peak is within 1 nm of the actual peak. The spectroradiometer shall be considered to have passed the wavelength repeatability test if, for each emission line tested, the wavelengths of the three measured peaks are within 0.5 nm of each other.

A.3.3.1.2 Non-scanning technique.

If the non-scanning technique is used, the monochromator shall be positioned to obtain a peak reading for each emission line tested. The wavelength of the peak reading shall be recorded. Each emission line shall be measured three times. During this test the monochromator entrance and exit slit widths shall be no greater than 1 nm. The spectroradiometer shall be considered to have passed the wavelength accuracy test if,

MIL-STD-3009
APPENDIX A for each measurement, the wavelength of the measured peak is within 1 nm of the actual peak. The spectroradiometer shall be considered to have passed the wavelength repeatability test if, for each emission line tested, the wavelengths of the three measured peaks are within 0.5 nm of each other.

A.3.4 Current resolution.

Where analog to digital (A to D) logic is used in the measurement of the current from the detector, the A to D conversion shall provide not less than ±2048 counts of resolution for each measurement scale or the resolution shall be equal to or better than ±0.05% of each measurement scale.

A.3.5 Zero drift.

During any given spectroradiometric scan, the maximum zero drift shall be less than 0.2% of the full scale reading on the most sensitive scale, after the appropriate warm up period. A capability shall be provided to allow zero drift to be checked before any given spectroradiometric scan.

A.3.6 Linearity.

Within any given measurement scale, the linearity shall be ±1% of the full-scale value. The linearity between any two measurement scales shall be ±2%.

A.3.6.1 Linearity verification.

The linearity of the spectroradiometer shall be verified within six months prior to taking a measurement. A linearity check shall be performed on each detector used during the test procedures. The spectroradiometer operational parameters shall not be varied during the linearity test. The linearity check shall be performed at a specific wavelength (to be determined by the contractor) which shall not be varied during the linearity test. A light source that can be precisely, mechanically, or optically varied in intensity shall be used for the linearity check. Acceptable methods that may be used to vary the intensity of the light source include the use of neutral density filters (with known transmission), precision apertures, superposition, or the inverse square law (provided the distance between the lamp and spectroradiometer can be precisely controlled using a photometric type bench). Dimming of the lamp through electronic means is unacceptable. The intensity of the lamp shall be adjusted to give a full scale reading on the lowest level of dynamic range of the spectroradiometer. Call the lamp output N and the reading on the spectroradiometer R. The intensity of the lamp shall be varied in accordance with the table below, and, in order to pass the linearity check, the output of the spectroradiometer, over its entire dynamic range (as applicable), shall be within the following limits.

MIL-STD-3009
APPENDIX A

| Lamp Output | Spectroradiometer Output |
|---|---|
| 0.1N | 0.1R ±0.01R |
| 0.5N | 0.5R ±0.01R |
| 5N | 5.0R ± 0.2R |
| 10N | 10R ± 0.2R |
| 50N | 50R ± 2.0R |
| 100N | 100R ± 2.0R |
| 500N | 500R ± 20R |
| 1000N | 1000R ± 20R |
| 5000N | 5000R ± 200R |
| 10000N | 10000R ± 200R |

A.3.7 Signal conditioning.

Controls shall be provided to permit the operator to improve or change the signal-to-noise ratio of a measurement.

A.3.8 Stray light.

Stray light within the spectroradiometer shall not adversely affect the accuracy of the spectroradiometer when tested in accordance with the procedures herein.

A.3.8.1 Stray light verification.

Stray light accuracy shall be verified within a six-month period prior to taking a measurement. Stray light accuracy shall be verified by measuring the spectral radiance of a NIST traceable standard of spectral radiance, which is filtered by a filter with known transmission that is NIST traceable. The measurement shall be made from 380 to 930 nm in 5 nm increments. The transmission of the filter shall be greater than 50% from 380 to 500 nm and less than 0.2% from 690 to 930 nm (see A.6.1). For the spectroradiometer to pass the stray light test, the measured value of spectral radiance at each wavelength shall be within 5% of the value calculated by multiplying the output of the standard lamp by the transmission of the filter. The stray light shall be checked for each configuration of optics that is used during the testing.

A.3.9 Spectroradiometer optics.

If the spectroradiometer is used for luminance measurements, the optics shall be capable of allowing measurements of spot sizes down to 0.18 mm (0.007 inch) with a full-scale sensitivity of 3.43 $cd/m^2$ (1.0 fL).

A.3.10 Spectroradiometer viewing system.

The viewing system shall be capable of locating the spot to be measured with a maximum error of 5% of the diameter of the spot to be measured.

MIL-STD-3009
APPENDIX A

A.3.10.1 Spectroradiometer viewing verification.

The accuracy of the viewing system shall be verified prior to taking a test measurement by placing a black card with a hole in front of a light source in such a manner that an aperture in the spectroradiometer optics covers the hole when viewed through the viewing system. The card shall then be moved back and forth in one axis orthogonal to the axis of the spectroradiometer until a peak reading is obtained on the spectroradiometer. The distance (A) the card was moved from its original position to the peak position shall be recorded. The card shall be placed back in its original position and then moved back and forth in the axis orthogonal to the axis of the first movement and orthogonal to the axis of the spectroradiometer until a peak reading is obtained on the spectroradiometer. The distance (B) the card was moved from its original position to the peak position shall be recorded. The viewing system of the spectroradiometer shall be considered to be aligned accurately if both A and B are less than 5% of the diameter of the spot size at the card. The monochromator shall be set at a single wavelength for the entire test. For instruments for which the viewing optics and measuring optics are one and the same, this task is not required.

A.3.11 Spectroradiometer accuracy.

The spectroradiometer shall yield a spectral radiance within ±5% of that of a NIST traceable standard of spectral radiance. This shall be measured at each 5-nm wavelength throughout the range of 380 nm to 930 nm. When measuring a NIST traceable standard of color temperature or chromaticity, the spectroradiometer shall yield chromaticity coordinates u' and v' within ±0.007 of their respective certificate values.

A.3.11.1 Spectroradiometer accuracy verification.

The accuracy shall be verified within a six-month period prior to taking a test measurement. Verification shall be performed by measuring a NIST traceable, spectral standard lamp--other than the lamp used to calibrate the spectroradiometer--and comparing the measured output to the certified output. The measured spectral radiance at each 5-nm wavelength over the 380- to 930-nm portion of the electromagnetic spectrum and the color coordinates calculated for the standard lamp shall not differ from the certified output by more than that specified in A.3.11 .

A.4 PHOTOMETER

A.4.1 Luminance measurement equipment.

Luminance measurements can be made using either a spectroradiometer meeting the requirements of A.3 through A.3.11 .1 above or a photometer meeting the requirements herein. When a photometer is used as part of the test equipment, the following calibrations and checks shall be verified within a year prior to taking a

MIL-STD-3009
APPENDIX A measurement in order to assure that the photometer meets the requirements of this document. Records of calibrations and checks shall be maintained by the contractor and shall be available for Government inspection.

A.4.2 Photometer calibration.
The photometer shall be calibrated using methods that are traceable to NIST standards.

A.4.2.1 Photometer sensitivity.
The full-scale sensitivity shall be 3.43 cd/m$^2$ (1.0 fL) or less, with a spot size of no greater than 0.18 mm (0.007 inch).

A.4.2.2 Photometer accuracy.
The measured luminance of a NIST traceable luminance standard shall be within ±2% of the NIST certified luminance.

A.4.2.3 Photometer sensitivity and accuracy verification.
The full-scale sensitivity and accuracy of the photometer shall be verified using a NIST traceable standard of luminance set to a luminance value less than or equal to 3.43 cd/m$^2$ (1.0 fL) and also equal to the known full-scale sensitivity value of one of the photometer ranges. Using a spot size no greater than 0.18 mm (0.007 inch) the photometer full-scale sensitivity shall be within ±2% of the NTIS traceable standard of luminance value.

A.4.3 Readout resolution.
The unit shall have a digital readout with a resolution better than or equal to 0.1% of full scale.

A.4.4 Photometer optics.
The optics shall be capable of allowing measurements of spot sizes down to 0.18 mm (0.007 inch) while meeting the sensitivity requirements of A.4.2.1. The optics shall be capable of focusing to within 10 cm (4.0 inches).

A.4.5 Photometer viewing system.
The viewing system must be capable of locating the spot to be measured with a maximum error of 0.05 mm (0.002 inch).

MIL-STD-3009
APPENDIX A

A.4.5.1 Photometer viewing system verification.

A black card, with a hole in the center, shall be placed in front of a light source in such a manner that the smallest aperture of the photometer optics covers the hole when viewed through the viewing system. The card shall be moved back and forth in one axis orthogonal to the axis of the photometer until a peak reading is obtained on the photometer. The distance (A) the card was moved from its original position to the peak position shall be recorded. The card shall be placed back in its original position and then moved back and forth in the axis orthogonal to the axis of the first movement and orthogonal to the axis of the photometer until a peak reading is obtained on the photometer. The distance (B) the card was moved from its original position to the peak position shall be recorded. The viewing system of the photometer shall be considered to be aligned accurately if both A and B are less than or equal to 0.05 mm (0.002 inch). For instruments in which the viewing aperture and measuring aperture are one and the same, this test is not required.

A.4.6 Photometer polarization error.

The polarization error shall be no greater than 1%.

A.4.6.1 Photometer polarization error verification.

The polarization error shall be checked by placing a linear polarizer in the optical path between the standard lamp and the photometer and then measuring the luminance. The polarizer shall be rotated 45° and another measurement shall be made. The polarizer shall be rotated another 45° and another measurement shall be made. The photometer shall be considered as having passed the polarization error test if the difference between the three measurements is lower than or equal to the percent error specified in A.4.6. Throughout the test the alignment of the standard lamp shall not be changed. The transmission of the linear polarizer shall be greater than or equal to 20%, and the transmission of two pieces of the polarizer material, when oriented so that the direction of polarization of the two pieces are at right angles, shall be less than or equal to 0.1%.

A.4.7 Colorimetry.

When colorimetry capability is required, the photometer shall be calibrated to measure the NVIS color for the application (i.e., NVIS Green A, NVIS Green B, NVIS Yellow or NVIS Red). The calibration shall be traceable to NIST standards.

MIL-STD-3009
APPENDIX A

A.5 REFLECTANCE STANDARD

A.5.1 Reflectance standard.

The reflectance standard shall have a lambertian reflecting surface with reflectivity greater than 90% from 380 nm to 930 nm. The length and width of the reflecting surface shall be at least 5 cm (2 inches) by 5 cm (2 inches).

A.5.1.1 Reflectance standard verification.

The reflectance of the reflectance standard shall be measured within a six-month period prior to each test. The measured reflectance shall be used as a calibration figure whenever the reflectance standard is used. The measurement of the reflectance shall be traceable to NIST standards. The reflectance standard shall be calibrated using the same orientation as that used in 5.7.11 and 5.7.12.

A.6 NOTES

A.6.1 Filter.

A 3-mm (0.12-inch) thick piece of Schott BG-23 or equivalent should meet the transmission requirements of A.3.8.1.

MIL-STD-3009

APPENDIX B

SAMPLE CALCULATIONS

B.1 SCOPE

B.1.1 Scope.
This appendix contains sample calculations used to determine compatibility with NVIS. Radiometers designed to perform NVIS measurements normally perform these calculations automatically. This appendix is not a mandatory part of this document. The information contained herein is intended as guidance only. The following sample calculations are based upon data obtained during the measurement of one particular lighting component, an advisory signal light. The chromaticity coordinates and NVIS radiance values derived from the following sample calculation apply to this particular device only.

B.2 APPLICABLE DOCUMENTS

This section is not applicable to this appendix.

B.3 NVIS RADIANCE CALCULATIONS

As specified in TABLE III of this standard, the required luminance level for NVIS radiance, $L_r$, for advisory signals is 0.343 cd/m² (0.1 footlamberts (fL)). If it can be shown that the luminance and radiance of the lighting device scale together, the measurement can be taken with the lighting component at the rated drive condition or with sufficient drive to produce 51.5 cd/m² (15 fL), whichever is less (as specified in section 5.7.12 of the standard). This will increase the signal-to-noise ratio in the measurement of spectral radiance but must be carefully restricted for devices like LCD's, where radiance does not change in proportion to luminance. The luminance of the lighting component at rated drive conditions, $L_m$, was measured by the spectroradiometer to be 6.1108 cd/m² (1.7839 fL). From this information a scaling factor can be generated using formula 13:

$$S = \frac{L_r}{L_m} = \frac{0.343 \text{ cd/m}^2}{6.1108 \text{ cd/m}^2} = 0.0561 \qquad \text{(Formula 13)}$$

Where:

$S$ = scaling factor

MIL-STD-3009
APPENDIX B $L_r$ = required luminance level for NVIS radiance at specified luminance $L_m$ = luminance measured by the spectroradiometer FIGURE B-1 is a plot of the spectral output of the signal when it is energized to produce 6.1108 cd/m² (1.7839 fL). NVIS radiance at specified luminance for a class A device is then calculated using formula 14a:

$$\text{NVIS radiance at specified luminance} = S \int_{450}^{930} G_A(\lambda) \, N(\lambda) \, d\lambda \; NR_A \quad \text{(Formula 14a)}$$

Where:

$G_A(\lambda)$ = relative NVIS response (see TABLE IV)

$S$ = 0.05605

$N(\lambda)$ = spectral radiance of lighting component (W/cm² sr nm) (see FIGURE B-1)

$d\lambda$ = 5nm

NOTE: In FIGURE B-1, the units of radiance are (µW/cm² sr nm). To obtain the correct units of radiance for formula 14a, the values in FIGURE B-1 must be multiplied by $1.0 \times 10^{-6}$.

Performing the above calculation yields an NVIS radiance at specified luminance for this component of $4.736 \times 10^{-11}$ $NR_A$. This component conforms to the requirement of TABLE III to be not greater than $1.7 \times 10^{-10}$ $NR_A$ for Class A equipment.

To test for compatibility with Class B requirements, the same calculations are done but the $G(\lambda)_B$ NVIS response characteristic is used, as shown in equation 14b. The calculations then result in NVIS Radiance at specified luminance value of $5.24 \times 10^{-12}$ $NR_B$. The Class B NVIS Radiance requirement for advisory signals is NVIS Radiance not greater than $1.6 \times 10^{-10}$ $NR_B$. This component therefore conforms to the NVIS Radiance requirement for compatibility with Class B NVIS.

B.4 CHROMATICITY CALCULATIONS

As specified in TABLE III, chromaticity measurements shall be conducted on advisory signals when the component is energized to produce 0.343 cd/m² (0.1 fL ). FIGURE B-2 is a plot of the spectral output of the signal when it is energized to this luminance level. Formulas 5, 6 and 7 are used to calculate the following tristimulus values for this signal.

MIL-STD-3009
APPENDIX B $$X = \int_{450}^{680} \bar{x}\, N(\lambda)\, d\lambda = 1.90229 \times 10^{-7}$$

$$Y = \int_{450}^{680} \bar{y}\, N(\lambda)\, d\lambda = 5.12926 \times 10^{-7}$$

$$Z = \int_{450}^{680} \bar{z}\, N(\lambda)\, d\lambda = 8.47261 \times 10^{-9}$$

where:

$X, Y, Z$ = CIE tristimulus values
$\bar{x}, \bar{y}, \bar{z}$ = 1931 CIE relative spectral response of the eye These tristimulus values are then used to calculate the 1931 C.I.E. chromaticity coordinates using formulas 8 and 9.

$$x = \frac{X}{X+Y+Z} = 0.241443$$

$$y = \frac{Y}{X+Y+Z} = 0.651019$$

The 1976 UCS chromaticity coordinates can be calculated using formulas 10 and 11.

$$u' = \frac{4X}{X+15Y+3Z} = 0.0935$$

$$v' = \frac{9Y}{X+15Y+3Z} = 0.5672$$

Note that the 1976 UCS u' and v' chromaticity coordinates can also be calculated from the x,y values using equations published by the CIE, as they were in MIL-L-85762.

When substituted into formula 1 of 4.3.4, the 1976 UCS chromaticity coordinates indicate that this particular lighting component meets the requirements of TABLE III for "NVIS GREEN A" type I, class A compatible equipment.

$$(u' - u'_1)^2 + (v' - v'_1)^2 \leq (r)^2 \qquad \text{(Formula 1)}$$

Where: $u'_1 = .088$, $v'_1 = .543$ and $r = .037$

MIL-STD-3009
APPENDIX B
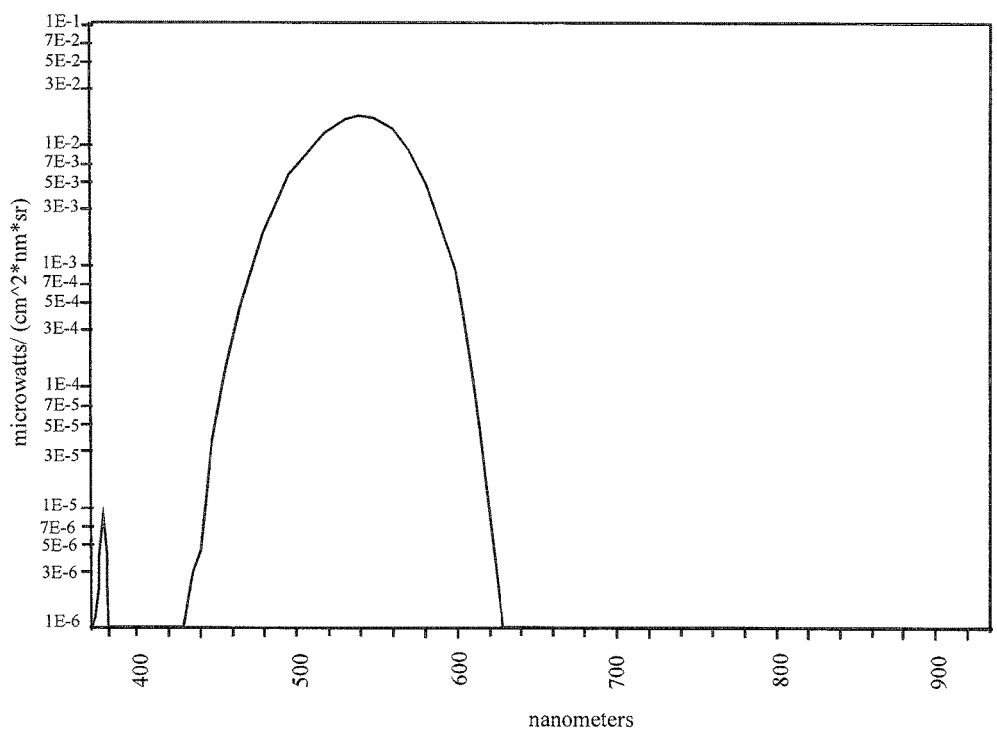
FIGURE B-1.   Spectral output of example signal at rated drive conditions (6.1108 cd/m$^2$) (1.7839fL).

MIL-STD-3009
APPENDIX B

| W-L | Rel. Resp. | W-L | Rel. Resp. | W-L | Rel. Resp. | W-L | Rel. Resp. |
|---|---|---|---|---|---|---|---|
| 370 | 7.3754E-07 | 510 | 1.2119E-02 | 650 | 8.5490E-08 | 790 | 1.3246E-07 |
| 375 | 9.6851E-06 | 515 | 1.3788E-02 | 655 | 8.5535E-08 | 795 | 1.3643E-07 |
| 380 | 3.3755E-07 | 520 | 1.5080E-02 | 660 | 8.5803E-08 | 800 | 1.4055E-07 |
| 385 | 2.3725E-07 | 525 | 1.6328E-02 | 665 | 8.5849E-08 | 805 | 1.4477E-07 |
| 390 | 1.8954E-07 | 530 | 1.7123E-02 | 670 | 8.6139E-08 | 810 | 1.4937E-07 |
| 395 | 1.6962E-07 | 535 | 1.7446E-02 | 675 | 8.6493E-08 | 815 | 1.5412E-07 |
| 400 | 1.5954E-07 | 540 | 1.7171F-02 | 680 | 8.7098E-08 | 820 | 1.5889E-07 |
| 405 | 1.5383E-07 | 545 | 1.6200E-02 | 685 | 8.7658E-08 | 825 | 1.6421E-07 |
| 410 | 1.4772E-07 | 550 | 1.4850E-02 | 690 | 8.8377E-08 | 830 | 1.6918E-07 |
| 415 | 1.4203E-07 | 555 | 1.3188E-02 | 695 | 8.9149E-08 | 835 | 1.7419E-07 |
| 420 | 1.3855E-07 | 560 | 1.1186E-02 | 700 | 9.0129E-08 | 840 | 1.7931E-07 |
| 425 | 1.3974E-07 | 565 | 9.1515E-03 | 705 | 9.1054E-08 | 845 | 1.8455E-07 |
| 430 | 2.9100E-06 | 570 | 7.0494E-03 | 710 | 9.2189E-08 | 850 | 1.9024E-07 |
| 435 | 4.6091E-06 | 575 | 5.1191E-03 | 715 | 9.3707E-08 | 855 | 1.9635E-07 |
| 440 | 2.2454E-05 | 580 | 3.4680E-03 | 720 | 9.5104E-08 | 860 | 2.0274E-07 |
| 445 | 6.0578E-05 | 585 | 2.1926E-03 | 725 | 9.6411E-08 | 865 | 2.0992E-07 |
| 450 | 1.1215E-04 | 590 | 1.2660E-03 | 730 | 9.7374E-08 | 870 | 2.1766E-07 |
| 455 | 2.4485E-04 | 595 | 6.6028E-04 | 735 | 9.7622E-08 | 875 | 2.2633E-07 |
| 460 | 4.5484E-04 | 600 | 3.0882E-04 | 740 | 9.5771E-08 | 880 | 2.3628E-07 |
| 465 | 8.2161E-04 | 605 | 1.1893E-04 | 745 | 9.4317E-08 | 885 | 2.4891E-07 |
| 470 | 1.3433E-03 | 610 | 4.3606E-05 | 750 | 9.6128E-08 | 890 | 2.6236E-07 |
| 475 | 2.1281E-03 | 615 | 1.2054E-05 | 755 | 1.0155E-07 | 895 | 2.7604E-07 |
| 480 | 3.1192E-03 | 620 | 3.9837E-06 | 760 | 1.0799E-07 | 900 | 2.8953E-07 |
| 485 | 4.3367E-03 | 625 | 8.6170E-08 | 765 | 1.1334E-07 | 905 | 3.8283E-07 |
| 490 | 5.7409E-03 | 630 | 8.5718E-08 | 770 | 1.1777E-07 | 910 | 3.1601E-07 |
| 495 | 7.2920E-03 | 635 | 8.5459E-08 | 775 | 1.2149E-07 | 915 | 3.2946E-07 |
| 500 | 8.8926E-03 | 640 | 8.5308E-08 | 780 | 1.2519E-07 | 920 | 3.4522E-07 |
| 505 | 1.0478E-03 | 645 | 8.5455E-08 | 785 | 1.2876E-07 | 925 | 3.6457E-07 |
|   |   |   |   |   |   | 930 | 3.8781E-07 |

FIGURE B-1. Spectral output of example signal at rated drive conditions (6.1108 cd/m2) (1.7839fL) - Continued.

MIL-STD-3009
APPENDIX B
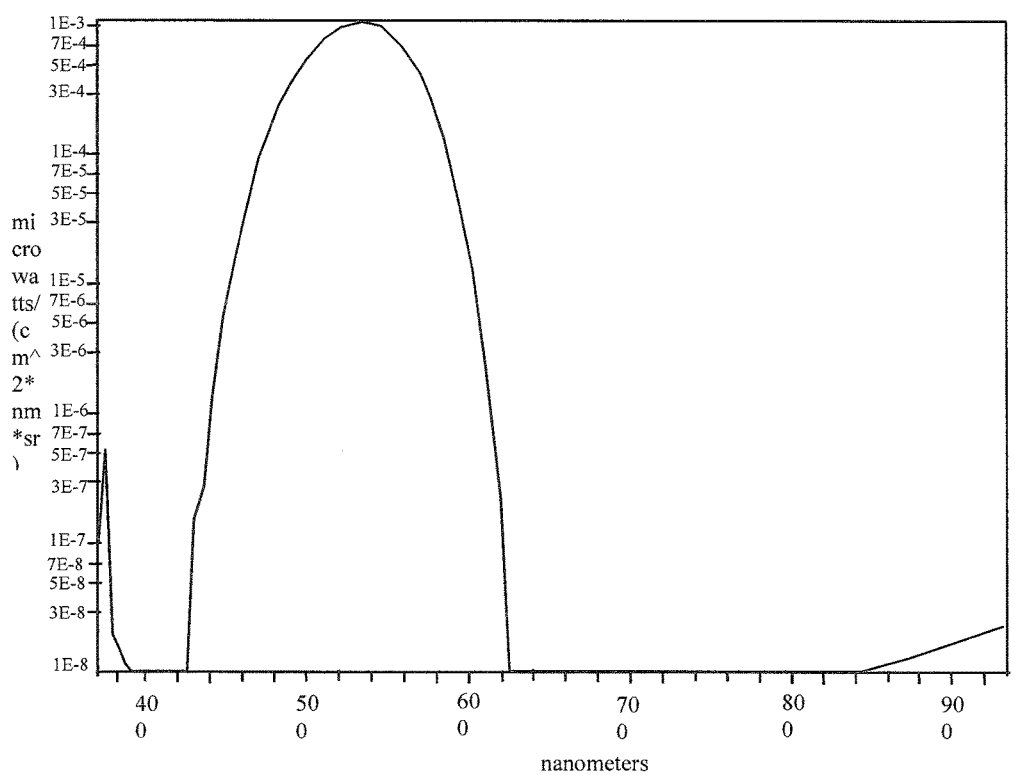
FIGURE B-2. Spectral output of example signal at 0.343 cd/m² (0.1 fL).

MIL-STD-3009
APPENDIX B

| W-L | Rel. Resp. | W-L | Rel. Resp. | W-L | Rel. Resp. | W-L | Rel. Resp. |
|---|---|---|---|---|---|---|---|
| 370 | 4.1344E-08 | 515 | 7.7290E-04 | 660 | 4.8099E-04 | 805 | 8.1152E-09 |
| 375 | 5.4292E-07 | 520 | 8.4535E-04 | 665 | 4.8124E-09 | 810 | 8.3734E-09 |
| 380 | 1.8922E-08 | 525 | 9.1528E-04 | 670 | 4.8287E-09 | 815 | 8.6396E-09 |
| 385 | 1.3299E-08 | 530 | 9.5984E-04 | 675 | 4.8485E-09 | 820 | 8.9070E-09 |
| 390 | 1.0625E-08 | 535 | 9.7796E-04 | 680 | 4.8824E-09 | 825 | 9.2053E-09 |
| 395 | 9.5086E-09 | 540 | 9.6253E-04 | 685 | 4.9138E-09 | 830 | 9.4840E-09 |
| 400 | 8.9434E-09 | 545 | 9.0811E-04 | 690 | 4.9541E-09 | 835 | 9.7644E-09 |
| 405 | 8.6230E-09 | 550 | 8.3245E-04 | 695 | 4.9974E-09 | 840 | 1.0051E-08 |
| 410 | 8.2810E-09 | 555 | 7.3926E-04 | 700 | 5.0524E-09 | 845 | 1.0345E-08 |
| 415 | 7.9616E-09 | 560 | 6.2707E-04 | 705 | 5.1042E-09 | 850 | 1.0664E-08 |
| 420 | 7.7668E-09 | 565 | 5.1300E-04 | 710 | 5.1678E-09 | 855 | 1.1007E-08 |
| 425 | 7.8335E-09 | 570 | 3.9517E-04 | 715 | 5.2529E-09 | 860 | 1.1365E-08 |
| 430 | 1.6313E-07 | 575 | 2.8696E-04 | 720 | 5.3312E-09 | 865 | 1.1767E-08 |
| 435 | 2.5837E-07 | 580 | 1.9440E-04 | 725 | 5.4045E-09 | 870 | 1.220lE-08 |
| 440 | 1.2587E-06 | 585 | 1.2291E-04 | 730 | 5.4585E-09 | 875 | 1.2688E-08 |
| 445 | 3.3958E-06 | 590 | 7.0971E-05 | 735 | 5.4724E-09 | 880 | 1.3245E-08 |
| 450 | 6.2867E-06 | 595 | 3.7013E-05 | 740 | 5.3686E-09 | 885 | 1.3953E-08 |
| 455 | 1.3726E-05 | 600 | 1.7312E-05 | 745 | 5.2871E-09 | 890 | 1.4707E-08 |
| 460 | 2.5497E-09 | 605 | 6.6671E-06 | 750 | 5.3887E-09 | 895 | 1.5474E-08 |
| 465 | 4.6057E-05 | 610 | 2.4444E-06 | 755 | 5.6928E-09 | 900 | 1.6230E-08 |
| 470 | 7.5304E-05 | 615 | 6.7572E-07 | 760 | 6.0537E-09 | 905 | 1.6976E-08 |
| 475 | 1.1930E-04 | 620 | 2.2331E-07 | 765 | 6.3536E-09 | 910 | 1.7715E-08 |
| 480 | 1.7485E-04 | 625 | 4.8304E-09 | 770 | 6.6017E-09 | 915 | 1.8468E-08 |
| 485 | 2.4310E-04 | 630 | 4.8051E-09 | 775 | 6.8102E-09 | 920 | 1.9352E-08 |
| 490 | 3.2182E-04 | 635 | 4.7906E-09 | 780 | 7.0176E-09 | 925 | 2.0437E-08 |
| 495 | 4.0877E-04 | 640 | 4.7821E-09 | 785 | 7.2177E-09 | 930 | 2.1740E-08 |
| 500 | 4.9849E-04 | 645 | 4.7903E-09 | 790 | 7.4253E-09 | | |
| 505 | 5.8734E-04 | 650 | 4.7923E-09 | 795 | 7.6479E-09 | | |
| 510 | 6.7938E-04 | 655 | 4.7948E-09 | 800 | 7.8787E-09 | | |

FIGURE B-2. Spectral output of example signal at 0.343 cd/m$^2$ (0.1 fL) - Continued.

MIL-STD-3009

APPENDIX C

RATIONALE BEHIND THE REQUIREMENTS CONTAINED IN LIGHTING, AIRCRAFT, INTERIOR, NIGHT VISION IMAGING SYSTEM (NVIS) COMPATIBLE

C.1. SCOPE

C.1.1 Scope.
This appendix explains the rationale behind the requirements contained in MIL-STD-3009. This appendix is not a mandatory part of the standard; it is intended as guidance only.

C.2. APPLICABLE DOCUMENTS
See REFERENCES at the end of APPENDIX C.

C.3. RATIONALE FOR THIS DOCUMENT
MIL-STD-3009 is derived from a former military specification, MIL-L-85762A. This appendix is provided so users of this document will be able to understand how the requirements were generated and what the requirements mean. ASC/ENFC 96-02 was an interim document generated in early 1996 and is replaced by this standard. This appendix was derived from NADC-87060-20, a technical report by Ferdinand Reetz III of the Tactical Air Systems Department of the Naval Air Development Center, Warminster, PA 18974-5000. By understanding what the requirements mean, users will be better able to utilize the document and, more importantly, be better able to make a judgment when, and if, deviations are requested.

C.3.2 Summary.
MIL-L-85762A, from which this NVIS interface standard is derived, was written by a Joint Aeronautical Commanders Tri-Service Committee with NAVAIRDEVCEN serving as the lead technical laboratory for that committee. This standard defines the requirements for NVIS compatibility the same way as they were defined in MIL-L-85762, but most other design requirements and references have been removed. This standard was developed in order to comply with the Perry directive, which restricts Government agencies from contractually citing detailed design requirements.

During the development of MIL-L-85762, many laboratory and aircraft flight tests were conducted to define what NVIS-compatible lighting is and how it can be achieved. Also, unique test equipment and measuring techniques were developed and a new unit of

MIL-STD-3009
APPENDIX C measurement was developed to adequately describe NVIS-compatibility requirements. Since NVIS compatibility is a difficult subject to understand, and because almost every aircraft in the military inventory eventually will be required to be NVIS-compatible, the Joint Aeronautical Commanders Group for Aviation Lighting decided to fund the writing of the original rationale document. Its purpose is to provide cockpit lighting designers and program managers a document to which they can refer when designing and specifying NVIS-compatible lighting systems.

C.3.3 Background.

MIL-L-85762 was approved on 24 Jan 1986 by the Navy, Army, and Air Force for procurement of lighting components that are intended to be compatible with the AN/AVS-6 Aviator's Night Vision Imaging System (ANVIS). In the following year, the use of Night Vision Imaging Systems (NVIS) as an aid to pilot vision during night missions significantly increased. The types of aircraft utilizing the NVIS diversified, and other types of NVIS were developed to meet the individual needs of the various aviation groups. As a result, MIL-L-85762 was revised to address the different types of NVIS in use (e.g., Aviators Night Vision Imaging System (ANVIS) and Cats Eyes). The revision, MIL-L-85762A, provided the lighting requirements for other NVIS in addition to the ANVIS. Specifically, MIL-L-85762A included the lighting requirements for a projected image NVIS (such as the Cats Eyes NVIS), as well as covering the lighting requirements for NVIS equipped with a "minus-blue" filter that has its 50% transmission point at approximately 665 nanometers (nm) in contrast with the 625 nm 50% point typically used in the ANVIS.

This standard defines the requirements for NVIS compatibility the same way as they were defined in MIL-L-85762, but most of the other design requirements and references to military specifications and standards have been removed. This document was developed in order to comply with the Perry directive, which prohibits Government agencies from invoking documents containing detailed design requirements into contracts. It also contains new requirements defining the "leaky green" filter and various types of compatible exterior lighting.

C.3.4 NVIS background.

NVIS are passive, helmet-mounted, binocular image intensification devices that utilize third-generation image intensification tubes. NVIS equipped with these tubes are extremely sensitive to radiation in the 600 to 900 nm portion of the electromagnetic spectrum (orange to near infrared). NVIS operate by converting photons of the outside night scene into electrons using a gallium-arsenide photocathode, amplifying the electrons with a microchannel plate, and converting the electrons back into visible light as they impinge upon a phosphor screen (see FIGURE C-1). The phosphor is normally P-20 (or KA in the new phosphor designation system). Because NVIS magnify the intensity of light sources approximately 2000 times, bright lights emitting energy in that portion of the electromagnetic spectrum in which the NVIS are sensitive produces severe veiling glare that can obscure the overall image[1]. To prevent this, and to protect the image intensifier assembly from permanent phosphor burns, NVIS are equipped

MIL-STD-3009
APPENDIX C with an automatic gain control (AGC). The AGC decreases the sensitivity of the image intensifier tubes when they are exposed to bright lights emitting energy in the NVIS-sensitive portion of the electromagnetic spectrum. Whenever the NVIS are exposed to cockpit lighting that is too intense (from approximately 600 to 900 nm in wavelength) the AGC is activated, the NVIS become less sensitive to the radiance of the outside scene, and the pilot can no longer see objects outside the cockpit. To achieve compatibility of the cockpit lighting with the NVIS, the cockpit lighting should have a spectral radiance with little or no overlap into the spectral response of the NVIS image intensifier tubes.

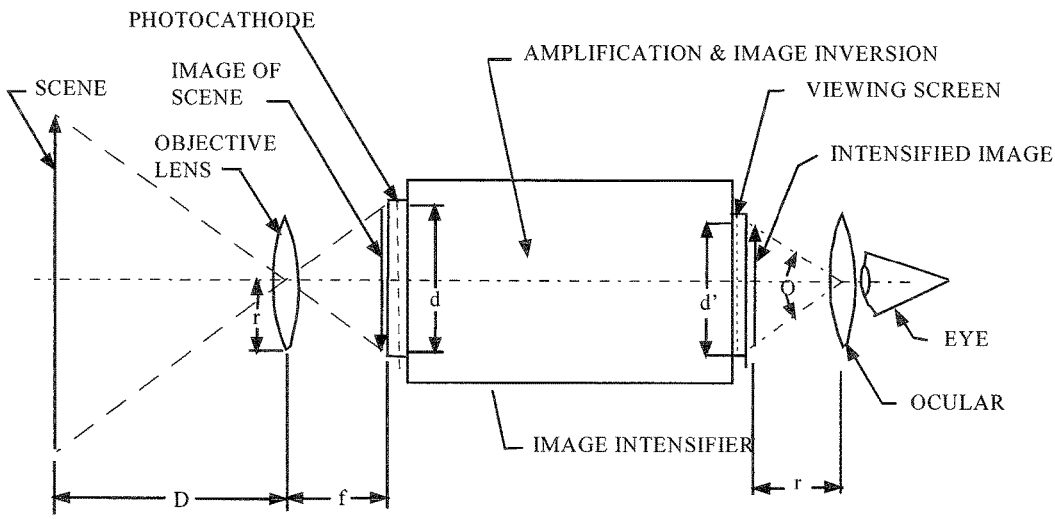

FIGURE C-1. Diagram of an image intensifier.

Aircrew personnel use NVIS to see the terrain outside the cockpit. With all current NVIS designs (except the original AN/PVS-5), the pilot looks inside the cockpit with his unaided eye to read instruments and displays. Although the cockpit lights should have very little energy output in the spectral region in which the NVIS are sensitive, the lights must also be visible to the unaided eye. To allow the pilot to easily view the cockpit, the cockpit lights should emit energy that is optimized for the luminous efficiency of the human eye. FIGURE C-2 illustrates the requirements of NVIS-compatible cockpit lighting.

MIL-STD-3009
APPENDIX C

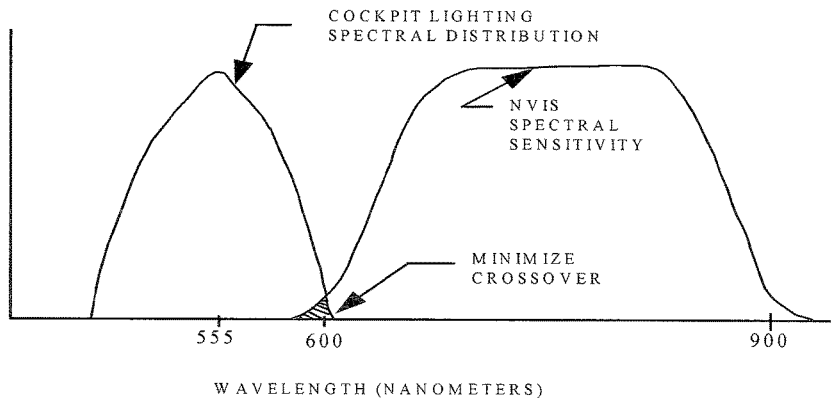

FIGURE C-2. Conceptual diagram of the spectral distribution of NVIS-compatible lighting.

The brightness and spectral characteristics of conventional aircraft lighting cause the AGC of NVIS to activate. Thus NVIS cannot be used with most existing cockpit lighting. To alleviate this problem and provide compatibility with NVIS operation, the cockpit lighting must be modified or redesigned to reduce the spectral radiance output in the NVIS-sensitive portion of the electromagnetic spectrum.

Many different methods have been attempted to achieve NVIS-compatible aircraft lighting. For instrument lighting, successful methods include floodlighting as well as external bezel and integral lighting using filtered incandescent lamps and filtered electroluminescent (EL) lamps. For light plates, filtered incandescent lighting, filtered EL lighting, and filtered light emitting diodes (LED's) have been successfully used. Some manufacturers have also developed daylight-readable/NVIS-compatible displays and indicators. NVIS-compatible lighting components are available from a variety of manufacturers and have been successfully used on a variety of different aircraft [2, 3, 4, 5]. However, prior to the issuance of MIL-L-85762, there existed no agreed-upon method for specifying and testing NVIS-compatible lighting components. Many past procurement documents told the manufacturer to "make the lighting NVIS-compatible" and the manufacturer was left to its own devices to interpret what that meant. Some manufacturers were more successful than others. As a result, some components that are proclaimed to be "NVIS-compatible" do not meet the requirements of MIL-L-85762 or this standard.

Because a standard method of defining and measuring NVIS compatibility was needed, funding was provided in April 1983 to begin work on a lighting standard. This work led to the development of MIL-L-85762 and MIL-L-85762A. These specifications define the requirements and quantitative testing methodology for NVIS-compatible lighting components.

MIL-STD-3009
APPENDIX C

C.4. DISCUSSION

C.4.1 Interactions.

In defining NVIS-compatible aircraft interior lighting a number of interactions must be considered. When a pilot uses NVIS in an aircraft, energy from both the outside world and the cockpit lighting enter the NVIS. In addition to viewing the intensified image, the pilot's eyes also receive unintensified energy from the cockpit lighting. FIGURE C-3 depicts these interactions. During the design of an NVIS-compatible cockpit lighting system, one must consider the balancing of the energy the eye receives from the NVIS and the unintensified aircraft lighting.

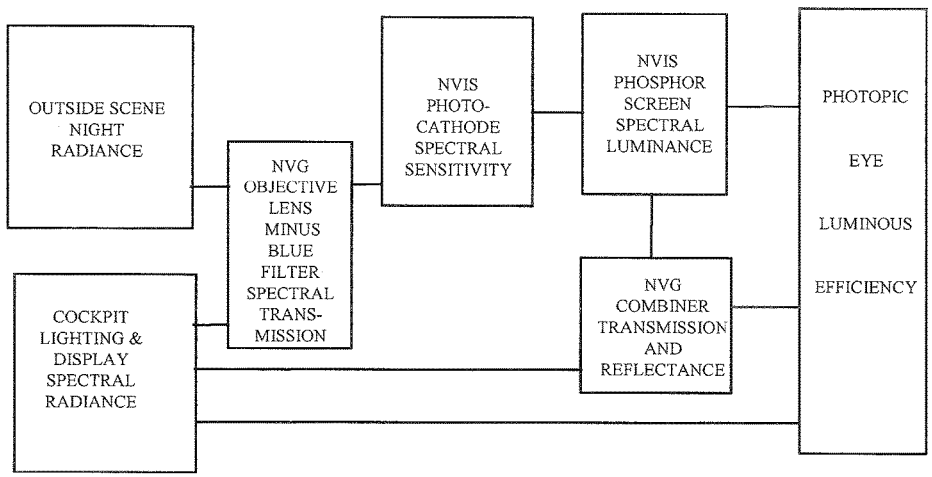

FIGURE C-3. NVIS interfaces.

During the early development of MIL-L-85762, a decision was made to write a specification that could be used in place of existing aircraft lighting specifications (specifically, MIL-L-18276 and MIL-L-6503) rather than add new requirements to existing specifications. This decision was based on the fact that it is easier to reference a single specification when NVIS-compatible lighting is desired rather than to invoke specific parts of a general lighting specification. Although MIL-L-85762 would become a nearly self-contained lighting specification, the scope of the effort required to write an NVIS-compatible lighting specification was limited to writing a lighting specification that would allow and define NVIS compatibility and not solve all of the current lighting problems. Consequently, many of the requirements contained in MIL-L-85762 were identical to the requirements contained in older lighting specifications such as MIL-L-18276 (used by the Navy and Army) and MIL-L-6503 (used by the Air Force). Requirements that existed in current lighting specifications were used unless they interfered with NVIS operation or were in conflict with accepted practice. Since MIL-L-

MIL-STD-3009
APPENDIX C 85762 was written as a tri-service specification, both MIL-L-18276 and MIL-L-6503 were used as baseline documents. In some cases, however, the specifications were in conflict. The conflicts were resolved by the tri-service Joint Aeronautical Commanders Group (JACG) for Aviation Lighting. In addition to resolving these conflicts, the JACG members reviewed and approved all requirements contained in MIL-L-85762.

ASC/ENFC 96-01 was written in 1996 specifically to comply with the guidance of the Perry directive, which severely limits the specification of design requirements in Government contracts. This standard was published to replace ENFC-96-01 with a more formal military standard. Other policy changes have limited the use of tiering (referencing other Government documents in a contractual document). Most programs are therefore prohibited from calling out MIL-L-85762A as a contractual requirement because it does not comply with these guidelines. It was decided that a document covering only the interface between NVIS and aircraft lighting was needed. This standard was written to fill this need, with the primary change from MIL-L-85762A being the removal of most of the requirements that define the configuration and design of lighting devices. This standard is intended to be referenced in a contractual performance specification. The performance specification will define what the lighting system must do (and how well it will do it), and the requirement to comply with MIL-STD-3009 will define how (in terms of specific radiance and color requirements) that lighting system will interface with NVIS.

Throughout the development of MIL-L-85762, industry representatives played an important role in the development of the requirements. As the requirements were being developed, lighting manufacturers received updates on progress through briefings given by Government personnel at Society of Automotive Engineers (SAE) and Aircrew Station Standardization Panel (ASSP) meetings. Industry representatives had numerous formal and informal opportunities to comment on the specification and many of their suggestions were incorporated into MIL-L-85762.

The following section explains the rationale behind most of the requirements in MIL-STD-3009. It skips over some paragraphs that are self-explanatory or for which a good explanation is not available. The rationale paragraphs use the same titles, and are in the same order, as the paragraphs in MIL-STD-3009. They do not repeat the requirements; therefore, the reader should refer to the body of the standard for the actual requirement statements. This appendix does not attempt to explain the rationale behind the requirements contained in the original lighting specifications that were the predecessors of MIL-L-85762A.

C.4.2 Classification.
MIL-STD-3009 lighting requirements have been broken down into Types and Classes to give the user the ability to specify the type and class of the lighting system, depending on the type of NVIS being used in the aircraft. These various types and classes of equipment were broken out because the cockpit lighting requirements vary depending on the type and class. The original issue of MIL-L-85762 only addressed Type I, Class A, NVIS; 86762A added Class B and MIL-STD-3009 adds Class C.

MIL-STD-3009
APPENDIX C

Type I: Type I lighting components are those lighting components that are compatible with Direct View Image NVIS. Direct View Image NVIS are defined as any NVIS using Generation III image intensifier tubes which display the intensified image on a phosphor screen in the user's direct line of sight -- such as the ANVIS.

Type II: Type II lighting components are those lighting components that are compatible with Projected Image NVIS. Projected Image NVIS are defined as any NVIS using Generation III image intensifier tubes which project the intensified image on a see-through medium that reflects the image into the user's direct line of sight -- such as the Cats Eyes.

Class A: Class A lighting components are those lighting components that are compatible with NVIS using a 625 nm minus-blue objective lens filter which results in an NVIS sensitivity as shown in FIGURE C-4. (Standard AN/AVS-6 ANVIS are equipped with a Class A filter.)

Class B: Class B lighting components are those lighting components that are compatible with NVIS using a 665 nm minus-blue objective lens filter meeting the requirements specified in FIGURE C-5.

Class C: Class C lighting components are those lighting components that are compatible with NVIS using a minus-blue objective lens filter meeting the requirements specified in FIGURE C-6. Class C was introduced more recently to allow the NVIS to have higher sensitivity in the green, to make HUD symbology more visible. Some aircraft have HUDs that use a hologram as the reflective element in the combining glass. Holograms typically work with only one wavelength of light. This feature can be used to improve the efficiency and see-through clarity of the HUD, but it means the light coming from the HUD is concentrated at one wavelength. Since this wavelength is in the green part of the spectrum and is blocked by the minus-blue filter in the NVIS, it is nearly impossible to see a holographic HUD with Class A or B NVIS. Consequently, modified NVIS have been built and tested which have a "notch" or "leak" in the green part of the spectrum.

Note that MIL-L-85762B addressed this concern by stating a minimum NR requirement for HUDs, but holographic HUDs do not meet this minimum. It is now believed that it is more cost effective to modify the NVIS (by adding the green leak) than it is to modify the design of the HUDs (with their inherently single wavelength hologram) to solve this problem. The desire to see the HUD through the NVIS, rather than with the naked eye, has also increased due to the improved resolution of new NVIS devices.

MIL-STD-3009
APPENDIX C

Efforts are underway on numerous projects to make the exterior lighting on aircraft NVIS compatible. A common problem has been in the definition of "compatible": one person thinks "compatible" means it can be seen with NVIS but not with the naked eye, while another thinks "compatible" means it can be seen with the naked eye but will have little or no effect on NVIS. This problem was addressed in MIL-STD-3009 by adding definitions and requirements for "NVIS friendly" and "covert" exterior lighting.

Using the above classifications, standard AN/AVS-6 ANVIS are Type I, Class A NVIS.

When invoking the requirements of MIL-STD-3009, the user must specify the type and class of lighting that is desired.

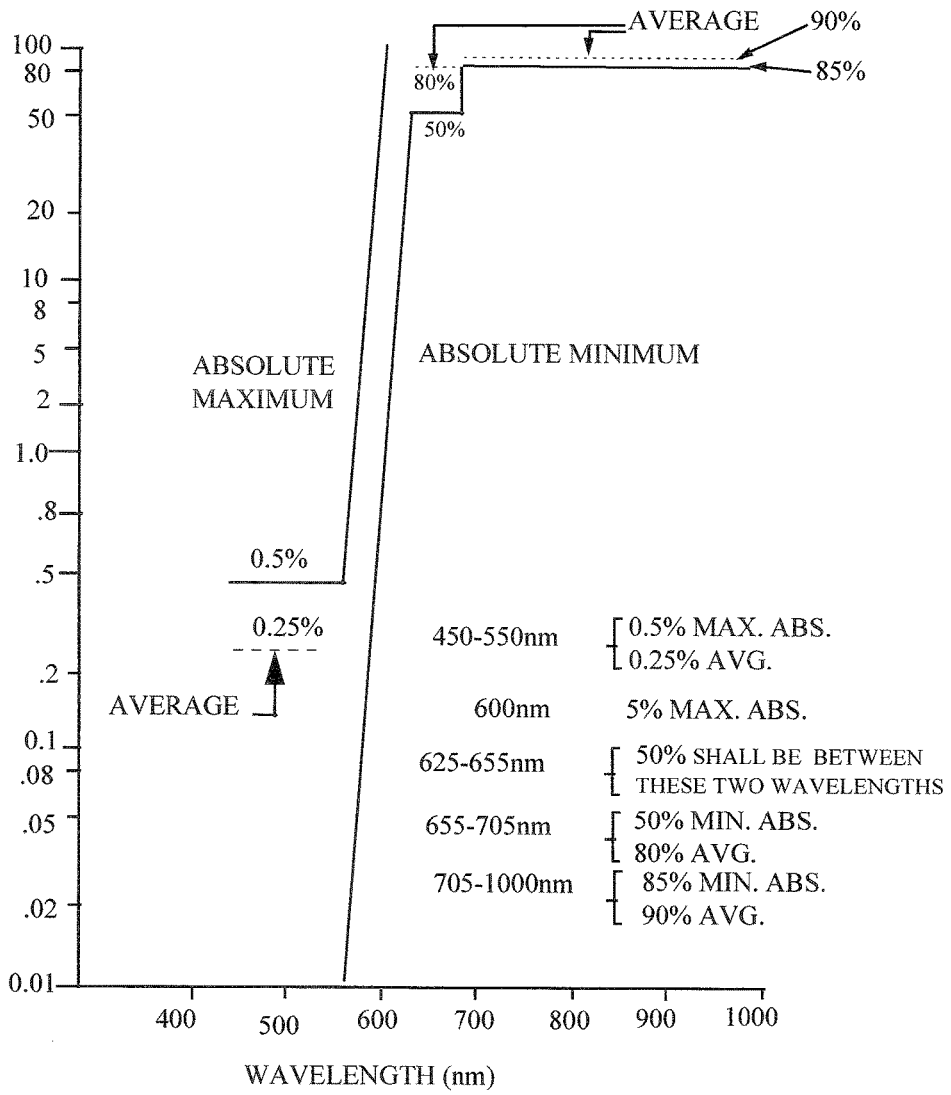
FIGURE C-4. Spectral transmission requirements for a Class A NVIS objective lens.

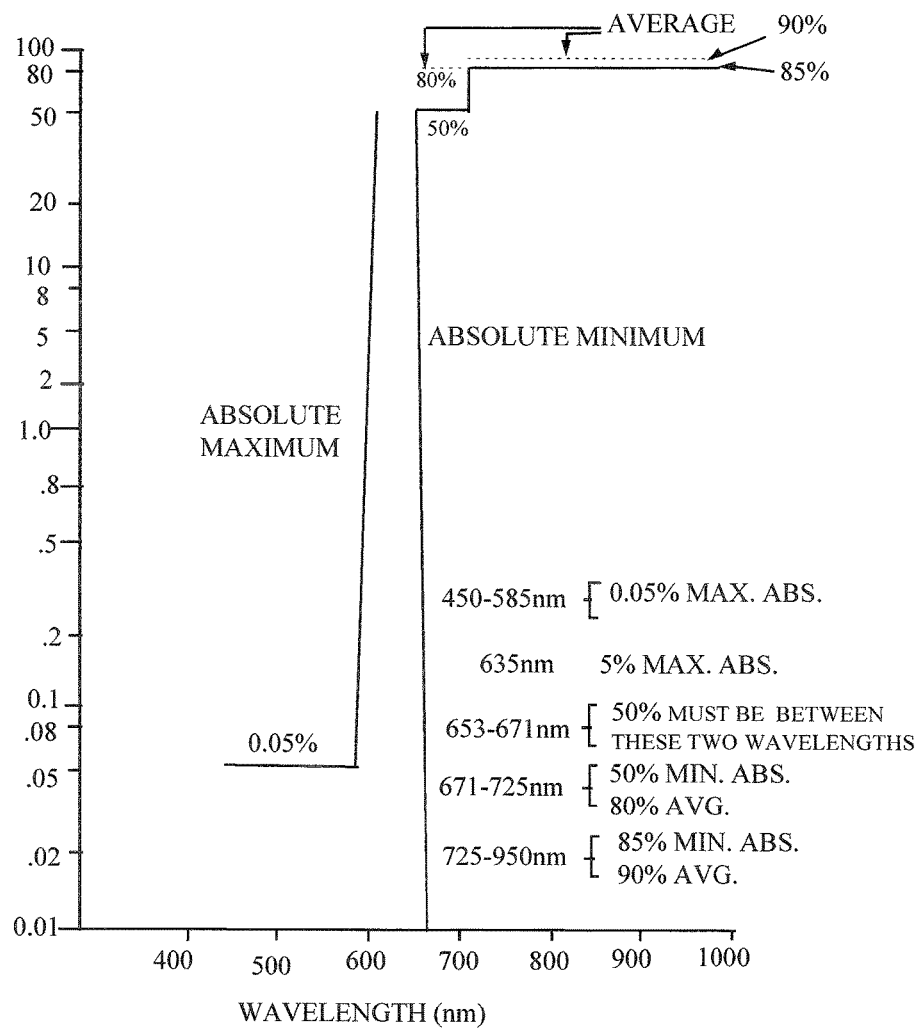
FIGURE C-5. Spectral transmission requirements for a Class B NVIS objective lens.

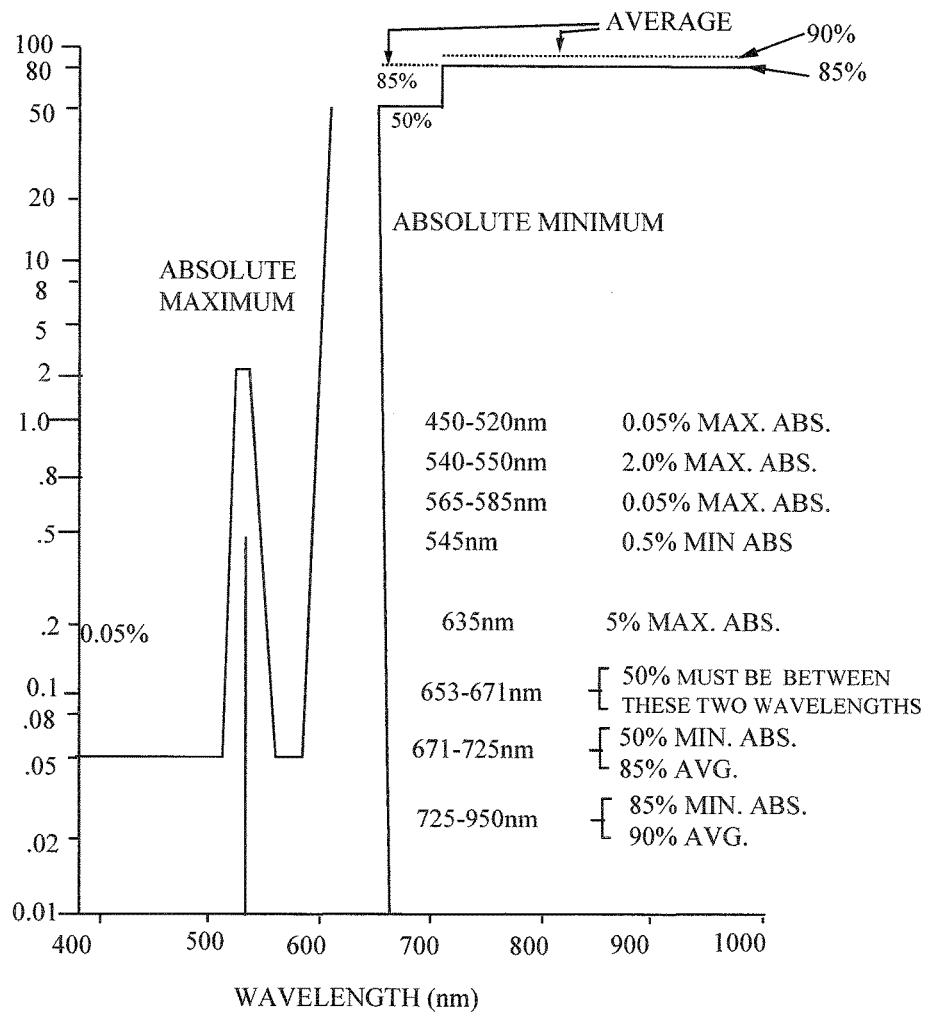
FIGURE C-6. Spectral transmission requirements for a Class C NVIS objective lens.

MIL-STD-3009
APPENDIX C

C.5. REQUIREMENTS

C.5.1 NVIS sensitivity characteristics.

FIGURE C-1 provides the NVIS sensitivity characteristics of the three classes of NVIS. Note that these curves will not match any one pair of NVIS accurately, since each unit built will have slightly different characteristics. The curves are intended to represent the classes of NVIS accurately enough to define the lighting compatibility criteria. This is analogous to the photopic and scotopic eye response curves, which are the basis for photometric measurements. The photopic curve represents a generic human vision capability and allows definition of standard photometric units, but it does not exactly match any one human's eye performance.

The class C curve in Fig 1 of the standard was measured from one pair of NVIS, so it does not include the kind of "worst case" characteristics that were included in the class A and B curves. The detailed shape of the response curve is not important to this standard because it has been found that class B compliant lighting equipment is generally compatible with class C NVIS.

C.5.2 Mockup.

Mockups are recommended for aircraft lighting systems and procedures are included in the verification section to verify NVIS compatibility. The option to conduct a mockup is left to the acquiring activity. There may be some instances when a mockup is not necessary. For example, a mockup may not be necessary if MIL-STD-3009 is invoked to procure a single piece of lighting equipment.

It may be asked why a mockup is needed at all. If a piece of equipment meets the requirements of MIL-STD-3009, it should work in a mockup. However, although the requirements of MIL-STD-3009 were written in an attempt to cover all possible cockpit geometries, certain cockpit configurations may cause NVIS compatibility problems. Therefore, the final test for cockpit compatibility needs to be conducted in a lighting mockup so that both unaided cockpit lighting visibility and external NVIS intensified visibility can be evaluated.

C.5.3 Light sources.

MIL-STD-3009 does not specify the type of lighting source (e.g., incandescent, Electroluminescent (EL), or Light Emitting Diode (LED)) because, depending on the application, one technology may be better than another. For example, when an aircraft equipped with incandescent lighting is being retrofitted, it is usually easier to retrofit with incandescent lighting than to convert to EL or LED lighting. When designing an aircraft from the beginning, one type of technology may be preferred because it draws less power, is lighter, or has a longer life. When procuring lighting components or lighting systems under a "performance specification" philosophy, the selection is left up to the contractor.

MIL-STD-3009
APPENDIX C

C.5.4 Compartment lighting.

Compartment lights must be shielded or located so that they are not visible from outside the aircraft. The acquiring activity must specify the areas that must be illuminated by compartment lights.

C.5.5 Emergency exit lighting.

Emergency exit lights that are manually activated do not have to be NVIS-compatible. Lights that are automatically activated during flight must be NVIS-compatible. Any lights that automatically activate during an in-flight emergency must be compatible so that the aircrew can see outside the aircraft while wearing NVIS in case a landing is required. Manual systems that can be controlled so that they need not be turned on until immediately before landing are not required to be NVIS-compatible.

C.5.6 Jump lights.

It is suggested that jump lights be shape-coded. When lights are viewed through the NVIS there is no color discrimination. If jump lights are the same shape, an operator wearing NVIS will not be able to distinguish between a "jump" and a "no jump" light. Shape coding allows operators to look at jump lights through NVIS and determine when the "jump" signal is given. The lights should also be color-coded to increase unaided eye viewing discrimination.

C.5.7 Work, map, and inspection lights.

Work, map, and inspection lights are required to be NVIS-compatible. NVIS may be used when maintenance is performed on an aircraft in a remote area. Also, the use of NVIS-compatible work and inspection lights make the aircraft less vulnerable to detection by enemy forces equipped with image intensification equipment. These lights may be NVIS Green A or NVIS White. NVIS white was added to allow better color vision, since color vision does not work with monochromatic light. Because the allowed radiance is higher for NVIS white, it will produce greater potential for interference with NVIS and therefore must be used with discretion.

C.5.8 Daylight legibility and readability.

This section was included in MIL-L-85762 and ENFC-96-01 but has been removed from this standard. Daylight legibility is a requirement for any equipment used in an environment exposed to sunshine and should be specified independently of whether or not NVIS compatibility is specified. See MIL-HDBK-87213 and JSSG-2010-5.

Electronic and electro-optical display daylight readability requirements were derived from papers written by Dr. Keith Burnette, working under contract to the Flight Dynamics Laboratory, Air Force Wright Aeronautical Laboratories, at Wright-Patterson Air Force Base. The requirements contained in these paragraphs are based on a

MIL-STD-3009
APPENDIX C variety of research efforts conducted by Dr. Burnette, and others, on requirements contained in other military specifications, and on field experience with aircraft displays. During the development of MIL-L-85762, there was debate over whether or not daylight readability requirements belonged in a specification covering NVIS-compatible lighting. Older military specifications (e.g., MIL-L-18276) addressed the daylight readability of switch indicators and other self-luminous displays. Therefore, it seemed logical that these kinds of requirements should be in MIL-L-85762. However, there were no military specifications covering the daylight readability of electro-optical displays at the time. Members of the JACG knew that the decision to address daylight readability of electro-optical displays in MIL-L-85762 would be met with some controversy because the display community had not come to a consensus opinion on what the requirements and test procedures should be. Nevertheless, it was decided that addressing the issue in MIL-L-85762 was better than ignoring the problem. In fact, while MIL-L-85762 was being written, a very similar requirement was also incorporated into AFGS-87213 (now MIL-HDBK-87213) by the Air Force.

C.5.9 Daylight legibility and readability of illuminated visual signals.
There are two possible requirements for illuminated visual signals depending on the location of the signal within the cockpit. One requirement is that illuminated signals must be legible in direct-reflected specular sunlight (where the angle of incidence is equal to the angle of reflection). This is the most severe lighting environment imposed on light-emitting indicators, readouts, etc. It represents the case where the indicator is not only in direct sunshine, but is positioned in such a way that the operator sees a specular reflection of a bright object, such as a white cloud in sunshine, shiny object in the cockpit, or the sun itself. The requirements contained in MIL-L-85762A and ASV/ENFC 96-01 are based on the requirements of MIL-S-22885, which have traditionally been applied to switches and indicators mounted in locations where a specular reflection of the sky may be visible. The contrast required is reduced to 0.4 (from the 0.6 required by MIL-S-22885) because of the greater difficulty of achieving high contrast on NVIS-compatible devices and the fact that the indicator typically will be seen in much more favorable ambient lighting conditions than the worst case simulated by the test.

The second (alternative) requirement is for illuminated signals not requiring legibility in direct-reflected specular sunlight. This requirement is for signals that must be read in a 10,000 footcandle (fc) diffuse environment, but which are located in the cockpit where it is impossible or unlikely to have a direct specular reflection of the sun. The requirements are taken directly from MIL-S-38039.

C.5.10 Daylight legibility and readability of electronic and electro-optical displays.
The requirements for electronic and electro-optical display contrast and luminance call for a combined environment of both diffuse light (producing 108,000 lux (10,000 fc) on the display face) and the specular reflection of a glare source (with a luminance of 6800 $cd/m^2$ (2000 fL)). CRT's, LED's, and LCD's are all considered to be electronic and electro-optical displays. There is also a "minimum luminance difference" requirement,

MIL-STD-3009
APPENDIX C which basically requires displays to have a high luminance in addition to achieving adequate contrast.

The combined diffuse and specular environment is intended to accurately simulate the lighting conditions in a fighter cockpit in direct sunshine. It is a more complicated test than either the specular or diffuse alone (discussed above), but this complexity is necessary to more accurately simulate the real environment in aircraft, and thus avoid over- or under-constraining the design of expensive electronic displays. The 108,000 lux (10,000 fc) diffuse requirement represents sunlight of 130,000 lux (12,000) to 160,000 lux (15,000 fc) (outside sunshine ambient at high altitude) passing through an aircraft canopy (typically 80 to 90 percent transmission) and striking a display somewhat off-axis. The 6800 $cd/m^2$ (2000 fL) glare source represents a reflection of the sun from interior parts of the cockpit or from the pilot's flight suit or helmet.

C.5.11 Minimum contrast requirements.

The contrast requirements found in TABLE II of MIL-L-85762 are based on a wide variety of studies, existing military specifications, and hardware specifications of existing, successful equipment. They represent the monochrome contrast needed to assure rapid, accurate reading of the various kinds of information in a wide variety of lighting, stress, and vibration environments. Displays with lower contrast can be used but will tend to look "washed out" in some situations and may not provide the reading speed and accuracy required in a fighter cockpit.

In the special case of a hybrid CRT (one displaying both raster video and stroke symbols), the alphanumeric and symbology contrasts in TABLE II of the document should be interpreted as relative to white video since the stroke symbols will generally be overlaid on video. Generally, this requirement is contained in specifications as a higher contrast requirement for stroke symbols (relative to black) rather than for video.

These contrast requirements are based on the requirements and capabilities of monochrome devices, and may not be achievable for color CRT's. For example, color CRT's cannot yet achieve the high contrasts required (when tested in a full-sun environment), but may still be adequate in some situations because they are partially protected by a roof or a glare shield. Color displays can also provide the advantage of color contrast in addition to luminance contrast.

C.5.12 Compensation multipliers.

"Compensation multipliers" in TABLE II define a proportionate increase or decrease of the contrast requirement for larger or smaller characters, or those with narrower stroke widths, relative to the nominal ranges stated. These multipliers are also the result of extensive studies and experience. They account for the fact that a display device which is not particularly bright or high contrast can be made more legible by making the characters larger and using a thicker stroke width, a "trick" that is often used in real systems.

MIL-STD-3009
APPENDIX C

C.5.13 Minimum difference luminance.

The minimum luminance difference requirement is intended to overcome the eye adaptation and veiling glare problems that a pilot may experience when looking at a bright source of light outside the cockpit. Eye adaptation can limit display performance when a pilot must look quickly from an outside scene (a 34,000 cd/m$^2$ (10,000 fL) cloud, for example) to a dim display. Veiling glare is a problem when a bright light is in one's field of view while looking at a very dim scene; this situation occurs when a pilot is flying toward a sunset or a sunrise and trying to see a display in the cockpit.

The definition of contrast (C) used is as follows:

$$C = \frac{\text{higher luminance - lower luminance}}{\text{lower luminance}}$$

This definition is equivalent to the $(B_2-B_1)/B_1$ definition found in several existing military specifications. However, this document requires the measurement of contrast in a combined environment consisting of 108,000 lux (10,000 fc) of diffuse illumination and the specular reflection of a 6800 cd/m$^2$ (2000 fL) source. This is a more severe (and more realistic) environment than the simple "108,000 lux (10,000 fc) diffuse ambient" used in many specifications for fighter cockpit equipment. Note that this contrast definition gives values that are less (by 1.0) than the "contrast ratio" definition used in some specifications.

Contrast measurement of an unlighted segment against its background ($C_{ul}$) is also required. The value of $C_{ul}$ is important when the legend is required to be invisible when not turned on. Generally, $C_{ul}$ values of less than 0.1 will prevent unlighted segments or indicators from being noticeable. A value as high as 0.25 is acceptable on indicators that normally achieve much higher contrast when turned on. A higher value for $C_{ul}$ is more tolerable on segmented-character or dot-matrix displays, where unlighted elements present regular fixed patterns (e.g., "8"s or an array of dots) that are not likely to provide false information. For some displays (such as CRT's) $C_{ul}$ is always zero.

C.6. CHROMATICITY

C.6.1 Background of chromaticity requirements.

Chromaticity is a psychophysical term describing the qualities of color associated with hue and saturation. Chromaticity is specified by using the 1976 Uniform Chromaticity Scale (UCS) diagram, which describes a color by the proportions of colored light that are present in the color. The UCS diagram was chosen instead of the 1931 Commission International de l'Eclairage (CIE) diagram because the UCS diagram represents a relatively uniform color area, where equal distances on the diagram represent equal perceptible color differences.

Initial drafts of MIL-L-85762 contained chromaticity requirements that were specified by a square on the CIE diagram. One goal for specifying the chromaticity of general

MIL-STD-3009
APPENDIX C crewstation lighting should be to produce an appearance among all cockpit light sources that is as uniform as possible. The primary reason for this is to avoid any unintentional distractions due to differences in chromaticity. However, the outer edges of a square on the CIE diagram do not represent uniform color differences because the color difference across one diagonal is different from the color difference across the other diagonal. Therefore, the JACG members decided to specify color in terms of a modified MacAdam ellipse on the CIE diagram, MacAdam ellipses represent areas of uniform color differences[6]. However, describing and understanding an ellipse on the CIE diagram is difficult because the equations are relatively complex. The JACG members therefore agreed that it would be best to describe the color requirements using circles on the 1976 UCS diagram. Circles on this diagram closely approximate MacAdam ellipses on the CIE diagram; moreover, a circle is relatively easy to describe.

The human eye is most sensitive to light with a dominant wavelength in the middle of the visual spectrum (approximately 555 nm or yellowish-green for photopic vision). Therefore, to maximize luminous efficiency during the cockpit lighting color selection process, consideration was given to this dominant wavelength over other hues. Another consideration given to selecting the color of the cockpit lighting was the endeavor to match as closely as possible the chromaticity of the cockpit lighting with that of the phosphor screen most commonly used in NVIS (P20). An attempt was also made to closely match the chromaticity of the P43 phosphor, which is a common phosphor used in monochromatic cathode ray tube (CRT) displays. The purpose of these matches is to prevent unintentional distractions. An additional consideration was to try to specify lighting that is as unsaturated as possible (with chromaticity coordinates away from the spectrum locus and closer to the equal energy point). Some studies have suggested that reading with highly saturated lighting for long periods is irritating and causes eye fatigue[7]. These considerations place the optimum dominant wavelength for general crewstation lighting in the yellowish-green and less saturated area of the UCS diagram.

Once the general area of the UCS diagram was agreed upon, the specific color that was desired had to be selected, along with the tolerance around that color. Ideally, one would like to specify one point for the color coordinates of the lighting that would result in cockpit lighting as uniform as possible. However, manufacturers cannot make lighting components with exactly the same color coordinates. Therefore, the tolerance placed around the desired color coordinates necessitates a compromise between the cost of the lighting components (because the tighter the tolerance, the more likely that some components will be rejected because they do not meet the color requirements) and the color difference between lighting components. In addition, consideration was given to the different kinds of technology that are available to manufacture NVIS-compatible lighting components so that technologies were not excluded solely because of color considerations. The decision process was complicated further because the JACG members were unable to quantify the amount, if any, of pilot performance degradation experienced as a function of color uniformity differences within the cockpit.

MIL-STD-3009
APPENDIX C

Considering the foregoing, NVIS Green A was designated the primary color for crewstation lighting. However, manufacturing representatives indicated that annunciators that were NVIS Green A and daylight-readable would be difficult to manufacture. Daylight readability requirements usually require manufacturers to produce colors that are extremely saturated. Based on a survey of NVIS-compatible annunciators that were also daylight readable, NVIS Green B was formulated to accommodate those lighting components that cannot be made both daylight readable and NVIS Green A.

"NVIS white" was defined later, primarily to provide a broader-band light source that would allow color vision, since neither NVIS green A or B provide enough red or blue light for color vision. Moving to the less saturated NVIS white area allows one to see things like blue water and red roads on a map in their true color instead of a dark gray color, as you will under NVIS green illumination. The color was defined in the area toward green from a true white, and with a very large color tolerance, in order to simplify the first attempts to develop an NVIS compatible broadband light source.

The original NVIS White definition was documented in a Naval Air Development Center letter dated 15 March 88. The letter recommended coordinates of $u'=0.180$, $v'=0.500$, $r=0.055$ and was based on tests of flashlight filters that were used by aircrews to read maps. This tolerance circle encompasses colors that are not truly "white," actually including colors defined as "green" and "yellow" on the UCS chart. The name might more properly be "whiter than green". Because of the large range of colors allowed by this definition, projects have used subsets of this area. For example, the Air National Guard F-16 retrofit uses the upper two quadrants of this color space, and the upper right quadrant was specified for a map light. Vendors have also developed a filter that falls within the lower left quadrant, which should provide better color rendering. The reason for defining a standard color and tolerance is to provide uniformity between equipment, but this goal is defeated if each program chooses a subset of the standard.

This standard restricts NVIS White to the lower right part of the original NVIS White tolerance circle, with coordinates of $u' = 0.19$, $v' = 0.49$ with a radius of 0.04. This defines a color that is more universally recognized as white, although the tolerance is still large enough that devices with colors near opposite limits will be visibly different. Further restricting the tolerance may impose impractical limitations on the design of the lighting device, since filtering the red and IR portion of the spectrum to provide compatibility inherently pushes the color of the light toward the green.

Lighting components must meet the color requirements when illuminated to produce a luminance of 0.343 $cd/m^2$ (0.1 fL). The level of luminance at which the color requirement shall be met must be specified so that various manufacturers compare color measurements on an equal basis. Some lighting components (incandescent components, in particular) change color when the luminance is changed. A luminance level of 0.343 $cd/m^2$ (0.1 fL) was chosen because U.S. Air Force tests have shown that luminance levels of 0.343 $cd/m^2$ (0.1 fL), or lower, are typically used by pilots when wearing NVIS.

MIL-STD-3009
APPENDIX C

C.6.2 Utility lights, work, inspection, and compartment light chromaticity.
Utility lights, work lights, inspection lights, and compartment lights are required to display the proper color when illuminated to produce 0.343 cd/m$^2$ (0.1 fL) off a standard reflector. Because utility, work, and inspection lights can be moved around the aircraft, the distance between the light and the area to be illuminated can vary greatly. To standardize the color requirements for these types of lights, the distance between the utility light and standard reflector is fixed at 0.3 m (12 inches) when specifying chromaticity. Compartment lighting, however, is generally placed in a fixed location in the aircraft. Therefore, compartment lighting components must be placed at the same distance from the reflector as that which it will be from the area in the aircraft it will illuminate. This technique was chosen because various components may need to be at different luminance levels to achieve the proper illumination when they are installed in the aircraft. The color of the component is measured at the luminance level equivalent to the level at which it will be used in the aircraft.

The color of electronic and electro-optical displays is not specified because different colors may be required for different applications.

C.6.3 Caution, advisory, warning, and master caution light chromaticity.
Because Class A NVIS are extremely sensitive to colors with radiance at wavelengths longer than 600 nm, red cannot be used in the cockpit with class A NVIS. Although most pilots strongly prefer retaining red for warning lights, there are no performance data to substantiate the belief that red warnings are better, except that red indicates danger to most persons. However, color-coding of annunciators is extremely beneficial when it is necessary to get the pilot's attention. Therefore, NVIS Yellow was developed to allow certain annunciators, especially warning indicators and master caution indicators, to be made a different color from those in the rest of the cockpit. Caution indicators in an annunciator panel are required to be NVIS Green because the master caution indicator needs to draw the pilot's attention. If the master caution indicator illuminates, the pilot can reset it and read the indication of the problem on the annunciator panel. Requiring all caution indicators to be yellow is not necessary because the individual indicators do not need to get the pilot's attention.

As will be explained under the discussion on the radiance requirements, a yellow indicator that has no effect on the Class A NVIS cannot be manufactured. Therefore, the amount of yellow in the cockpit should be kept to a minimum. The color coordinates of NVIS Yellow were selected based on a number of different factors. First, in accordance with MIL-STD-411, master caution indicators and warning indicators should have a luminance of 51.5 cd/m$^2$ (15 fL) at night. Second, the amount of red in the yellow color must be limited so that the yellow indicators do not adversely affect NVIS performance. Taking these factors into consideration, and after conducting a survey of manufacturing technology, NVIS Yellow was chosen. This color is essentially the yellowest that can be manufactured (using current technology) while having the least

MIL-STD-3009
APPENDIX C amount of impact on (Class A) NVIS compatibility. Components are required to meet the color requirements when illuminated to produce 15 fL.

With the advent of Class B NVIS, flight tests indicated that a limited amount of red could be used in the cockpit. NVIS Red was selected based on experiments during which 20 test subjects were asked to identify a color they would call "red" when compared against NVIS Yellow[9]. The color was kept as close to orange as possible to allow red indicators to be as NVIS-compatible as possible. NVIS Red has a disadvantage when compared to NVIS Yellow because it is not as bright in daylight. This is primarily because the filtering needed to make the indicator NVIS-compatible reduces the overall luminance of the indicator. Because some aircraft managers may not be willing to exchange daylight readability for red, NVIS Red was left as an optional color in the specification. Although not authorized by MIL-L-85762A, the aircraft manager could approve the use of dual-function indicators to retain daylight readability and NVIS-compatibility in the same indicator.

C.7. SPECTRAL RADIANCE LIMITS

C.7.1 Background of spectral radiance limits.

To be compatible with NVIS, the spectral radiance output of a lighting component must be minimized in the NVIS-sensitive portion of the electromagnetic spectrum. During the development of the document, a number of methods were considered that could be used to define and measure NVIS-compatibility. The requirements in MIL-L-85762A and ASC/ENFC 96-01 evolved from early attempts to define NVIS compatibility. In order to help explain how the present requirements were derived, some of the alternative methods will be described.

One method used assumed that a lighting component was NVIS-compatible as long as it did not activate the AGC of the NVIS. Theoretically, this approach is quite valid because, unless the AGC is activated, the NVIS is working at maximum gain and objects outside the cockpit will appear as bright as possible.

Based on this premise, an attempt was made to use an image intensifier tube to view a lighting component and then determine whether or not the tube was in AGC operation. The optimum way to determine if an image intensifier tube is in AGC is to measure the tube current. This requires that the tube be torn down to gain access to the appropriate circuit. Before proceeding any further, validation of the concept was attempted by measuring the image tube screen output brightness when looking at a lighting component. The level of output brightness can be used as an indication that the tube is in AGC because when the tube is in AGC an increase in input brightness will not produce a proportional increase in output brightness. This procedure is not quite as accurate as measuring the tube current, but it is a simpler method to use.

However, the point at which the NVIS AGC is activated was found to be dependent on many variables. The AGC monitors the image tube current and acts to reduce the

MIL-STD-3009
APPENDIX C voltages (which reduces the gain) within the tube to keep the current from exceeding a certain level. The amount of current that is produced within the image tube depends on the spectral sensitivity of the image tube photocathode (which varies among image tubes), the spectral distribution and intensity of the image being viewed, and the percentage of the image tube field of view (FOV) that is illuminated. A small lighting component that emits a relatively large amount of energy in the NVIS-sensitive portion of the electromagnetic spectrum can produce a lower tube current (and thus not activate the AGC) than a large lighting component that emits a relatively small amount of energy in the NVIS-sensitive portion of the electromagnetic spectrum. If the first-described component were to be used in large numbers in the cockpit, it might be unacceptable. Since MIL-L-85762A was written to be a general specification that can be used for a number of different aircraft, assignment of a number to the percentage of the cockpit that could be illuminated is impossible. Also, since NVIS sensitivity varies from system to system, NVIS cannot be used to check for compatibility because, although a lighting component may be "compatible" with one system, it may not be compatible with a system with higher sensitivity (which can vary by as much as 50% between systems). All of these various factors (which in some cases are unknowns) led the JACG members to conclude that using an image intensifier tube to check for NVIS-compatibility was unacceptable.

At the time that MIL-L-85762 was being written, a number of people were using what has come to be known as the "one percent rule." The one-percent rule has several variations, but the original concept was proposed by the U.S. Army in a technical memorandum written by Mr. Dick Franseen[10]. Mr. Franseen proposed that a lighting component could be considered to be NVIS-compatible if the amount of energy in the NVIS-sensitive portion of the electromagnetic spectrum (between roughly 600 and 900 nm) was less than one percent of the total energy. Mr. Franseen's recommendations were converted into an Aeronautical Design Standard (ADS), designated ADS-23. Because this standard already existed prior to the writing of MIL-L-85762, consideration was given to converting ADS-23 into a military specification. However, the criterion used in ADS-23 has a number of flaws. The basic problem is that the NVIS do not see a ratio of energy between the visible and NVIS-sensitive portions of the spectrum (they just see the absolute amount of energy in the spectrum in which they are sensitive). And lighting components that meet the one-percent rule but are not NVIS compatible can be manufactured. When designing a lighting component to meet the one-percent criterion, the manufacturer has two options. One, the manufacturer could lower the amount of energy in the NVIS-sensitive portion of the spectrum, or two, increase the relative amount of energy in the visible part of the spectrum. Obviously, lowering the amount of energy in the NVIS-sensitive portion of the spectrum will produce a more compatible lighting component than raising the amount of visible energy.

FIGURE C-7 shows the curves of two different lights that could, theoretically, be produced. Both theoretical light sources produce a luminance of 0.343 cd/m$^2$ (0.1 fL) and have about one-half percent of their energy above 600 nm. Therefore, both lighting components meet the one-percent requirement. However, the "poor" source emits about ten times as much energy as the "optimum" source in the NVIS-sensitive portion

MIL-STD-3009
APPENDIX C of the spectrum. Although these lights meet the same percentage requirement, the "poor" source will be ten times brighter than the "optimum" source when viewed through the NVIS.

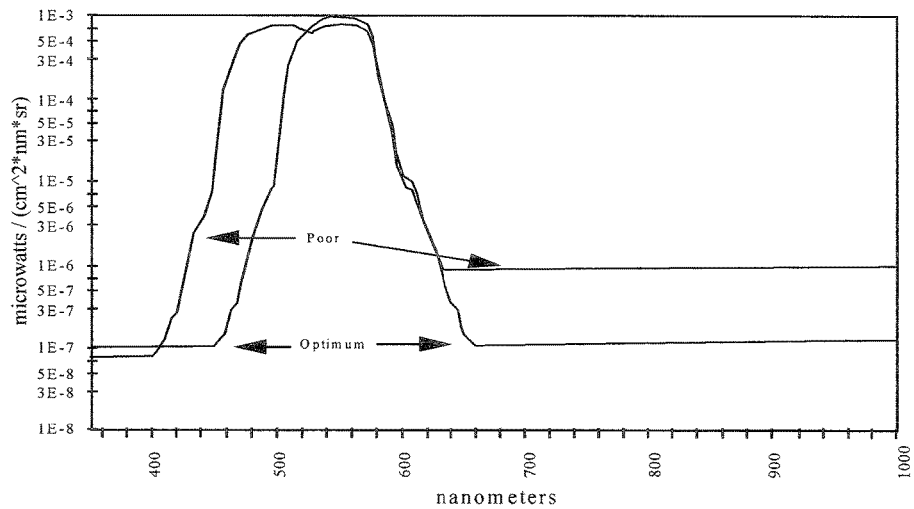

FIGURE C-7. "Optimum" and "poor" theoretical spectral distributions.

This kind of analysis led the JACG members to conclude that the percentage rule may not work in all cases. The next logical step involved the development of a method that would define a limit on the amount of absolute energy that could be emitted by a lighting component in the NVIS-sensitive portion of the spectrum. As a carry-over from the one-percent rule, the JACG members investigated the possibility of limiting the amount of energy that a lighting component could emit in the 600 to 900 nm portion of the spectrum. This method was also eventually rejected because the JACG members realized that NVIS do not have uniform (square wave) response to energy with wavelengths between 600 and 900 nm. In fact, as was pointed out by the U.S. Army Night Vision Laboratory (now called the Center for Night Vision and Electro-Optics {CNVEO}), some NVIS respond to light with wavelengths as low as 450 nm. Therefore, the JACG members concluded that the best way to specify NVIS and lighting interaction was to develop a new unit of measurement, NVIS Radiance (NR), which would quantify the interaction of lighting components and the NVIS. Units of NR were modeled after the definition of photopic luminance. NR units represent the amount of energy emitted by a light source that is visible through the NVIS, just as photopic luminance units (fL, $cd/m^2$) represent the amount of energy that is visible to a "standard" human eyeball. NVIS Radiance is defined as the integral of the curve generated by multiplying the spectral radiance of a light source by the relative spectral response of the NVIS as follows:

MIL-STD-3009
APPENDIX C $$\text{NVIS Radiance} = G(\lambda)_{max} \int_{450}^{930} G(\lambda)_i N(\lambda)\, d\lambda \quad (NR_i) \qquad (1)$$

where:

$G(\lambda)_{max}$ = 1 mA/W (to get the correct units)
$G(\lambda)_i$ = relative spectral response of the NVIS, where i=A for Class A NVIS, and i=B for Class B NVIS
$N(\lambda)$ = spectral radiance of the light source (W/cm$^2$ sr nm)
$d\lambda$ = wavelength increment

NOTES:

1. Since the wavelength interval ($d\lambda$) in this equation is finite (5nm), this is technically a summation, rather than an integral, but it is shown as an integral in the standard to be consistent with MIL-L-85762.

2. MIL-L-85762 equations 14a and 14b were used to calculate NVIS radiance for a device at its specified luminance and therefore included the scaling factor "S", but the equations referred to this simply as "NVIS radiance." This is corrected by changing equations 14a and b to "NVIS radiance at specified luminance" in the new standard.

3. The factor $G(\lambda)max$ was included in equation 14a and b of MIL-L-85762 but is not needed with normalized $G(\lambda)$ data.

After agreement was reached within the JACG that this unit of measurement adequately represented the response of NVIS when looking at a light source, the NVIS spectral sensitivity had to be defined. The spectral response of the NVIS is governed by two factors: the spectral response of the image intensifier tube, and the spectral transmission of the NVIS objective lens. The spectral response of the image intensifier tube was determined by using data provided by the CNVEO. An average response curve for each of the two third-generation tube manufacturers supplying the Army at that time (ITT and Varian), plus the response curve for an extremely sensitive ("hot") third-generation image intensifier tube were obtained from the Army's Night Vision and Electro-Optics Laboratory. These three curves were normalized and plotted on the same graph. At each 5-nm increment, the largest value of the three curves was determined. These values were used to generate a composite, normalized image tube response curve. This curve is shown in FIGURE C-8. Production third-generation image intensifier tubes can be expected to have a normalized spectral sensitivity somewhat lower than this curve.

During the manufacturing process, a "minus-blue" filter (i.e., a filter that blocks blue-green light and transmits red light) is built into the NVIS objective lens. This filter reduces the amount of cockpit light that enters the NVIS. There are two different kinds of minus-blue filters that are used in the NVIS. Class A NVIS use a minus-blue filter

MIL-STD-3009
APPENDIX C meeting the requirements shown in FIGURE C-4. Class B NVIS use a minus-blue filter meeting the requirements shown in FIGURE C-5. The Class A filter was developed by the Army for use in the ANVIS. This filter only allows blue, green, and yellow lights to be used in the cockpit. The Class B filter was developed by the Navy for use in the NVIS being procured for fixed-wing tactical aircraft. The Class B filter was developed primarily to allow three-color CRT's to be used with NVIS. However, the Class B filter also allows the use of a limited amount of red for warning lights. The Class B filter, however, reduces the sensitivity of the NVIS when compared to a Class A filter because it cuts off more of the image intensifier spectral sensitivity than a Class A filter. Using these two filters, the maximum amount of transmission allowed by the specifications (the left hand side of the curves shown in FIGURE C-4 and FIGURE C-5) was multiplied by the image tube sensitivity curve to yield NVIS Class A and Class B sensitivity curves. The maximum transmission allowed was used because an NVIS with this filter transmission would have the most interaction with the cockpit lighting. FIGURE C-9 and FIGURE C-10 show the spectral sensitivity curves for Class A and Class B NVIS. The data from FIGURE C-9 and FIGURE C-10 are used as $G(\lambda)_A$ or $G(\lambda)_B$ in equation (1) to calculate NVIS radiance for either Class A or Class B NVIS, respectively.

Note that characteristics of a "hot" tube, and the maximum transmission allowed by the minus-blue filter specification, were used to derive the definitions of the NR units. These are both conservative assumptions, which result in the NR measurements having some "margin" built in when lighting devices are used with ordinary NVIS. This explains why lighting and display devices that slightly violate the NR requirements may appear to be fully compatible when observed in a mockup with an "average" NVIS. More recent tubes have even better performance, and new guidance on this subject may be needed.

After the method of calculating NVIS Radiance was agreed upon, the level of NVIS Radiance that could be considered to be NVIS-compatible had to be defined. As a baseline, the JACG members decided that compatibility could be achieved if the image of the cockpit lighting, when viewed through the NVIS, was no brighter than the outside scene. Operational experience has shown that, because of its low reflectivity, a defoliated tree is the terrain feature that is the most difficult and important to see at night. The NVIS radiance of a defoliated tree illuminated by starlight was calculated by multiplying the spectral radiance of starlight[11] (see FIGURE C-9) by the reflectivity of tree bark[12] (see FIGURE C-10) and inserting the resulting curve for $N(\lambda)$ into equation (1). The calculation yields a value of $1.7 \times 10^{-10}$ $NR_A$ for Class A NVIS and $1.6 \times 10^{-10}$ $NR_B$ for Class B NVIS. Therefore, to keep the cockpit lights dimmer than the outside scene when viewed through the NVIS, the NVIS Radiance should not exceed $1.7 \times 10^{-10}$ $NR_A$ for Class A NVIS and $1.6 \times 10^{-10}$ $NR_B$ for Class B NVIS, when illuminated to produce an acceptable level of luminance required for unaided eye viewing. U.S. Air Force tests have shown that the level of luminance required for primary cockpit lighting systems, when pilots are using NVIS, is less than 0.1 fL. Therefore, the document allows a maximum NVIS Radiance of $1.7 \times 10^{-10}$ $NR_A$ for Class A NVIS and $1.6 \times 10^{-10}$ $NR_B$ for Class B NVIS when lighting equipment is illuminated to produce 0.1 fL.

MIL-STD-3009
APPENDIX C

These very small numbers caused the use of scientific notation in MIL-L-85762 and ENFC-96-01. The new TABLE III in the standard removes a factor of $10^{-9}$ from each number by using nNR units, i.e., the standard practice in the SI system of units uses n to represent nano in front of the unit. The requirement is exactly the same, it is just easier to write and pronounce.

An exception is made for primary and secondary lighting components; illuminated controls; caution and advisory signals; and compartment, utility, work, and inspection lights. These lighting components must meet the NVIS Class A radiance requirement regardless of the installation for which they are intended. The JACG members decided to require all of these lighting components to meet the Class A requirement for commonality reasons. Since all these devices are green and it is quite practical to make them Class A compliant, (which automatically makes them Class B compliant) no separate Class B requirements were defined for these devices, therefore Class A and Class B devices are the same.

This same philosophy was applied to white map lights when the NVIS White criteria were added, in the interest of having only one set of criteria for such lights. Note that the NRA value allowed for white is higher, since white light will contain more red.

The above criteria were developed based on data subject to variations. For example, the spectral characteristics of starlight change depending on one's location on the earth and the transmissivity of the atmosphere. To validate the NVIS Radiance criteria, lighting components that have been used successfully on NVIS-compatible aircraft and lighting components known to be unacceptable were tested to determine if they met the NVIS Radiance criteria. Those components that had been successfully used on aircraft passed the spectral radiance criteria and those that were found to be unacceptable failed. During development of MIL-L-85762, many lighting components were subjected to the criteria. The criteria have proved to be an accurate measure of the NVIS-compatibility of a lighting component.

C.7.2 Monochromatic display radiance.

The spectral radiance requirements for monochromatic displays are the same as those for general crewstation lighting except that when the display is required to display shades of gray imagery (such as forward looking infrared {FLIR} sensor video), the display must be NVIS-compatible at 1.72 cd/m$^2$ (0.5 fL) rather than 0.343 cd/m$^2$ (0.1 fL). Approximately 1.72 cd/m$^2$ (0.5 fL) is required in order to display eight shades of gray, with the lowest level at .137 cd/m$^2$ (0.04 fL).

C.7.3 Multi-color display radiance.

Laboratory experiments have demonstrated that a full color (three-primary) color display cannot be used with Class A NVIS without suffering considerable NVIS performance degradation. However, it is likely that other kinds of displays (for example, two color displays) could be used. Laboratory and flight demonstrations have shown that the

MIL-STD-3009
APPENDIX C

Class B NVIS can be used with full color displays provided the display is properly filtered and located in a position where it is not in the FOV of the NVIS when looking outside the aircraft. Color displays cannot meet the NVIS Radiance requirements for general crewstation lighting. Therefore, to allow the use of color displays, the NVIS Radiance requirement had to be relaxed. This trade-off was made for two basic reasons. First, the NVIS Radiance requirement for general crewstation lighting assumed that most of the cockpit would be illuminated, but in the case of color displays, the display graphics were assumed to occupy a smaller percentage of the total cockpit area. Second, most color displays are located in an area that will not be in the NVIS FOV when looking outside the cockpit.

The assumption that the radiating area of a color display will be small is not particularly valid with newer AMLCDs. AMLCDs in use now (2001) are larger than anticipated when MIL-L-85762A was developed, and they tend to radiate IR from dark areas as well as light areas, increasing the total radiated energy. More restrictive NRB criteria might be considered where this added interference is found to be unacceptable.

The standard has two NVIS Radiance limits for multi-color displays. One is for "white" light (or the color closest to white that can be produced by the display) and one for the "worst case" color, which is the color that produces the greatest NVIS Radiance. The requirements were written this way to try to cover all aspects of color displays, including two primary-color displays, which are being considered for some aircraft.

One characteristic of LCD's that was not anticipated by MIL-L-85762A was the excessive emission of IR from "black" areas. On some LCD's, this emission is nearly constant regardless of display state; that is, it does not dim with the visible light. Consequently, use of the scaling factor defined in 5.7.12.1 of the standard is invalid for many such devices. The new paragraph added under 5.7.12.1 requires verification that luminance and radiance of the display scale together and should address this issue.

C.7.4 Warning and master caution signal and emergency exit lighting radiance.

The maximum allowable NVIS Radiance for warning and master caution lights is approximately 1000 times higher than the NVIS Radiance allowed for general crew station lighting. The allowable NVIS Radiance was increased for two reasons. First, because the warning and master caution indicators should be a different color from those in the rest of the cockpit, yellow was selected for use with Class A NVIS. The NVIS Radiance requirements for NVIS Yellow represent the lowest level of NVIS Radiance that can be achieved with state-of-the-art technology while maintaining a yellow color. Second, the NVIS Radiance had to be increased because warning and master caution lights are required to be illuminated to 51.5 $cd/m^2$ (15 fL) (in accordance with MIL-STD-411). That is, because warning and master caution indicators must meet the NVIS Radiance requirements at 51.5 $cd/m^2$ (15 fL), rather than 0.343 $cd/m^2$ (0.1 fL), the NVIS Radiance based on this factor alone would be 150 times higher.

In addition to changing the maximum allowable NVIS Radiance, the JACG members decided that warning and master caution indicators must be clearly visible through the

MIL-STD-3009
APPENDIX C

Type I NVIS because, when the indicator first comes on, it will most likely be in the NVIS FOV. This led to the establishment of a minimum NVIS Radiance requirement for warning and master caution indicators to be certain that a pilot could see the indicator through Type I NVIS. The lower limit was selected based on a three-to-one ratio (the minimum NVIS Radiance is three times lower than the maximum NVIS Radiance).

With the advent of Type II and Class B NVIS, several changes had to be made to MIL-L-85762, which are reflected in MIL-L-85762A. First, because the pilot can clearly see all parts of the cockpit with his unaided eye, a lower limit on the NVIS Radiance is not required. Second, the Class B NVIS allow a limited amount of red to be used for warning lights. However, the NVIS Radiance requirement for red was not raised when compared to yellow because laboratory tests have shown that the upper limit set for yellow causes some NVIS degradation and raising the limit further would be objectionable. Red warning lights were left as an option to the acquiring agency because the JACG members were not convinced that red warning lights are necessary.

C.7.5 Jump light radiance.

Higher NVIS Radiance values are allowed for jump lights for several reasons. First, jump lights are not located in the cockpit, and therefore are not in the pilot's field-of-view when looking outside the cockpit. Second, jump lights are not normally positioned in a place where the aircrew can conveniently look around or under the NVIS to view the jump light. Therefore, it must be visible through the Type I NVIS. The brighter intensified image due to the higher NVIS Radiance will alert the aircrew that the jump light is activated. In order to ensure that the intensified image is bright enough to catch the aircrew's attention, a minimum NVIS Radiance requirement is also imposed for Type I NVIS. There is no minimum NVIS Radiance requirement for Type II NVIS because unaided eye visual cues are unobstructed.

C.7.6 Head up display (HUD) system radiance.
With Type I NVIS the HUD must be viewed through the NVIS. Therefore, MIL-L-85762A set both a lower and upper limit on the NVIS Radiance. The lower limit was selected based on a P43 phosphor with a Kaiser filter, which has proven to be just barely visible through the Type I NVIS when set to 5.0 fL. The upper limit is three times the lower limit. With Type II NVIS, the HUD is viewed with the unaided eye. There should be no intensified image seen through the image intensifier tubes or the pilot will be presented with a double image (the unaided eye image overlaid with the intensified image). Therefore, only a maximum NVIS Radiance has been established for Type II NVIS.

The "leaky green" characteristic is a newer, alternative approach to viewing a holographic HUD with NVIS. It has been found to be nearly impossible to meet the minimum NR requirements discussed above with holographic HUDs, which are now in use in several aircraft. The very wavelength-selective nature of the holographic HUD combiner prevents light from the HUD from falling in the NVIS spectrum. Rather than

MIL-STD-3009
APPENDIX C use Class II NVIS (which are more expensive) with these HUDs, as was intended when MIL-L-85762 was written, leaky green filters on ordinary Class I NVIS are being used.

C.7.8 Light leaks.
Testing at NAVAIRDEVCEN has shown that the sealing of light leaks is perhaps the most difficult problem faced by manufacturers. Even if the manufacturer uses an NVIS-compatible filter, small light leaks (which are invisible to the unaided eye) will make a lighting component non-compatible.

C.7.9 Luminance uniformity.
The uniformity requirement has been tightened from a ratio of three to one at rated drive conditions to a ratio of two to one at "1/2 rated drive voltage"(in MIL-L-86762) or "any given luminance level" (in ASC/ENFC 96-01). This change was made because the use of prototype lighting systems has demonstrated that the more uniform the lighting, the better the compatibility.

C.7.10 Maintenance trimming controls (MIL-L-85762 only); now called Luminance balance.
A requirement for maintenance trimming controls was added to MIL-L-85762 because of the extreme criticality of lighting uniformity when using NVIS. If a lighting component is run at a significantly higher brightness than the average, it will appear much brighter both through the NVIS and with the unaided eye. Non-uniform lighting is a distraction to the pilot. In addition, some of the technologies used to achieve NVIS compatibility require trimming (due to aging considerations) if a new component is installed in the aircraft.

The "design" requirement (installation of trimmers) was deleted in ASC/ENFC 96-01, since it is a design requirement rather than a performance requirement. The performance requirement is to meet the uniformity criterion (above) while meeting reliability and maintainability requirements stated in the contract.

C.7.11 Verification (quality assurance provisions in MIL-L-85762).
The test procedures required by MIL-L-85762A are required for first article and quality conformance inspections only. First article tests are required to be performed on all first article samples and quality conformance tests are required to be performed on random samples selected from a production lot. A contractor is not required to subject all delivered articles to the test procedures contained in MIL-L-85762A. That is, MIL-L-85762A does not specify production quality control inspections that should be performed by the manufacturer on each unit. Quality control procedures are left up to the contractor. The Government requires a contractor to prove that it can meet the specification by passing first article and random quality conformance inspections.

MIL-STD-3009
APPENDIX C

C.7.11.1 Lighting conditions.

All lighting measurements must be made in a darkroom to prevent ambient lighting from affecting the results. The document defines "dark" as either being unmeasurable or less than one percent of the energy being measured. As an alternative, an NVIS (either second-or third-generation) can be used to check for light leaks in the room. If there are no light leaks visible with the NVIS one can consider the room dark enough to make NVIS compatibility measurements.

C.7.11.2 Lighting system NVIS compatibility examination.

The procedures to be used during the lighting system NVIS-compatibility examination (lighting mockup) require that a resolution target be set up outside the cockpit and viewed with the NVIS both with and without the cockpit lighting illuminated. No detectable degradation of NVIS resolution should result when the cockpit lighting is energized. The resolution chart is illuminated to a level necessary to produce the same amount of energy that would be radiated by a defoliated tree illuminated by starlight and viewed through the NVIS ($1.7 \times 10^{-10}$ $NR_A$ or $1.6 \times 10^{-10}$ $NR_B$ for Class A or Class B NVIS respectively). The distance between the lighting mockup and the resolution target is not specified because the distance will vary depending on the area to be used for the mockup. However, several qualifiers are contained in this section to be certain that the mockup is conducted in the proper manner. First, the resolution target should be set up at a distance so that a resolution pattern midway between the largest and smallest pattern is just visible with the NVIS. This prevents large swings in resolution from falling out of the resolution measuring range of the target. Second, the target must be located so that when the cockpit lighting is illuminated, it does not illuminate the target. Cockpit lighting that illuminates the resolution target can give false readings because the resolution target is illuminated to a level that is higher than starlight radiance.

C.7.11.3 Chromaticity measurements.

Chromaticity measurements are required to be made with a spectroradiometer. In practice, chromaticity measurements can also be made with a photometer using color filters designed for this purpose. However, the spectroradiometric measurement is more accurate. Because the specification requires that a spectroradiometer be used to measure spectral radiance, the JACG members decided that the color should also be measured with a spectroradiometer. A wavelength increment of 5 nm was chosen because experiments have shown that increments smaller than this have a negligible effect on the chromaticity measurements of various technology lamps, including LED's and CRT's, which are relatively narrow band light sources.

C.7.11.4 Spectral radiance measurements.

Spectral radiance measurements are required to be made using a spectroradiometer. During the development of MIL-L-85762 a number of different measurement techniques were explored. Based on the definition of NVIS Radiance, an accurate measurement of spectral radiance must be obtained. The JACG members were not convinced that alternate measuring techniques, which generally use an integrating (over wavelength)

MIL-STD-3009
APPENDIX C type of device, provide accurate spectral radiance data. In order for these types of devices to be accurate, their spectral sensitivity curve has to closely match the sensitivity curve for the NVIS. The kind of test equipment required is expensive, however, in numerous discussions with manufacturers, the JACG members concluded that if a company wants to be in the NVIS-compatibility business, it must procure the proper test equipment. The JACG members felt that alternate measuring techniques were inadequate; however, suggestions for alternative measuring techniques can still be considered.

The use of an integral in the equations in the verification section of the document has been questioned. Most people think of this as an integral, even though mathematically speaking, it is actually a summation, since the increment ("d $\lambda$") is 5 nanometers. In a true integral, this increment approaches zero.

Although most lighting components are required to be compatible at 0.343 cd/m$^2$ (0.1 fL), the specification allows the spectral radiance of lighting components to be measured at either 51.5 cd/m$^2$ (15 fL) or at the luminance produced at rated voltage, which ever is lower. A scaling factor (S) is generated to correct the measured spectral radiance to approximate what it would be if the lighting component were actually set to 0.343 cd/m$^2$ (0.1 fL). State-of-the-art spectroradiometers have difficulty accurately measuring the spectral radiance of lighting components when they are illuminated to 0.343 cd/m$^2$ (0.1 fL). Scaling the luminance of lighting components is not entirely accurate because, as is the case with incandescent lights, the spectral radiance curve shifts for some lighting components as the luminance (due to a voltage change) is changed. Nevertheless, numerous tests conducted at NAVAIRDEVCEN showed that the spectral shift was not significant with many light sources. The upper limit of 51.5 cd/m$^2$ (15 fL) was chosen because at this level a spectroradiometer is sensitive enough to make an accurate measurement. Besides, warning and master caution indicators should be measured at this level.

More recent tests on CRT's and Liquid Crystal Displays (LCD's) have shown that the scaling technique allowed by MIL-L-85762 is not always valid. It does not accurately account for sources (such as CRT's and flat panel displays) that have both fixed and variable sources of IR emissions. In a CRT, as well as in the fluorescent tubes used to backlight LCD's, the hot filament produces relatively constant IR emissions, while the phosphor produces emissions proportional to luminance. MIL-L-85762 allows measuring the display at a brighter setting and then scaling down the results to the specified luminance of 1.7 cd/m$^2$ (0.5 fL). Since the IR emissions do not go down proportionally, this can allow a display with excessive emissions to pass the test. Therefore, a requirement to verify that the scaling technique is valid for the particular technology being tested was added to paragraph 5.6.12.1 of the document.

C.7.11.5 Light leak inspection.

Light leaks can be inspected with any kind of NVIS (either second-or third-generation) because a light leak will be evident through either kind of device. The inspection is

MIL-STD-3009
APPENDIX C important because a spectroradiometric measurement may not always detect a light leak unless the leak is in the FOV of the spectroradiometer. Light leaks most often result from cracked or poorly installed filters.

C.7.11.6 Daylight legibility and readability inspection (no longer included in the standard).

The measuring procedures in MIL-L-85762 for illuminated visual signals that are required to be readable in direct reflected specular sunlight came from the procedures contained in MIL-S-22885. The test procedures contained in MIL-S-22885 describe the method that should be used to measure contrast when the lighting component is subjected to a specular reflection. The measuring procedures for illuminated visual signals not required to be readable in direct reflected specular sunlight are the same as the procedures contained in MIL-S-38039. The test procedures contained in MIL-S-38039 describe the method that should be used to measure contrast when the lighting component is subjected to diffuse ambient illumination. The test procedures were copied over into ASC/ENFC 96-01 to eliminate references to the old documents.

The measuring procedures described for the measurement of contrast of electronic and electro-optical displays are consistent with those contained in MIL-HDBK-87213 and SAE ARP-1782.

C.7.12 Additional information.
FIGURE C-8, FIGURE C-9, and FIGURE C-10 are provided for additional information.

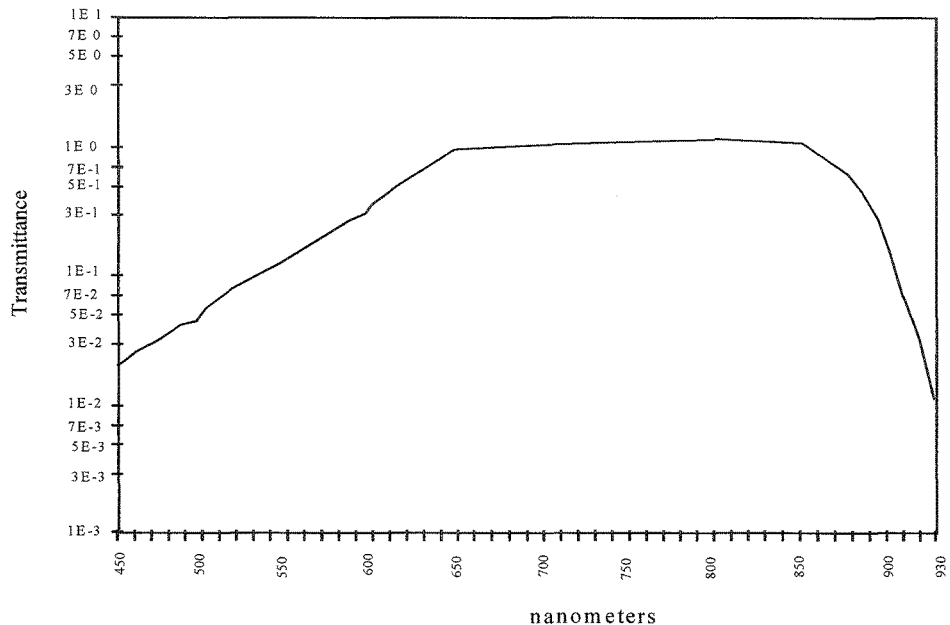

FIGURE C-8. Normalized spectral sensitivity curve for a third-generation image intensifier tube.

MIL-STD-3009
APPENDIX C
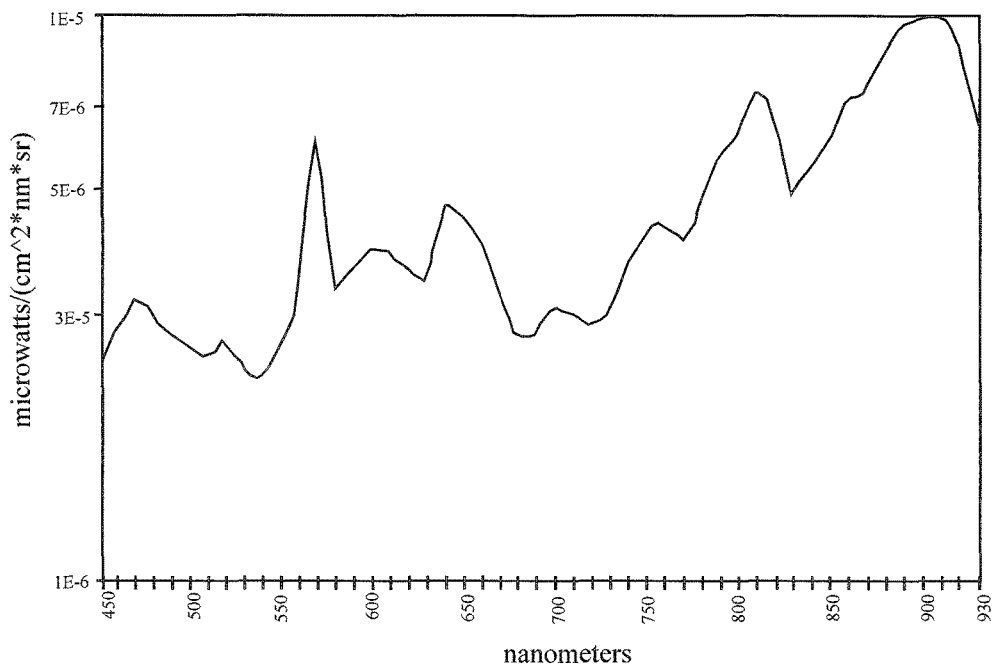
FIGURE C-9. Spectral distribution of starlight.
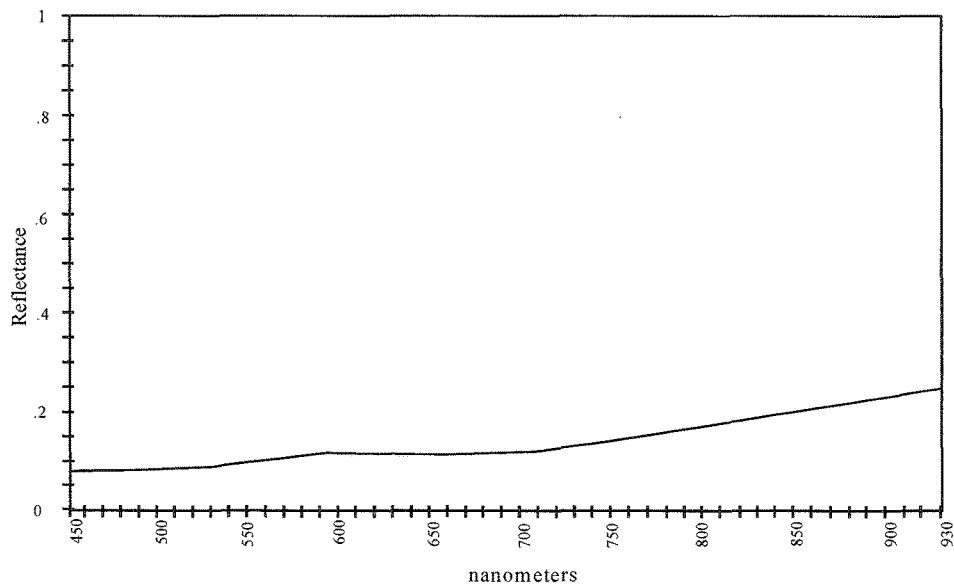
FIGURE C-10. Spectral reflectivity of tree bark.

MIL-STD-3009
APPENDIX C

C.7.12.1 Rationale for spectroradiometer requirements.

The spectroradiometer requirements are based, in part, on existing technology, demonstrated acceptability of equipment meeting the requirements contained in the specification, and consultations with spectroradiometer manufacturers and users (particularly EG&G Gamma Scientific, Photo Research, Optronic Laboratories, and Hoffman Engineering).

C.7.12.2 Rationale for photometer requirements.

The photometer requirements are based primarily on the requirements contained in MIL-P-7788.

C.8. SUMMARY AND CONCLUSIONS

This appendix contains the rationale and justification behind the requirements contained in MIL-L-85762, ASC/ENFC 96-01 and MIL-STD-3009. After reading this appendix, one should have a better understanding of the requirements and will be better able to use these documents. Acknowledgement is given to the authors of the original report, NADC-87060-20 [12] from which this report is derived.

By design, the MIL-L-85762, ASC/ENFC 96-01 and MIL-STD-3009 were kept general so that they could be used by a wide variety of users. Also, in some cases, compromises had to be reached among the services so that a tri-service specification could be achieved. However, where compromise was needed, it was almost always conservative. Therefore, some project managers may want to waive parts of the standard. However, caution should be used because, although not readily apparent, many parts of the standard are interrelated. For example, specifying NVIS Green as a color is no guarantee that NVIS-compatibility will be achieved. Likewise, changing the color could make achieving the proper NVIS Radiance impossible.

Throughout the development of MIL-L-85762 and MIL-L-85762A, the JACG members received numerous complaints from manufacturers that the requirements were unrealistic, impossible to meet, or excluded certain technologies. However, it has been proven that these manufacturers are incorrect and, at the time of this writing, numerous manufacturers can meet the requirements of MIL-L-85762. Likewise, red lighting components meeting the requirements of MIL-L-85762A are difficult to manufacture at the present time. However, after manufacturers have had an opportunity to examine the requirements and develop product lines to meet those requirements, the red lighting components should also be readily available.

MIL-STD-3009
APPENDIX C

C.9. REFERENCES (1) Maj J. Keane, Forward Looking Infrared and Night Vision Goggles, a Pilot's Perspective Related to JVX, NAVAIRDEVCEN, Code 0962, Technical Memorandum, 16 February 1984.

(2) Ferdinand Reetz III, Cockpit Lighting Modifications in a TA-7C Aircraft for Flight Tests of Night Vision Goggles, NAVAIRDEVCEN Report No. NADC-84100-30, 16 May 1984.

(3) U.S. Army Aviation Board, Final Test Report, Operational Test II of the AN/AVS-6 Aviator's Night Vision Imaging System (ANVIS), 15 January 1982.

(4) H. L. Task and L. L. Griffin, Electroluminescent Lighting and Other Techniques for Improving Night Vision Goggles Compatibility with Cockpit Displays," AGARD Conference Proceedings No. 329, Advanced Avionics and the Military Aircraft Man/Machine Interface.

(5) Chesley S. Pieroway, "Aircraft Night Lighting Systems" SAE Business Aircraft Meeting and Exposition, paper No. 830713, April 1983.

(6) William A. Breitmaier and Ferdinand Reetz III, "Visual and Spectroradiometric Performance Criteria for Night Vision Goggles(NVG) Compatible Aircraft Interior Lighting," AGARD Conference Proceedings No. 379. Visual Protection and Enhancement, Athens, Greece, 22-24 April 1985.

(7) R. M. Herrick, Visual Considerations on the ANVIS and on Aircraft Lighting Compatibility with ANVIS, Essex Corp. Report No. 111583, November 1983.

(8) William Slusher, Instrument Lighting Level and AN/AVS-6 Usage, AAMAL-TR-85-055, August 1985.

(9) Laurie A. Bryner, The Effects of Red Cockpit Lighting on Night Vision Imaging Systems (NVIS) NAVAIRDEVCEN Report No. NADC-86XXX-50 (DRAFT), 26 September 1986.

(l0) Richard E. Franseen, Goggle Compatible Lighting for the AN/PVS-5A and AN/AVS-6, U.S. Army Night Vision and Electro-Optics Laboratory, DELNV-SE Technical Memorandum, 2 February 1981.

(11) Mishrie E. Vatsia, U. Karl Stitch, and Douglas Dunlap, Night Sky Radiant Sterrance from 450 to 2000 Nanometers, U.S. Army Electronics Command, ECOM-7022, September 1977.

(12) Donald S. Lowe and John G. N. Braithwaite, "A Spectrum Matching Technique for Enhancing Image Contrast," Applied Optics, Vol. 5,
No. 6, (January 1966) p. 895

(13) Ferdinand Reetz III, Rationale behind the Requirements Contained in Military Specifications MIL-L-85762 and MIL-L-85762A, NAVAIRDEVCEN Report No. NADC-87060-20, 17 September 1987.

MIL-STD-3009

CONCLUDING MATERIAL

Custodians:
   Army – CR
   Air Force – 11

Review Activities:
   Army – AV

Preparing Activity:
   Air Force – 11

Project No.: GDRQ-0193

STANDARDIZATION DOCUMENT IMPROVEMENT PROPOSAL

INSTRUCTIONS

1. The preparing activity must complete blocks 1, 2, 3, and 8. In block 1, both the document number and revision letter should be given.

2. The submitter of this form must complete blocks 4, 5, 6, and 7, and send to preparing activity.

3. The preparing activity must provide a reply within 30 days from receipt of the form.

NOTE: This form may not be used to request copies of documents, nor to request waivers, or clarification of requirements on current contracts. Comments submitted on this form do not constitute or imply authorization to waive any portion of the referenced document(s) or to amend contractual requirements.

| I RECOMMEND A CHANGE: | 1. DOCUMENT NUMBER<br>MIL-STD-3009 | 2. DOCUMENT DATE (YYYYMMDD)<br>20010202 |
|---|---|---|

3. DOCUMENT TITLE    LIGHTING, AIRCRAFT, NIGHT VISION IMAGING SYSTEM COMPATIBLE

4. NATURE OF CHANGE *(Identify paragraph number and include proposed rewrite, if possible. Attach extra sheets as needed.)*

5. REASON FOR RECOMMENDATION

6. SUBMITTER

| a. NAME *(Last, First, Middle Initial)* | b. ORGANIZATION | |
|---|---|---|
| c. ADDRESS *(Include Zip Code)* | d. TELEPHONE (Include Area Code)<br>(1) Commercial<br>(2) AUTOVON<br>*(if applicable)* | 7. DATE SUBMITTED<br>(YYYYMMDD) |

8. PREPARING ACTIVITY

| a. NAME     ASC/ENOI (AF-11) | b. TELEPHONE *Include Area Code)*<br>(1) Commercial (937)255-8710/-6282     (2) AUTOVON 785-8710/-6282 |
|---|---|
| c. ADDRESS *(Include Zip Code)*<br>2530 LOOP ROAD WEST<br>WRIGHT-PATTERSON AFB, OH 45433-7101 | IF YOU DO NOT RECEIVE A REPLY WITHIN 45 DAYS, CONTACT:<br>Defense Standardization Program Office (DLSC-LM)<br>8725 John J. Kingman road, Suite 2533, Ft. Belvoir, VA 22060-2533<br>Telephone (703) 767-6888     AUTOVON 427-6888 |

DD Form 1426, FEB 1999 (EG)     PREVIOUS EDITION IS OBSOLETE     WHS/DIOR, Feb 99

The invention claimed is:

1. A touchscreen for use with cameras, sights or night vision goggles, said Touchscreen being for locating an opaque object in a target region, by detecting interruption of light beams, the touchscreen comprising:
   one or more optical emitters arranged to create said light beams, and one or more optical detectors arranged to provide detection signals, said optical emitters emitting wavelengths which do not interfere with said cameras, sights or goggles, whereby a substantial peak of the spectrum of the said optical emitters is not below 900 nm.

2. The touchscreen of claim 1, further comprising drive circuitry arranged to modulate the optical emitters and detection circuitry to detect the same modulation in the detection signals.

3. The touchscreen of claim 2 wherein the detection circuitry is synchronized to the drive circuitry.

4. The touchscreen of claim 3, wherein the detection circuitry comprises an integrator coupled to an output of a switching inverter, the switching inverter being arranged to switch between outputting an inverted or non-inverted version of a given detection signal, the switching being arranged to be in phase with the modulation of the corresponding emitters.

5. The touchscreen of claim 4, the detection circuitry having a comparator arranged to compare an output of the integrator with one or more thresholds, to determine an interruption of the corresponding beam and therefore indicate a touch.

6. The touchscreen of claim 1, including circuitry for controlling an emission power of the emitters according to an output of the detection circuitry.

7. The touchscreen of claim 1, wherein said light beams are configured to cover a planar target area.

8. The touchscreen of claim 7, wherein the emitters and detectors are mounted on a frame around the planar target area.

9. The touchscreen of claim 1, further comprising at least one interference filter arranged in front of the one or more optical detectors.

10. The touchscreen of claim 9 wherein the at least one interference filter has a steep cut-off from 0% transparency below 1000 nm and at least 90% transparency above 1005 nm for angles larger than 85°.

11. The touchscreen of claim 9 further comprising means to guarantee that any light rays that are incident on the filter are at angles larger than 85 degrees.

12. The touchscreen of claim 11 wherein said means to guarantee that any light rays that are incident on the filter are at angles larger than 85 degrees comprises mechanical construction and components location.

* * * * *